(12) United States Patent
Li et al.

(10) Patent No.: US 10,454,354 B2
(45) Date of Patent: Oct. 22, 2019

(54) SINGLE PHASE MOTOR

(71) Applicant: JOHNSON ELECTRIC INTERNATIONAL AG, Murten (CH)

(72) Inventors: Yue Li, Hong Kong (CN); Chui You Zhou, Shenzhen (CN); Yong Wang, Shenzhen (CN); Yong Li, Shenzhen (CN)

(73) Assignee: Johnson Electric International AG, Murten (CH)

( * ) Notice: Subject to any disclaimer, the term of this patent is extended or adjusted under 35 U.S.C. 154(b) by 264 days.

(21) Appl. No.: 15/248,460

(22) Filed: Aug. 26, 2016

(65) Prior Publication Data

US 2016/0365781 A1 Dec. 15, 2016

Related U.S. Application Data

(63) Continuation-in-part of application No. 14/455,160, filed on Aug. 8, 2014, now Pat. No. 10,110,076.

(30) Foreign Application Priority Data

Aug. 9, 2013 (CN) .......................... 2013 1 0347200
Aug. 9, 2013 (CN) .......................... 2013 1 0348173
(Continued)

(51) Int. Cl.
*H02K 1/27* (2006.01)
*H02K 21/16* (2006.01)
(Continued)

(52) U.S. Cl.
CPC ............. *H02K 21/16* (2013.01); *H02K 1/146* (2013.01); *H02K 1/2753* (2013.01); *H02K 3/18* (2013.01);
(Continued)

(58) Field of Classification Search
CPC .. H02K 1/18; H02K 3/34; H02K 5/20; H02K 21/22; H02K 1/27; H02K 15/03; H02K 5/167; G11B 15/28
See application file for complete search history.

(56) References Cited

U.S. PATENT DOCUMENTS 3,257,572 A * 6/1966 Heilmann .............. H02K 1/146
310/190
4,565,955 A 1/1986 Kubota
(Continued)

FOREIGN PATENT DOCUMENTS

CN 1178410 A 4/1998
CN 1901335 1/2007
(Continued)

*Primary Examiner* — Julio C. Gonzalez
*Assistant Examiner* — Leda T Pham
(74) *Attorney, Agent, or Firm* — Muncy, Geissler, Olds & Lowe, P.C.

(57) ABSTRACT

A single phase motor includes a rotor including magnetic poles and a stator comprising a stator core and a winding wound on the stator core. The stator core includes a plurality of stator teeth each including a tooth body and a tooth end formed at an end of the tooth body, the tooth end comprising first and second arcuate regions facing the rotor. When the winding is not energized, a first magnetic coupling between said first arcuate region and a selected magnetic pole of said rotor is greater than a second magnetic coupling between said second arcuate region and the selected magnetic pole, said first arcuate region being offset from a selected tooth body in such a way as to enable movement of said rotor to initiate in either of two opposite directions relative to said selected tooth body upon energizing the winding.

16 Claims, 54 Drawing Sheets

(30) Foreign Application Priority Data

| Aug. 28, 2015 | (CN) | .......................... 2015 1 0543420 |
| Aug. 28, 2015 | (CN) | .......................... 2015 1 0543842 |
| Aug. 28, 2015 | (CN) | .......................... 2015 1 0546028 |
| Sep. 2, 2015 | (CN) | .......................... 2015 1 0556517 |
| Nov. 27, 2015 | (CN) | .......................... 2015 1 0867364 |

(51) Int. Cl.
- *H02K 1/14* (2006.01)
- *H02K 3/18* (2006.01)
- *H02K 29/03* (2006.01)

(52) U.S. Cl.
CPC ......... *H02K 29/03* (2013.01); *H02K 2201/03* (2013.01); *H02K 2213/03* (2013.01)

(56) References Cited

U.S. PATENT DOCUMENTS

| 4,600,864 | A |  | 7/1986 | Sato |  |
| 4,730,136 | A |  | 3/1988 | Muller |  |
| 5,170,083 | A |  | 12/1992 | Burgbacher |  |
| 5,773,908 | A |  | 6/1998 | Stephens et al. |  |
| 6,109,589 | A | * | 8/2000 | Ackermann | C03C 17/25 251/129.11 |
| 7,560,844 | B2 |  | 7/2009 | Miyashita et al. |  |
| 7,687,965 | B2 | * | 3/2010 | Ionel | H02K 1/141 310/216.001 |
| 2001/0005933 | A1 |  | 7/2001 | Kazama et al. |  |
| 2004/0189136 | A1 | * | 9/2004 | Kolomeitsev | H02K 1/148 310/216.082 |
| 2007/0241629 | A1 | * | 10/2007 | Ionel | H02K 1/141 310/214 |
| 2013/0249330 | A1 | * | 9/2013 | King | H02K 1/141 310/43 |
| 2014/0252910 | A1 | * | 9/2014 | Kunihiro | H02K 17/165 310/211 |

FOREIGN PATENT DOCUMENTS

| CN | 104348268 A | 2/2015 |
| JP | S63174531 | 7/1988 |

* cited by examiner

2000

2100

```
┌─────────────────────────────┐
│ Winding a winding 330 around a │─── 2111
│    winding portion 320       │
└─────────────────────────────┘
              │
              ▼
┌─────────────────────────────┐
│ Assembling the winding portion 320 │
│ with a selected stator portion to form │─── 2112
│         the stator 300       │
└─────────────────────────────┘
```

2000

2100 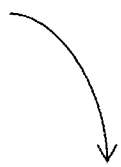

```
┌─────────────────────────────────────┐
│ Winding a winding 330 around a      │
│ winding portion 320 connected with  │──── 2131
│ the first and second stator portions│
│ 310, 340, at least one of which     │
│ having an adjustable shape          │
└─────────────────────────────────────┘
                    │
                    ▼
┌─────────────────────────────────────┐
│ Reduce the gap 316 after the winding│
│ by adjusting the adjustable shape   │──── 2132
│ to form the stator 300              │
└─────────────────────────────────────┘
```

*Fig. 48*

SINGLE PHASE MOTOR

CROSS REFERENCE TO RELATED APPLICATIONS

This application is a continuation-in-part of co-pending U.S. patent application Ser. No. 14/455,160, filed on Aug. 8, 2014, which claims priority under 35 U.S.C. § 119(a) from Patent Application No. 201310348173.8 filed in the People's Republic of China on Aug. 9, 2013, and Patent Application No. 201310347200.x filed in the People's Republic of China on Aug. 9, 2013; this application claims priority under 35 U.S.C. § 119(a) from Patent Application No. 201510867364.4 filed in the People's Republic of China on Nov. 27, 2015, Patent Application No. 201510556517.3 filed in the People's Republic of China on Sep. 2, 2015, Patent Application No. 201510546028.X filed in the People's Republic of China on Aug. 28, 2015, Patent Application No. 201510543842.6 filed in the People's Republic of China on Aug. 28, 2015, Patent Application No. 201510543420.9 filed in the People's Republic of China on Aug. 28, 2015, all of which are expressly incorporated herein by reference in their entireties and for all purposes.

FIELD

The disclosed embodiments relate generally to motors and more particularly, but not exclusively, to single-phase brushless motors and methods for using and making the same.

BACKGROUND

FIG. 1 shows a conventional single-phase brushless motor 10, which comprises a stator 11 and a rotor 19 installed in the stator 11. The stator 11 comprises a stator core 12 and a winding 13 wound on the stator core 12. The stator core 12 comprises an annular yoke 14 and a plurality of teeth 15 extending inwardly from the yoke 14. Slots 16 are formed between adjacent teeth 15 for receiving coils 13A of the winding 13. The yoke 14 and the teeth 15 of the stator core 12 are integrally formed into a single integral structure. Each tooth 15 forms a stator pole 15A, which comprises a pole shoe 18 formed at the end of the tooth 15. The pole shoe 18 extends along the circumferential direction of the motor 10. A slot opening 17 is formed between adjacent pole shoes 18 to allow access for winding the respective coils 13A about each of the teeth 15. Therefore, a non-uniform air gap 17A is formed between the stator 11 and the rotor 19.

In the above conventional single-phase brushless motor 10, however, the presence of the slot openings 17 can make the motor 10 generate an unduly large cogging torque. The cogging torque can result in the motor 10 generating vibration and noise during use. Furthermore, since the stator core 12 of the motor 10 is provided as an integral structure, a reciprocating shuttle winding machine is required for winding the coils 13A. But, use of the reciprocating shuttle winding machine causes a low winding efficiency.

In view of the foregoing, there is a need for a motor that can operate with low vibration and noise and that can be manufactured in a more efficient manner, overcoming disadvantages of existing motors.

SUMMARY

The present invention provides a motor which comprises a rotor including magnetic poles; and a stator comprising a stator core and a winding wound on the stator core, the stator core comprising a plurality of stator teeth each comprising a tooth body and a tooth end formed at an end of the tooth body, the tooth end comprising first and second arcuate regions facing the rotor. Each magnetic pole has an edge region facing the stator, the edge regions of the magnetic poles of the rotor and the first arcuate region of the stator being coaxial with each other. When the winding is not energized, a first magnetic coupling between said first arcuate region and a selected magnetic pole of said rotor is greater than a second magnetic coupling between said second arcuate region and the selected magnetic pole, the magnetic pole being offset from a selected tooth body in such a way as to enable movement of said rotor to initiate in either of two opposite directions relative to said selected tooth body upon energizing the winding.

Preferably, adjacent tooth ends of the stator are separated from each other by a slot.

Preferably, a ratio of the circumferential width of the slot to the width of an air gap formed between the edge regions of the magnetic poles of the rotor and the first arcuate regions of the stator range from zero to four.

Preferably, the rotor defines a central axis, the first arcuate region has a first radius uniform about the central axis, and the second arcuate region has a second radius about the central axis greater than the first radius.

Preferably, the first arcuate region is made of a first material, and the second arcuate region is made of a second material different from the first material, the second material having a lower magnetic permeability than the first material.

Preferably, when the winding is not energized, a middle radial line of the magnetic pole is angularly offset from a middle radial line of the selected tooth body by a start up angle ranging from 45 to 135 degrees electrical angle.

Preferably, the second arcuate region defines a recess, and the size of an air gap formed between the second arcuate region and the edge region of the rotor is greater than the size of the air gap between the first arcuate region and the edge region of the rotor.

Preferably, the stator core comprises a first stator portion and a second stator portion, the stator teeth extending inwardly from the second stator portion, the tooth ends cooperatively forming the first stator portion.

Preferably, the second stator portion is ring-shaped.

Preferably, the second stator portion comprises a plurality of segments engaged with each other, each segment is integral formed with a corresponding stator tooth, and adjacent tooth ends are disconnected by a slot.

Alternatively, the rotor defines a central axis; the first arcuate region has a first radius uniform about the central axis; and the second arcuate region has a second radius uniform about the central axis, the second radius being equal to the first radius.

Preferably, the second arcuate region defines a hole.

BRIEF DESCRIPTION OF THE DRAWINGS

FIG. 48 is an exemplary flow chart illustrating an embodiment of the method of FIG. 35, wherein the method includes assembling the stator having an adjustable shape.

Figure 1:
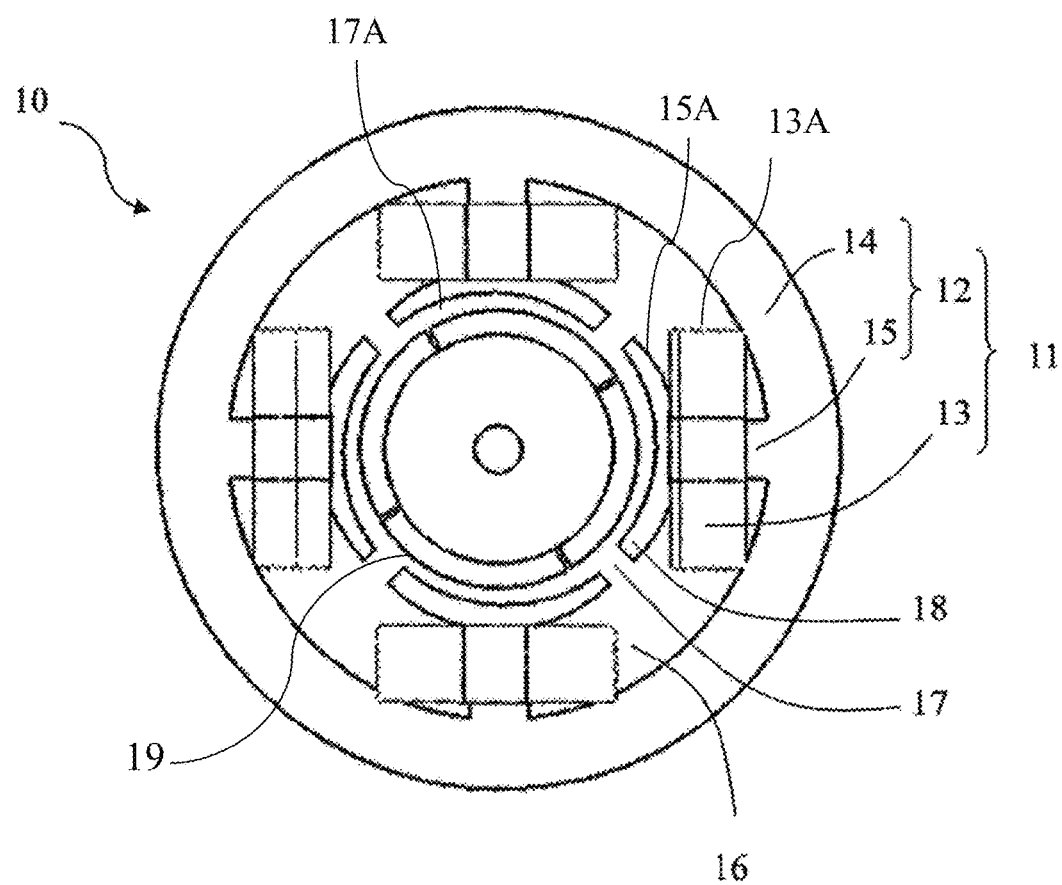
FIG. 1 is a plan view of a conventional single-phase brushless motor.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available motors are susceptible to high vibration and noise and are manufactured using inefficient processes, a motor that reduces vibration and noise and increases manufacturing efficiency can prove desirable and provide a basis for a wide range of motor applications, such as household appliances and automobiles. This result can be achieved, according to one embodiment disclosed herein, by a stator 300 as illustrated in FIG. 2.

Figure 2:
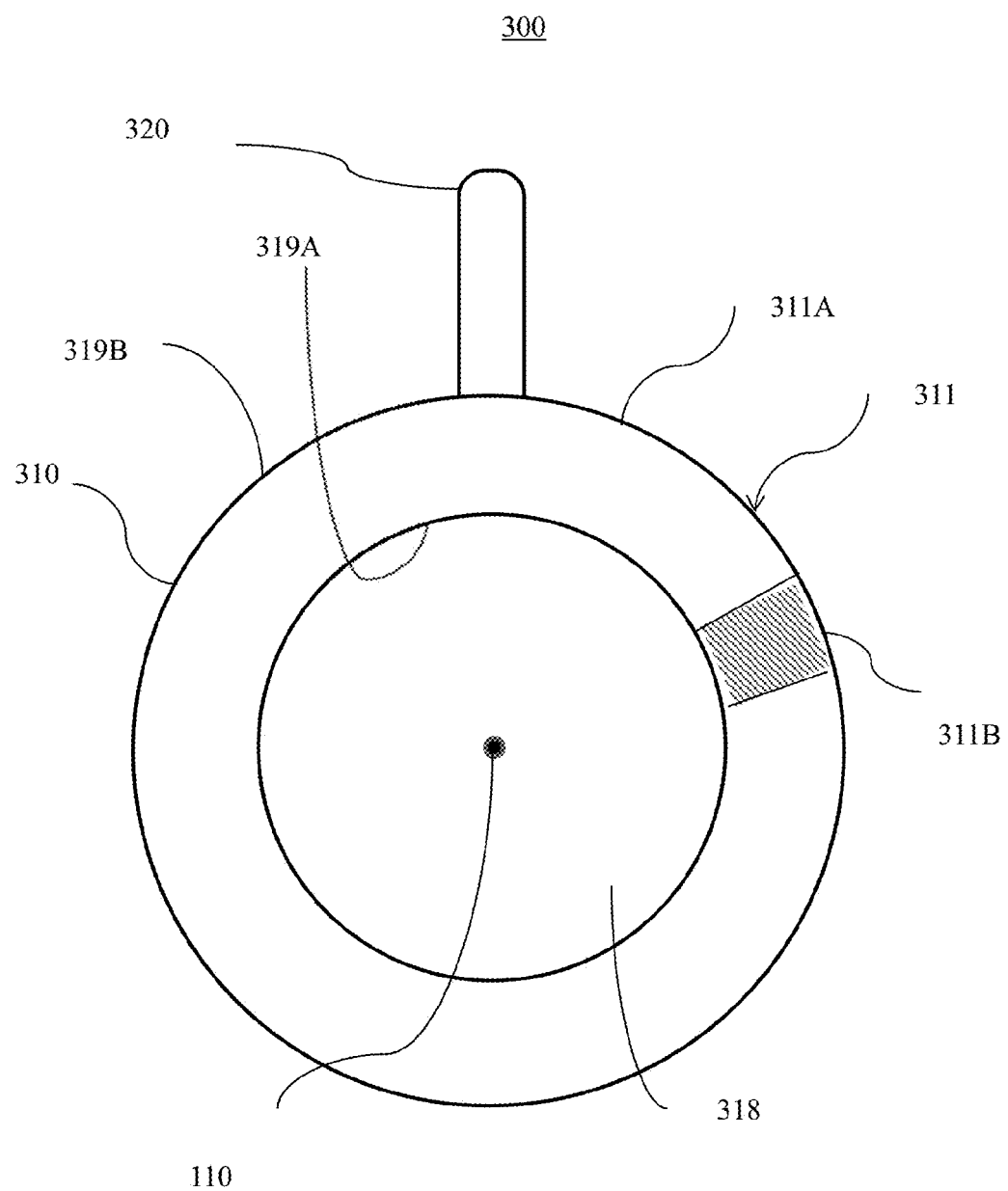
FIG. 2 is an exemplary top-level diagram illustrating an embodiment of a stator including a first arcuate region and a second arcuate region.

Turning to FIG. 2, the stator 300 includes a first stator portion 310. The first stator portion 310 can have an annular shape as shown in FIG. 2. The first stator portion 310 can be disposed about a central axis 110. When provided with the annular shape, the first stator portion 310 can include one or more arcuate members (or regions) 311. As illustrated in FIG. 2, for example, the first stator portion 310 can include a first arcuate region 311A and a second arcuate region 311B. The arcuate regions 311 can be formed from uniform and/or different materials. Exemplary materials can include a soft ferromagnetic material, such as annealed iron or steel. The material from which the first arcuate region 311A is formed, for example, can have a first magnetic property that can be the same as, and/or different from, a second magnetic property of the material comprising the second arcuate region 311B.

The first stator portion 310 can have a predetermined depth (not shown) in a direction of the central axis 110. The first stator portion 310 advantageously can define a channel 318 that extends at least partially, and/or entirely, through the first stator portion 310. As shown in FIG. 2, the arcuate regions 311 can have first surfaces 319A that are proximal to the central axis 110. The first surfaces 319A are disposed at a predetermined distance from the central axis 110. In the embodiment of FIG. 2, the predetermined distance for each of the first surfaces 319A is shown as being uniform about the central axis 110 such that the first stator portion 310 defines a circular (or round) cross-section for the channel 318. The cross-section of the channel 318 can have any selected shape, size and/or dimension and preferably is suitable for at least partially receiving a rotor 200 (shown in FIG. 3).

The stator 300 can include one or more tooth bodies 320. Each tooth body 320 can be disposed on, and extend from, the first stator portion 310. Each tooth body 320 can be formed from the same material as, and/or a different material from, the material that comprises the first stator portion 310. Preferably, each tooth body 320 is formed from a soft ferromagnetic material, such as annealed iron or steel, and can be disposed on the first stator portion 310 in any conventional manner. For example, the first stator portion 310 and the tooth body 320 can be formed as a unitary member, and/or the first stator portion 310 and the tooth body 320 can be formed as separate members that can be coupled together. For example, the tooth body 320 can be coupled with the first stator portion 310 via welding and/or a mechanical connection such as a cooperating detent with a wedge-shaped protrusion engaged in a wedge-shaped recess.

The term "detents" refers to any combination of mating elements, such as blocks, tabs, pockets, slots, ramps, locking pins, cantilevered members, support pins, and the like, that may be selectively or automatically engaged and/or disengaged to couple or decouple the tooth body 320, the first stator portion 310, and the second stator portion 340 relative to one another. It will be appreciated that the cooperating detents as illustrated and described in the present disclosure are merely exemplary and not exhaustive.

As shown in FIG. 2, the arcuate regions 311 can have second surfaces 319B that are distal from the central axis 110. In other words, the first surfaces 319A and the second surfaces 319B can be opposite surfaces of the arcuate regions 311. For purposes of explanation only, for example, the stator 300 of FIG. 2 is shown as including a single tooth body 320, and the tooth body 320 is illustrated as extending radially from the first stator portion 310 relative to the central axis 110. Stated somewhat differently, the tooth body 320 can extend radially from the first stator portion 310 away from the central axis 110.

Although shown and described with reference to FIG. 2 as including one first arcuate region 311A and one second arcuate region 311B for purposes of illustration only, the stator 300 can have any predetermined number of the first arcuate regions 311A and/or any predetermined number of the second arcuate regions 311B. Although FIG. 2 illustrates the stator 300 as including one tooth body 320 for purposes of illustration only, the stator 300 may have any predetermined number of tooth bodies 320. The stator 300 preferably includes an even number, such as 2, 4, 6, 8 or more, of tooth bodies 320 that are evenly spaced around a circumference of the second surfaces 319B of the arcuate regions 311. In one embodiment, the number of tooth bodies 320 can be equal to the predetermined number of the first arcuate regions 311A and/or the predetermined number of the second arcuate regions 311B. Although FIG. 2 shows the first stator portion 310 as having an annular shape, the first stator portion 310 can have any predetermined shape.

Figure 3:
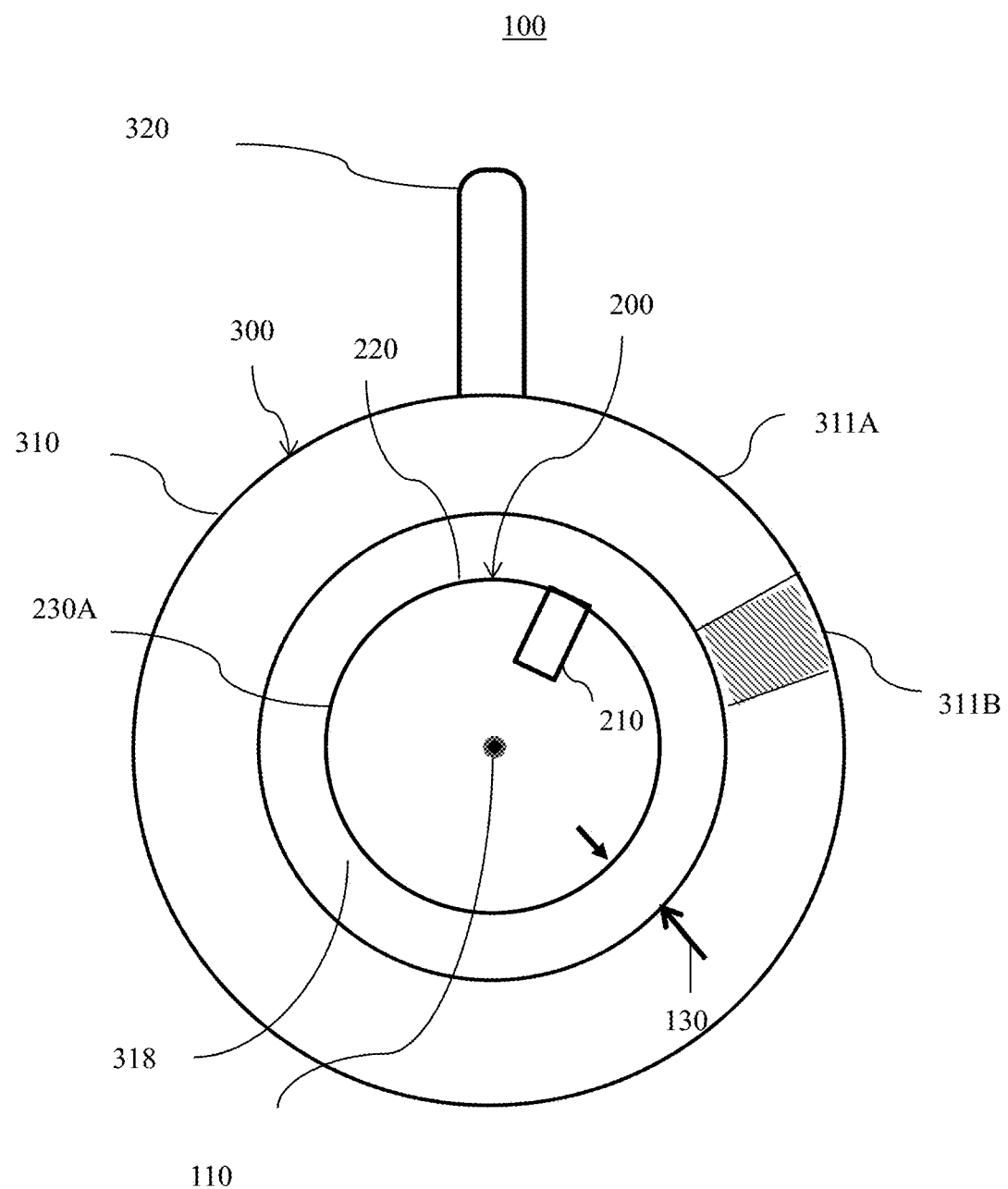
FIG. 3 is an exemplary diagram illustrating an embodiment of a motor including the stator of FIG. 2, wherein the stator receives a rotor.

The stator 300 in FIG. 2 advantageously can be used as a component of a motor. FIG. 3 is an exemplary diagram illustrating an embodiment of a motor 100 that includes the stator 300. FIG. 3 shows the motor 100 as including a rotor 200. The rotor 200 is shown as being centered about central axis 110.

The rotor 200 can include a rotor core 220 and one or more magnetic poles 210 disposed on a circumference of the rotor core 220. Each magnetic pole 210 can be made of any suitable ferromagnetic and/or paramagnetic material. An exemplary magnetic pole 210 can include a permanent magnet.

The rotor 200 can be at least partially disposed within the channel 318 of the stator 300. When disposed within the channel 318, the rotor 200 can be concentrically arranged with the stator 300 about the central axis 110. More specifically, the first stator portion 310 can be concentrically arranged about the rotor 200. In other words, the first stator portion 310 can be configured to receive, and cooperate with, the rotor 200. The magnetic poles 210 can be repelled and/or attracted to the stator 300. The rotor 200 can thus be adapted to rotate or otherwise move relative to the stator 300.

In one embodiment, the motor 100 can be an electric (or electromagnetic) motor. For example, the motor 100 can be a multi-phase brushless direct current (BLDC) motor, a brushed motor, an alternating current (AC) induction motor, a permanent magnet synchronous motor, a stepper motor, a switched reluctance motor. The motor 100 preferably is a single-phase brushless motor.

Although FIG. 3 illustrates the rotor 200 as including one magnetic pole 210 for purposes of illustration only, the rotor 200 may have any predetermined number of magnetic poles 210. The rotor 200 preferably includes an even number of magnetic poles 210 that are evenly spaced around a circumference of the rotor 200.

Figure 4:
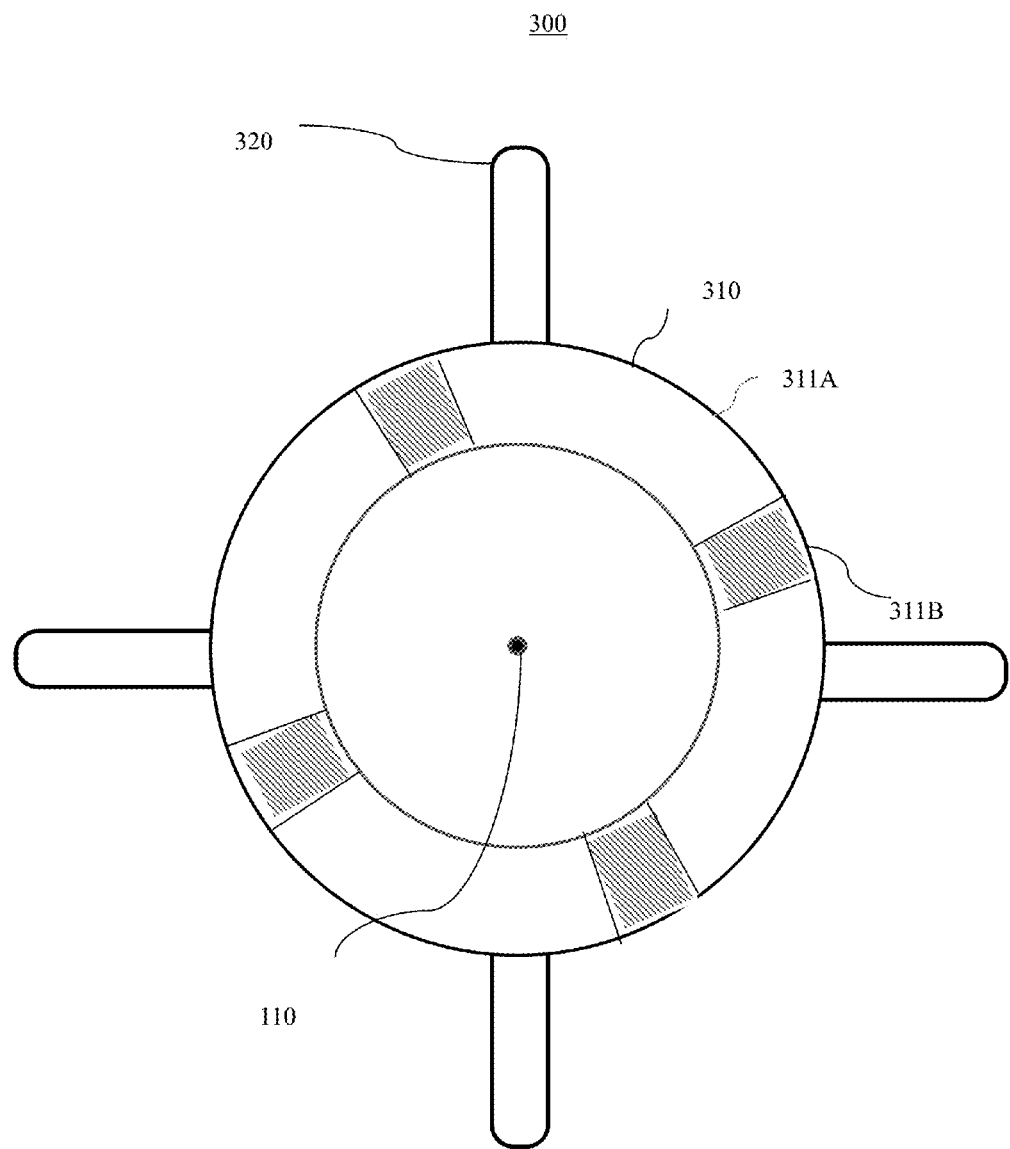
FIG. 4 is an exemplary diagram illustrating an alternative embodiment of the stator of FIG. 2, wherein the stator includes a plurality of second arcuate regions.

FIG. 4 is an exemplary diagram illustrating an alternative embodiment of the stator 300 of FIG. 2. FIG. 4 shows the first stator portion 310 as including four first arcuate regions 311A and four second arcuate regions 311B. The four first arcuate regions 311A and four second arcuate regions 311B of FIG. 4 are illustrated as being evenly and alternately arranged circumferentially.

Further, FIG. 4 shows the stator 300 as including four tooth bodies 320, or two pairs of tooth bodies 320, evenly spaced around a circumference of the second surfaces 319B of the arcuate regions 311. By evenly spacing the tooth bodies 320, uniformity of magnetic field exerted on the rotor 200 by the tooth bodies 320, when magnetized, can be advantageously improved.

Figure 5:
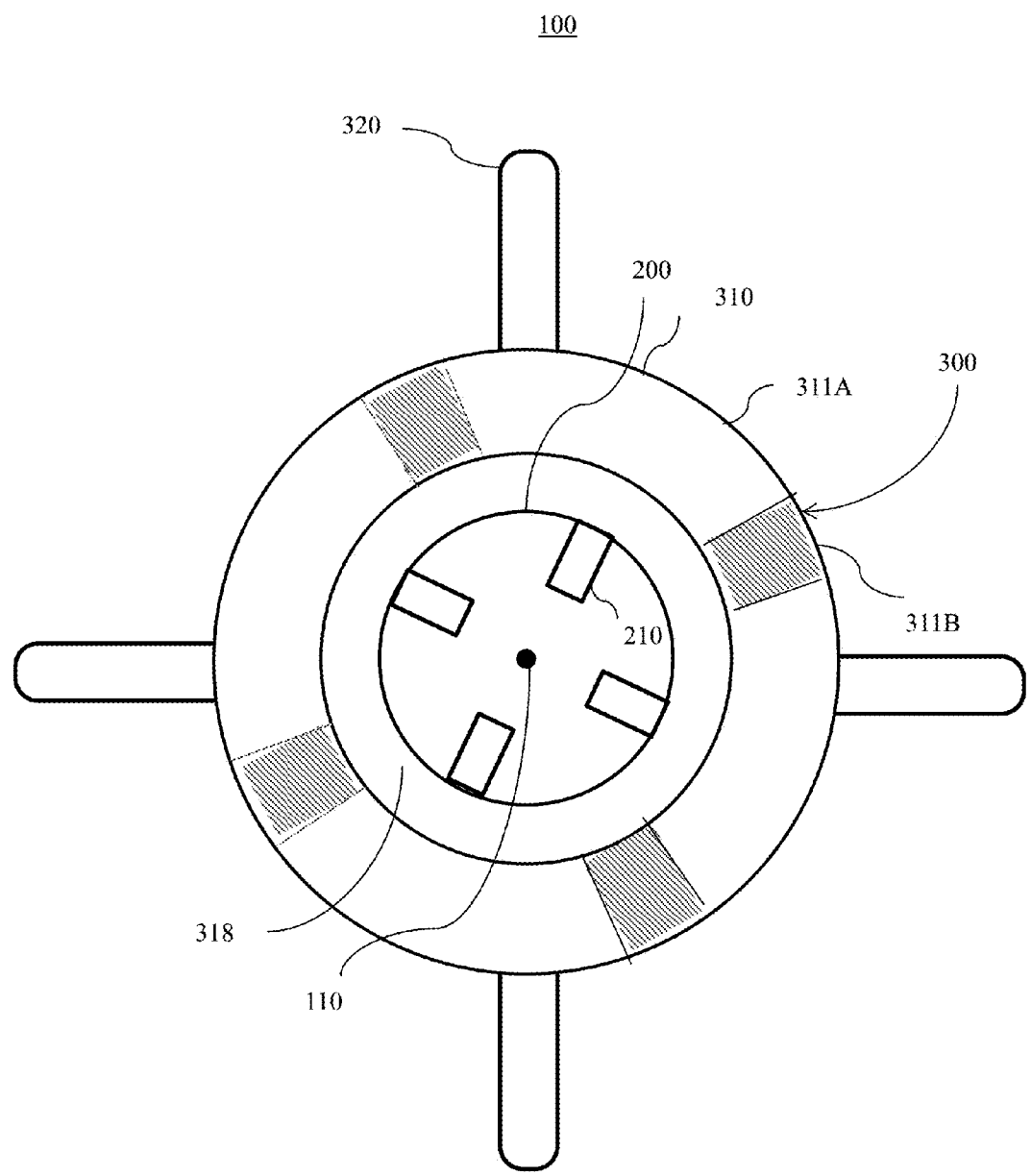
FIG. 5 is an exemplary diagram illustrating an alternative embodiment of the motor of FIG. 3, wherein the motor includes the stator of FIG. 4.

FIG. 5 is an exemplary diagram illustrating an alternative embodiment of the motor 100. The motor 100 is shown as including the stator 300 provided in the manner set forth above with reference to FIG. 4. The stator 300 can receive the rotor 200 in the channel 318. FIG. 5 shows the rotor 200 as including four magnetic poles 210 distributed about the circumference of the rotor 200. The magnetic poles 210 of opposite polarities can be alternately arranged about the circumference of the rotor 200. Stated somewhat differently, adjacent magnetic poles 210 can have opposite polarities.

FIG. 5 shows the magnetic poles 210 as being evenly spaced about the circumference of the rotor 200. When the magnetic poles 210 are evenly spaced, magnetic coupling between the stator 300 and each magnetic pole 210 can be uniform. Advantageously, when the motor 100 operates, stability of rotation of the rotor 200 can be improved.

The number of magnetic poles 210 preferably is equal to the number of tooth bodies 320; however, the number of magnetic poles 210 and the number of tooth bodies 320 can be different in some embodiments. Although shown and described as including four magnetic poles 210 and four tooth bodies 320, the motor 100 optionally can include any even number of magnetic poles 210 and/or tooth bodies 320.

Figure 6:
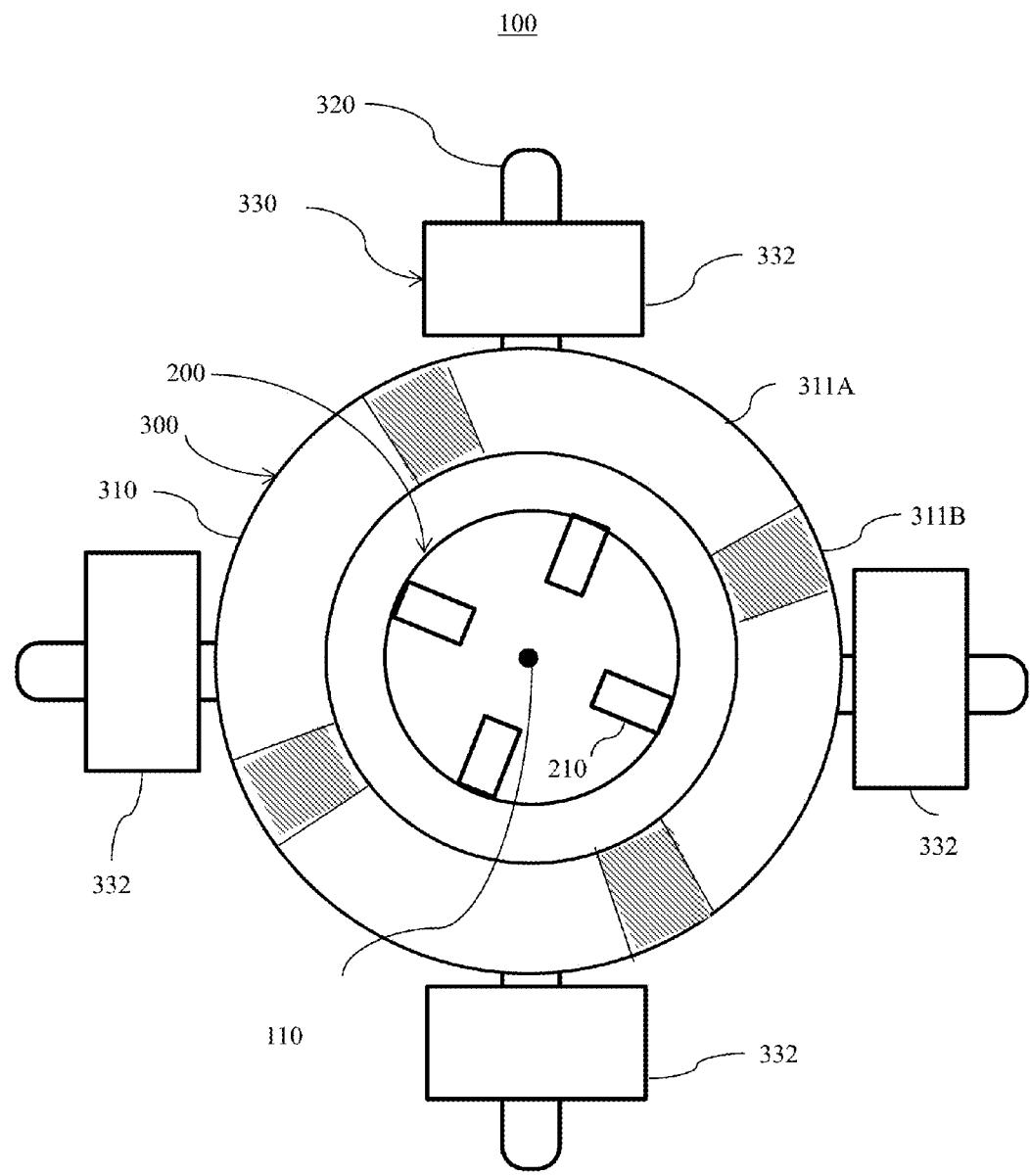
FIG. 6 is an exemplary diagram illustrating an alternative embodiment of the motor of FIG. 5, wherein the motor includes a winding.

FIG. 6 is an exemplary diagram illustrating an alternative embodiment of the motor 100. Turning to FIG. 6, the tooth bodies 320 are shown as extending from the first arcuate region 311A and being wound with a winding 330.

The winding 330 can include one piece of wire that forms a plurality of coils 332. Additionally and/or alternatively, the winding 330 can include a plurality of separate pieces of wire each forming a respective coil 332. A selected coil 332 can be wound around a selected tooth body 320. The number of the coils 332 can be equal to the number of the tooth bodies 320. The coils 332 can be connected to form a single-phase winding and/or multi-phase winding in various connecting manners. Exemplary connecting manners can include connecting in series, in parallel, or a combination thereof. For example, two or more of the coils may be connected in series. Additionally and/or alternatively, a first series arrangement of two coils 332 may be connected in parallel with a second series arrangement of two coils 332. Additionally and/or alternatively, two or more of the coils 332 may be connected in parallel.

In use, the winding 330 can be energized for controlling operation of the motor 100. Energizing the winding 330 can include passing a current (not shown) through the winding 330 so that the current can flow through selected one or more of the coils 332. The current through a selected coil 332 can magnetize the relevant tooth body 320 around which the coil 332 is wound. Additionally and/or alternatively, the winding 330, when energized, can magnetize the first stator portion 310.

The winding 330 can be coupled with, for example, a control system (not shown) for providing electrical signals to the windings 330. In other words, the control system can energize one or more of the coils 332 in a predetermined manner. The energized coils 332 can exert attraction and/or repulsion forces on the magnetic poles 210. When the control system provides the electrical signals to synchronize attraction and/or repulsion forces, the rotor 200 can rotate relative to the stator 300. Thus, the motor 100 can operate.

When the winding 330 is not energized, the rotor 200 can be positioned in an equilibrium position relative to the stator 300. When the winding 330 is energized, the rotor 200 can initiate movement from the equilibrium position in a predetermined direction based on polarity of current through the winding 330. Thus, the equilibrium position is also a start up position of the rotor 200.

For example, when the winding 330 is energized, a selected magnetic pole 210 can rotate by an angular distance from the start up position in order to be radially aligned with a first downstream tooth body 320 in the predetermined direction. The angular distance can affect rotational (or angular) acceleration and/or speed of the rotor 200 when the rotor 200 becomes radially aligned with the first downstream tooth body 320. The acceleration and/or speed can affect whether the rotor 200 can rotate further or stop rotating. Therefore, the start up position can determine whether operation of the motor 100 can initiate the rotation movement.

Figure 7:
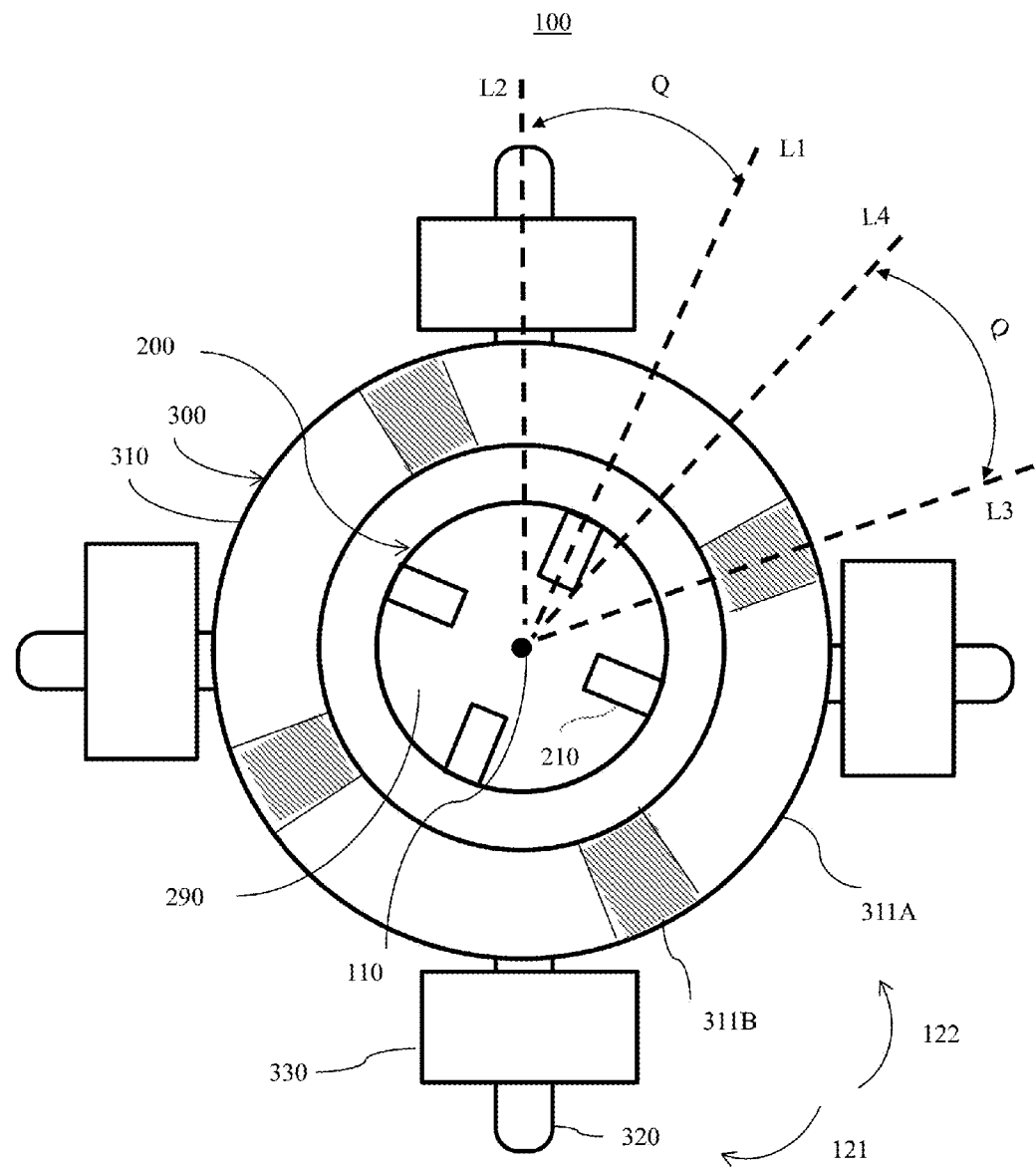
FIG. 7 is an exemplary diagram illustrating an alternative embodiment of the motor of FIG. 6, wherein the motor supports a start up angle.

The start up position can be expressed in terms of an angular offset between a selected magnetic pole 210 and a selected tooth body 320. FIG. 7 is an exemplary diagram illustrating an alternative embodiment of a motor of FIG. 6. FIG. 7 shows that the motor 100 is structured to support a start up angle Q. When the winding 330 is not energized, a first interaction between a first arcuate region 311A and a selected magnetic pole 210 of the rotor 200 can be different from a second interaction between a second arcuate region 311B and the selected magnetic pole 210. In other words, a first magnetic coupling (or attraction) between the selected magnetic pole 210 and the first arcuate region 311A can be greater than a second magnetic coupling (or attraction) between the selected magnetic pole 210 and the second arcuate region 311B when the winding 330 is not energized.

A difference between the first and second magnetic coupling (or attraction) can induce the selected magnetic pole 210 to rest at an equilibrium position (or start-up position) that is closer to the first arcuate region 311A than to the second arcuate region 311B. The start up position can comprise a predetermined start up position and/or a range of predetermined start up positions of the selected magnetic pole 210 when the winding 330 is not energized. Accordingly, the selected magnetic pole 210 can radially align with the first arcuate region 311A. A neutral zone 290 between two adjacent magnetic poles 210 can radially align with the second arcuate region 311B.

As shown in FIG. 7, a middle radial line L1 extending from the central axis 110 can bisect a selected first arcuate region 311A; whereas, a middle radial line L2 extending from the central axis 110 can bisect the selected tooth body 320. The middle radial line L1 of FIG. 7 is illustrated as being angularly offset (and/or circumferentially offset) from the middle radial line L2. Stated somewhat differently, the middle radial line L1 can be angularly offset from the middle radial line L2 by a predetermined angle. The angular offset is referred to herein as being a start up angle Q of the selected magnetic pole 210.

Further, a middle radial line L3 extending from the central axis 110 can bisect a selected second arcuate region 311B; whereas, a middle radial line L4 extending from the central axis 110 can bisect the first stator portion 310 between two adjacent tooth bodies 320. The middle radial line L3 can be angularly offset, and/or circumferentially offset, from the middle radial line L4.

As shown in FIG. 7, an angle formed between L2 and L4 can be equal to half of the angle formed between two adjacent tooth bodies 320. If the angle formed between two adjacent tooth bodies 320 can be 90 degrees, for example, the angle formed between L2 and L4 can be 45 degrees.

An angle formed between L1 and L3 can be equal to half of the angle formed between adjacent second arcuate regions 311B. In the example shown in FIG. 7, the angle between adjacent second arcuate regions 311B can be 90 degrees; so, the angle formed between L1 and L3 can be 45 degrees. Because the angle formed between L2 and L4 can be equal to the angle formed between L1 and L3, the offset angle between L3 and L4 can be equal to the offset angle between L1 and L2. That is, the offset angle between L3 and L4 can be equal to the start up angle Q.

Positions of the first arcuate region 311A and/or the second arcuate region 311B relative to the selected tooth body 320 can determine the start up angle Q. The start up angle Q advantageously can be within a predetermined range of angles to enable movement of the rotor 200 to initiate bi-directionally relative to the selected tooth body 320 upon energizing the winding 330. Stated somewhat differently, the start up angle Q advantageously can be selected to be within a predetermined range of angles to enable the rotor 200 to move in any direction relative to the selected tooth body 320 upon energizing the winding 330.

For example, the start up angle Q can be selected to enable the rotor 200 to initiate a rotation in a clockwise direction 121 relative to the selected tooth body 320 upon energizing the winding 330 in a first manner. Additionally and/or alternatively, the start up angle Q can be selected to enable the rotor 200 to initiate a rotation in a counter-clockwise direction 122 relative to the selected tooth body 320 upon energizing the winding 330 in a second manner. In other words, a selected start up angle Q can enable the rotor 200 to initiate a rotation in one direction selected from the clockwise direction 121 and the counter-clockwise direction 122. The selected direction can be determined by the manner of energizing the winding 330.

For example, when the winding 330 is not energized, the start up angle Q can range from 45 to 135 degrees electrical angle. When the start up angle Q is in the range from 45 to 135 degrees electrical angle, the rotor 200 can have good startup reliability in the clockwise direction 121 and the counter-clockwise direction 122.

The electrical angle can refer to a geometric angle (and/or a mechanical angle) multiplied by a number of pairs of magnetic poles 210. For example, FIG. 7 shows the stator 300 as including four tooth bodies 320 (or two pairs of tooth bodies 320) that are evenly spaced in the circumferential direction of the first stator portion 310. Since the number of pairs of magnetic poles 210 is two, the start up angle Q ranging from 45 to 135 degrees electrical angle can correspond to the mechanical angle ranging from 22.5 degrees to 67.5 degrees.

Further, when the winding 330 is not energized, the start up angle Q can range from 60 to 80 degrees electrical angle. When the start up angle Q is in the range of 60 to 80 degrees electrical angle, the rotor 200 can be capable of being started very easily in one direction. Stated somewhat differently, when the start up angle Q is in the range of 60 to 80 degrees electrical angle, the rotor 200 can be capable of being started more easily in one direction than in the other direction but can still have good startup reliability in the clockwise direction 121 and the counter-clockwise direction 122.

For example, when the start up angle Q is in the range of 60 to 80 degrees electrical angle from an upstream tooth body 320 in the clockwise direction 121, the rotor 200 is capable of being started very easily in the counter-clockwise direction 122. When the start up angle Q is in the range of 60 to 80 degrees electrical angle from an upstream tooth body 320 in the counter-clockwise direction 122, the rotor 200 is capable of being started very easily in the clockwise direction 121.

Therefore, the rotor 200 can have a capability of starting either of two different rotations. For example, a first rotation of the rotor 200 can initiate in the clockwise direction 121 relative to the central axis 110. A second rotation of the rotor 200 can initiate in the counter-clockwise direction 122 relative to the central axis 110.

Although FIG. 7 shows the number of the first arcuate regions 311A and/or second arcuate regions 311B as being equal to the number of the magnetic poles 210, the number of first arcuate regions 311A and/or second arcuate regions 311B can be equal to, and/or different from, the number of the magnetic poles 210.

Any suitable method can be used to provide the first interaction between the first arcuate region 311A and the selected magnetic pole 210 that is different from the second interaction between the second arcuate region 311B and the selected magnetic pole 210.

For example, the first arcuate region 311A and second arcuate region 311B can differ geometrically. The first and second arcuate regions 311A, 311B, in other words, can be formed with different geometries (or shapes). Therefore, a first distance between the first arcuate region 311A and the selected magnetic pole 210 can be less than a second distance between the second arcuate region 311B and the selected magnetic pole 210. A difference between the first and second distances can result in the first attractive force between the first arcuate region 311A and the selected magnetic pole 210 being stronger than the second attractive force between the second arcuate region 311B and the selected magnetic pole 210.

Figure 8A:
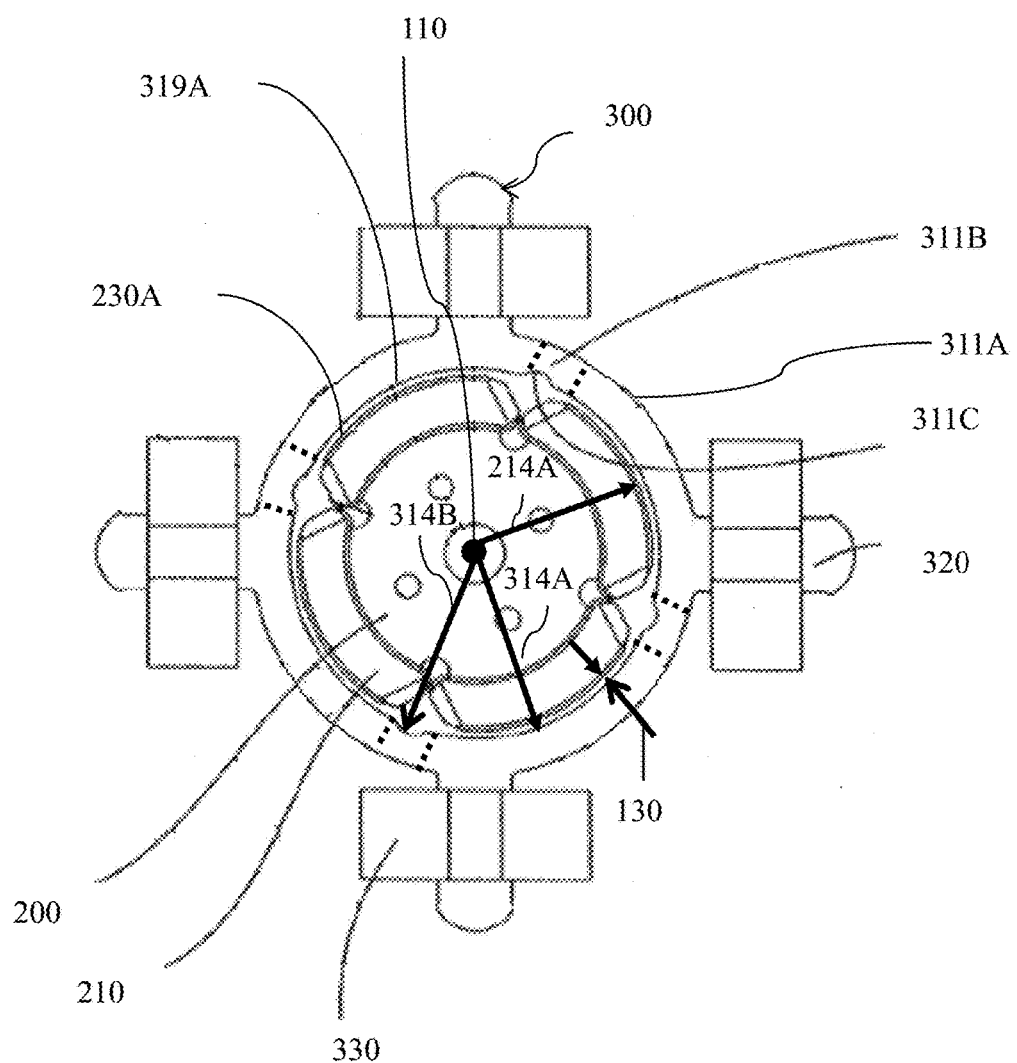
FIG. 8A is an exemplary detail drawing illustrating an alternative embodiment of the motor of FIG. 7, wherein the second arcuate region defines a recess in the stator.

FIG. 8A is an exemplary detail drawing illustrating an alternative embodiment of the motor 100. In FIG. 8A, the first arcuate region 311A and the second arcuate region 311B (indicated by dashed lines) can have different geometries. The first arcuate region 311A and the second arcuate region 311B can form a homogeneous structure made of the same material. As shown in FIG. 8A, the first arcuate region 311A can have a first stator radius 314A from the central axis 110. The first stator radius 314A can be a distance between the central axis 110 and the first surface 319A of the first arcuate region 311A. The first stator radius 314A is shown as being uniform about the central axis 110.

As shown in FIG. 8A, the rotor 200 can have a first surface 230A that is proximal to the stator 300. A selected magnetic pole 210 of the rotor 200 of FIG. 8A can have a first rotor radius 214A from the central axis 110. The first rotor radius 214A can be a distance between the central axis 110 and the first surface 230A of the rotor 200. The first rotor radius 214A can be uniform and/or different about a circumference of the rotor 200. For example, FIG. 8A shows the first rotor radius 214A as being uniform about the central axis 110.

An air gap 130 can be defined between the rotor 200 and the first stator portion 310. The air gap 130 can be formed between the circumference of the rotor 200 and the circumference of the stator 300. A width of the air gap 130 in the radial direction can be equal to a difference between the first stator radius 314A and the first rotor radius 214A. A width of the air gap 130 can be uniform and/or different about the circumference of the rotor 200.

The air gap 130 adjacent to the first arcuate region 311A can be uniform. The air gap 130 being 'uniform' can refer to the first surface 319A being disposed at a uniform distance about the central axis 110. Stated somewhat differently, the first surface 319A of the stator 300 and the rotor 200 can be coaxial about the central axis 110. Thus, the first arcuate region 311A can exert a uniform magnetic force on a selected magnetic pole 210. By providing the motor 100 with the uniform air gap 130, a cogging torque of the motor 100 advantageously can be reduced.

The second arcuate region 311B can have a second stator radius 314B about the central axis 110. The second stator radius 314B can be a distance between the central axis 110 and the first surface 319A of the second arcuate region 311B. The second stator radius 314B can be a fixed (or constant) radius or a variable radius. The second stator radius 314B can be greater than, less than, and/or equal to, the first stator radius 314A. FIG. 8A shows the second stator radius 314B as being greater than the first stator radius 314A. The second arcuate region 311B can define a recess 311C. The size of the air gap 130 adjacent to the second arcuate region 311B can be greater than the size of the air gap 130 adjacent to the first arcuate region 311A due to the difference between the second stator radius 314B and the first stator radius 314A.

Thus, when the winding 330 is not energized, the first interaction between the first arcuate region 311A and the selected magnetic pole 210 can be greater than the second interaction between the second arcuate region 311B and the selected magnetic pole 210. The rotor 200 can thus be drawn to the start up position.

Figure 8B:
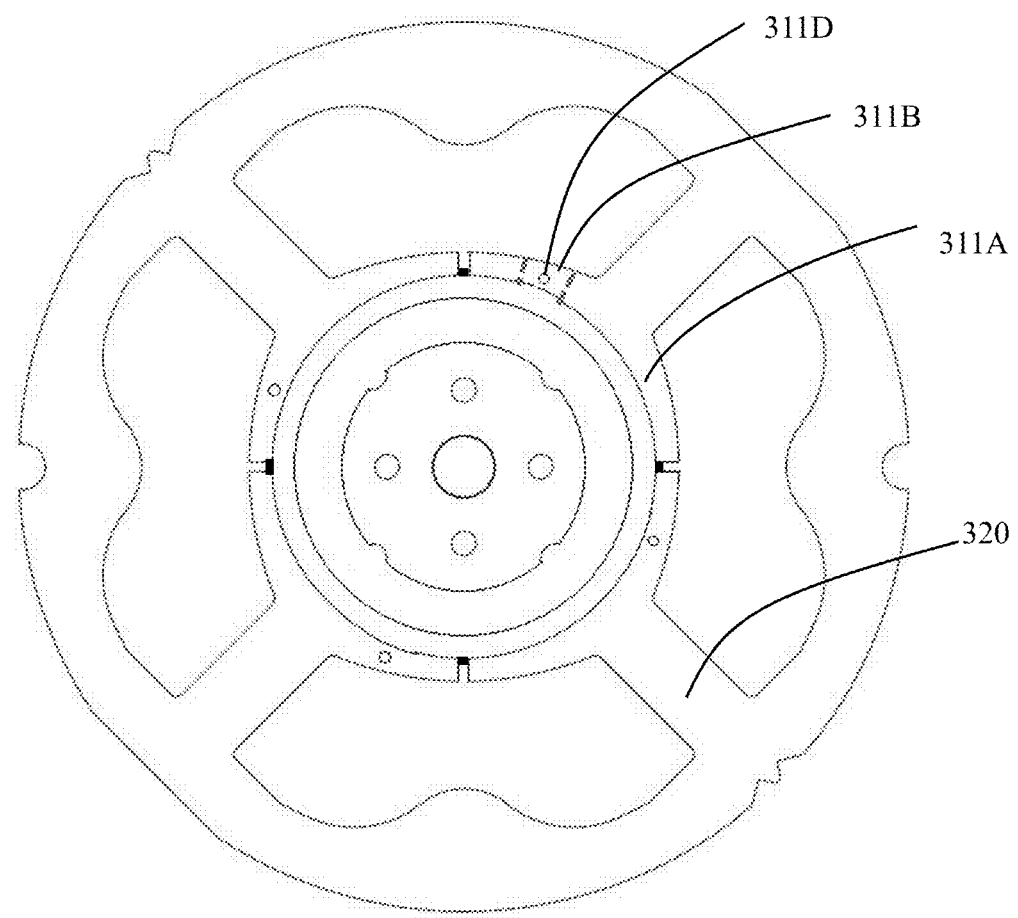
FIG. 8B is an exemplary detail drawing illustrating an alternative embodiment of the motor of FIG. 8A, wherein the second arcuate region defines a hole in the stator.

Alternatively, the second arcuate region 311B can define a hole 311D there within, as shown in FIG. 8B. The hole 311D is preferably located between the circumferential inner surface and circumferential outer surface of the second arcuate region 311B and covered by the inner surface and therefore may be referred as a hidden hole. The circumferential inner surface of the first arcuate region 311A has a first radius uniform about the central axis, the circumferential inner surface of the second arcuate region 311B has a second radius uniform about the central axis. In this embodiment, the first radius is equal to the second radius. The hole 311D can partly or completely extend through the axial length of the second arcuate region 311B.

Additionally and/or alternatively, the first material of the first arcuate region 311A can have a magnetic property, such as a magnetic permeability and/or a magnetic susceptibility, that is different from a magnetic property of the second material of the second arcuate region 311B. In one embodiment, the first material can have a magnetic permeability and/or magnetic susceptibility that is greater than a magnetic permeability and/or magnetic susceptibility of the second material. Thus, the first arcuate region 311A and the second arcuate region 311B can be magnetized differently under a magnetic field generated by the selected magnetic pole 210 even if the first and second arcuate regions 311A, 311B have the same geometry. Thereby, the selected magnetic pole 210 can be more strongly attracted to the first arcuate region 311A than to the second arcuate region 311B. Accordingly, positions of the first arcuate region 311A and the second arcuate region 311B relative to a selected tooth body 210 can determine the start up position of the selected magnetic pole 210 relative to a selected tooth body 320.

Figure 9:
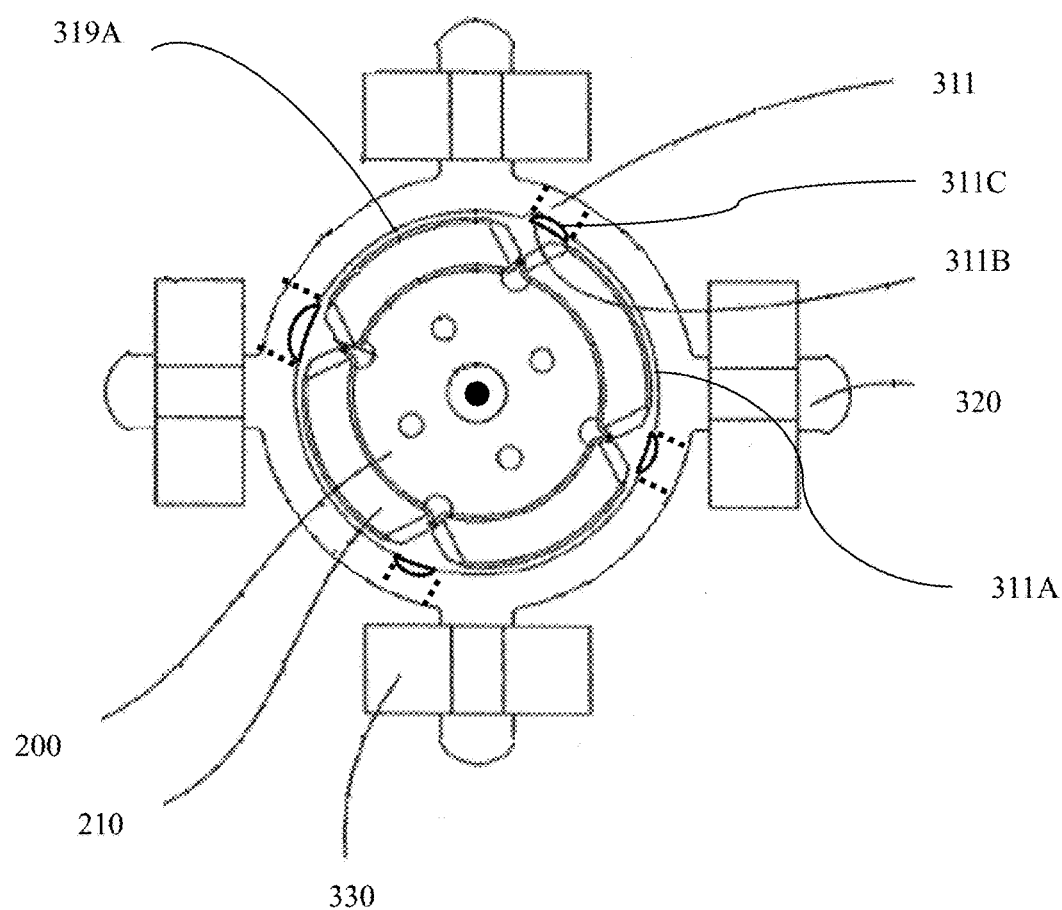
FIG. 9 is an exemplary detail drawing illustrating another alternative embodiment of the motor of FIG. 7, wherein the first and second arcuate regions are made of different materials.

FIG. 9 is an exemplary detail drawing illustrating another alternative embodiment of the motor 100. The first arcuate region 311A and the second arcuate region 311B as shown in FIG. 9 can be respectively made of different materials.

The first arcuate region 311A can be made of a first material. The second arcuate region 311B can be at least partially made of a second material that is different from the first material. In one example, the second arcuate region 311B can be formed from the first material including the recess 311C shown in FIG. 9, and the recess 311C can be partially or completely filled with the second material. In another example, the second arcuate region 311B can be completely formed from the second material.

When the recess 311C is completely filled with the second material, the first surface 319A of the first and second arcuate region 311A, 311B can have a uniform distance from the central axis 110. Stated somewhat differently, geometries of the first and second arcuate region 311A, 311B can be the same.

The first material can have a magnetic permeability and/or magnetic susceptibility that differ from a magnetic permeability and/or magnetic susceptibility of the second material. For example, the second material can have a magnetic permeability that is less than a magnetic permeability of the first material. In a non-limiting example, the first material can include a soft ferromagnetic material, and the second material can include a diamagnetic material.

Therefore, the first arcuate region 311A and the second arcuate region 311B can have different geometries and/or be made of different materials to make the first interaction between the first arcuate region 311A and the selected magnetic pole 210 differ from the second interaction between the second arcuate region 311B and the selected magnetic pole 210.

For example, the second material can partially fill and/or over fill the recess 311C. The first surface 319A of the first and second arcuate region 311A, 311B thereby can have different distances from the central axis 110. The second arcuate region 311B can thus have a geometry that is different from a geometry of the first arcuate region 311A. In addition, the first arcuate region 311A and the second arcuate region 311B can be made of different materials.

Figure 10:
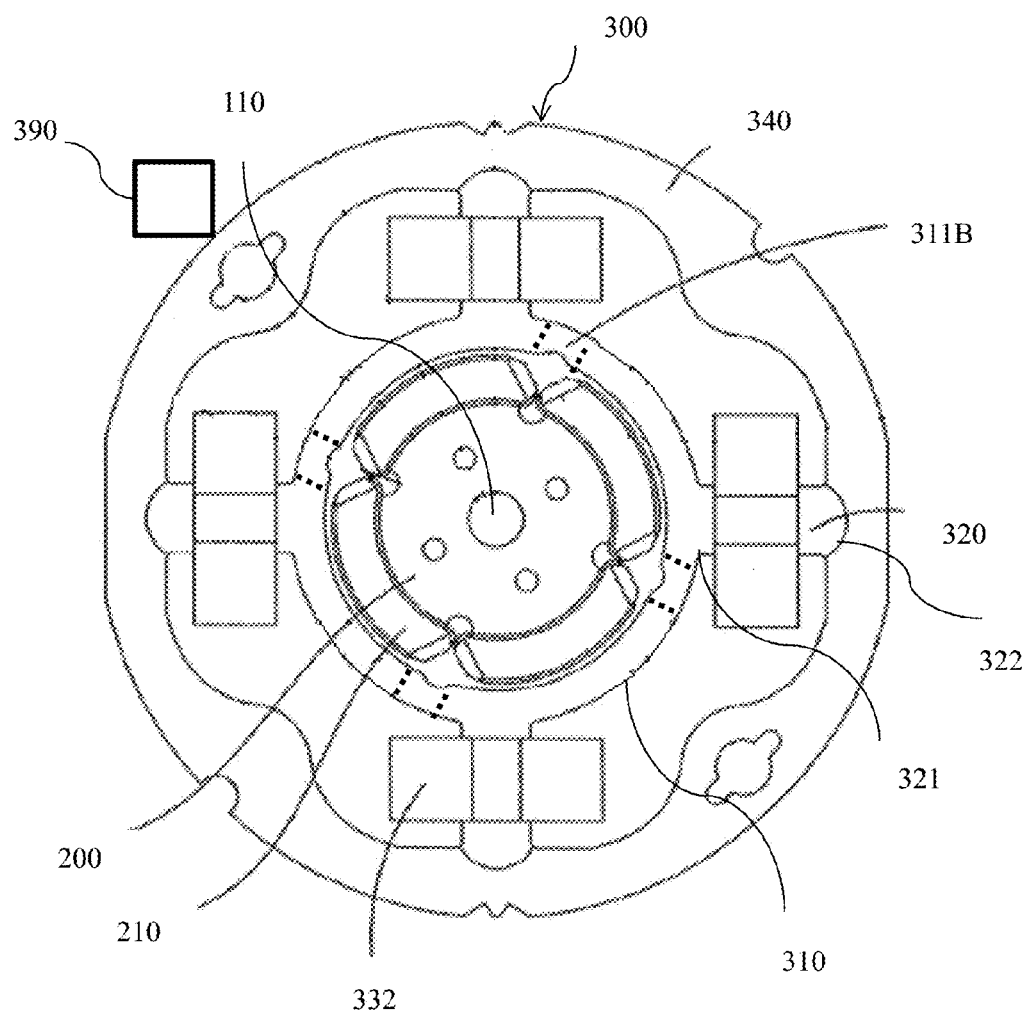
FIG. 10 is an exemplary diagram illustrating another alternative embodiment of the motor of FIG. 5, wherein the stator includes a second stator portion.

FIG. 10 is an exemplary diagram illustrating another alternative embodiment of the motor 100. FIG. 10 shows the stator 300 as including a second stator portion 340. The second stator portion 340 is shown as being concentrically arranged about the first concentric portion 310. At least one tooth body 320 can be disposed between the first stator portion 310 and the second stator portion 340. Advantageously, the first stator portion 310 and the second stator portion 340 can be coupled via the tooth body 320. The second stator portion 340 can protect the tooth bodies 320, the coils 332, and/or the first stator portion 310. Additionally and/or alternatively, the second stator portion 340 can prevent the coil 332 from moving along the tooth body 320 and/or separating from the tooth body 320.

As illustrated in FIG. 10, at least one tooth body 320 can include a first end region 321 and a second end region 322 opposite the first end region 321. The first end region 321 and the second end region 322 can be coupled with the first stator portion 310 and the second stator portion 340, respectively. Thereby, the first stator portion 310 can be disposed between the second stator portion 340 and the rotor 200.

The tooth body 320, the first stator portion 310, and/or the second stator portion 340 can be formed separately and/or integrally. For example, at least one (or all) of the tooth bodies 320 and the first stator portion 310 can be formed together as one piece. Additionally and/or alternatively, at least one (or all) of the tooth bodies 320 and the second stator portion 340 can be formed together as one piece. Additionally and/or alternatively, at least one (or all) of the tooth bodies 320 can be separately formed with respect to the first stator portion 310 and/or the second stator portion 340.

Additionally and/or alternatively, the motor 100 can include a Hall sensor 390. The Hall sensor 390 can be installed at a predetermined position relative to the rotor 200. During operation of the motor 100, the Hall sensor 390 can measure a polarity of a selected magnetic pole 210 adjacent to the Hall sensor 390. The measured polarity can advantageously indicate polarity for energizing the stator 300 in order to initiate movement of the rotor 200. FIG. 10 shows the Hall sensor 390 as being mounted to the second stator portion 340 and being separated from the first stator portion 310 by the second stator portion 340. However, the Hall sensor 390 can be installed at any other suitable position relative to the rotor 200.

Figure 11:
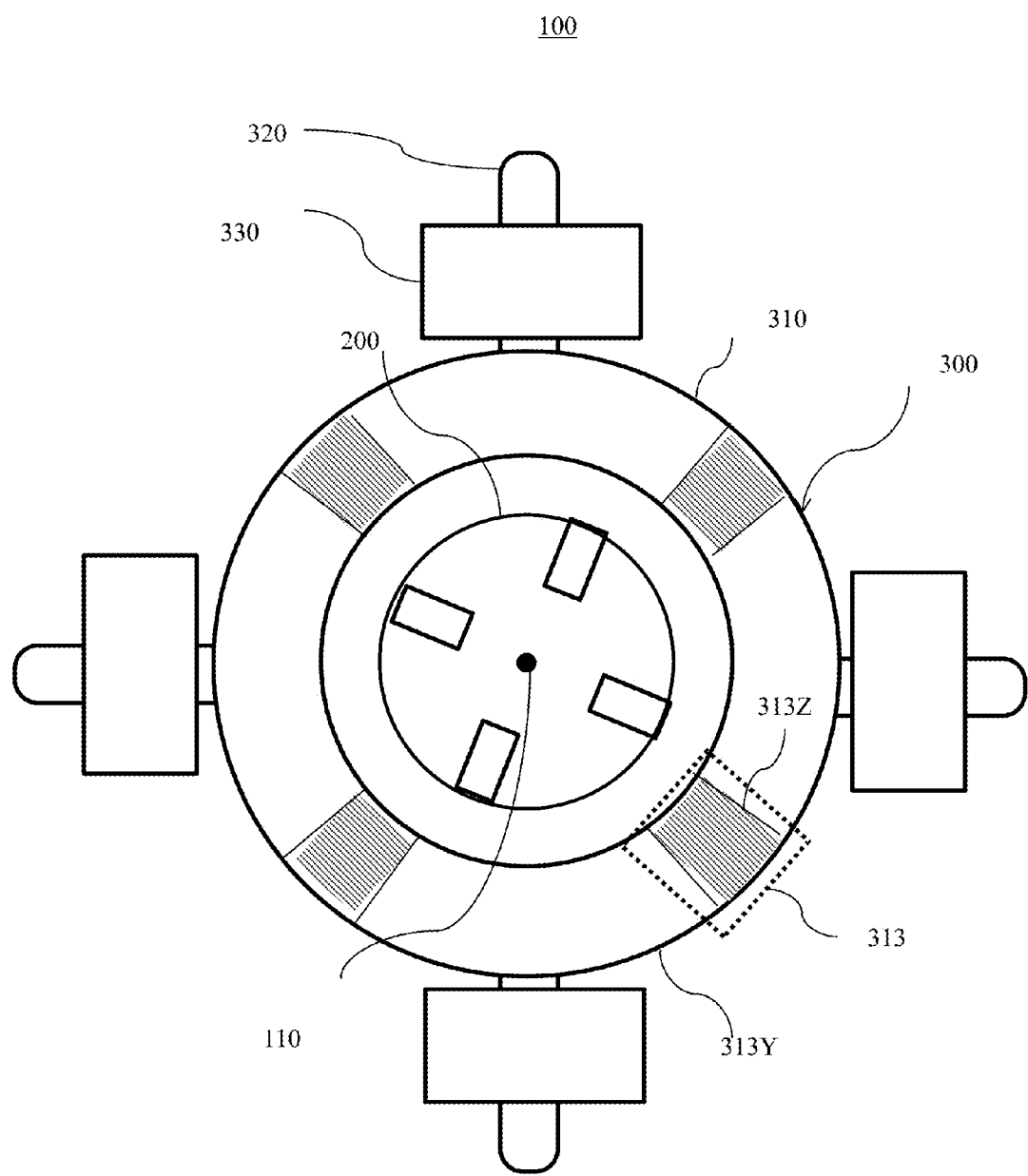
FIG. 11 is an exemplary diagram illustrating another alternative embodiment of the motor of FIG. 5, wherein the stator includes a magnetic bridge.

Advantageously, the motor 100 can include one or more magnetic bridges 313. FIG. 11 is an exemplary diagram illustrating another alternative embodiment of the motor 100. As shown in FIG. 11, the first stator portion 310 can include a magnetic bridge 313 (indicated by dashed lines). The magnetic bridge 313 can be disposed between two adjacent tooth bodies 320. In other words, a segment of the first stator portion 310 between the two adjacent tooth bodies 320 can form the magnetic bridge 313. When energized, the winding 330 can generate magnetic flux in the tooth bodies 320 and/or the first stator portion 310. The magnetic bridge 313 can block the magnetic flux generated by the winding 330 and push the magnetic flux toward the rotor 200 shown in FIG. 5.

For example, upon being energized, the winding 330 can magnetize the two adjacent tooth bodies 320 in a manner that produces magnetic fields with opposite polarities, respectively. The magnetic flux thereby can be formed in a circumferential direction in the first stator portion 310.

Compared with magnetic flux formed in a circumferential direction, the magnetic flux formed in a radial direction can result in coupling between the rotor 200 and the first stator portion 310 and thereby can direct the motor 100 (shown in FIG. 5) to operate more efficiently. The magnetic bridge 313 can include an arcuate segment 313Z of the first stator portion 310 formed between two adjacent tooth bodies 320. The magnetic bridge 313 can increase a magnetic reluctance of the first stator portion 310. In other words, the magnetic bridge 313 can have a greater magnetic reluctance than an adjacent arcuate segment 313Y of the first stator portion 310.

Although FIG. 11 shows the number of the magnetic bridges 313 as being equal to the number of the tooth bodies 320, the number of the magnetic bridges 313 can be equal to, and/or different from, the number of the tooth bodies 320. When the number of the magnetic bridges 313 is equal to the number of the tooth bodies 320, a magnetic bridge can be formed between each pair of adjacent tooth bodies 320 so the magnetic flux can advantageously be formed in a radial direction between the pairs of adjacent tooth bodies 320.

Figure 12:
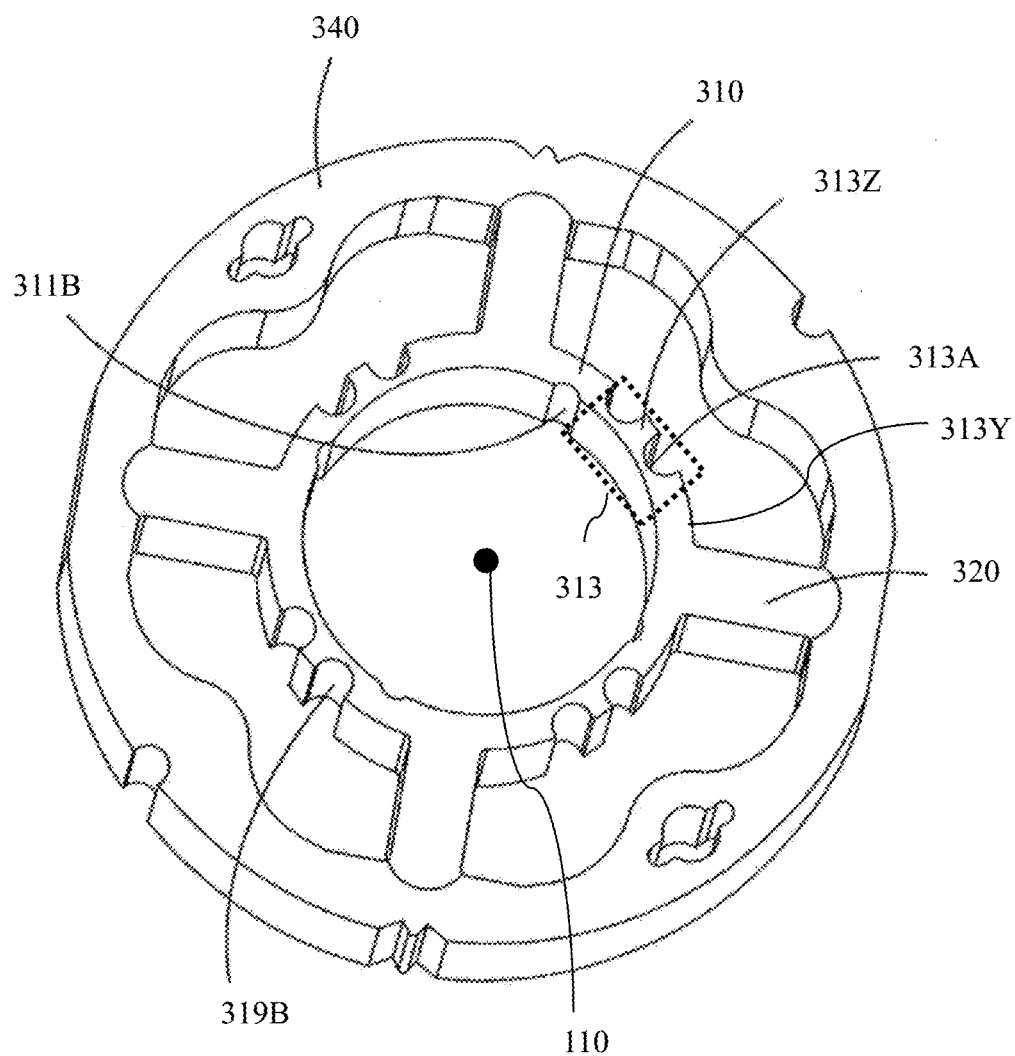
FIG. 12 is an exemplary detail drawing illustrating an alternative embodiment of the magnetic bridge of FIG. 11, wherein the stator defines two grooves as a part of the magnetic bridge.

The magnetic bridge 313 can have any predetermined shape and/or size. For example, the magnetic bridge 313 can have a radial width that is less than a radial width of another arcuate segment of the first stator portion 310. As a result, the magnetic flux passing in the circumferential direction in the first stator portion 310 can be reduced. Turning to FIG. 12, the magnetic bridge 313 (indicated by dashed lines) can include the arcuate segment 313Z of the first stator portion 310. The arcuate segment 313Z can define one or more grooves 313A. The grooves 313A can have a predetermined shape formed on the surface 319B of the first stator portion 310. By being formed on the surface 319B of the first stator portion 310 opposite the rotor 200, the magnetic bridge 313 advantageously can have a negligible impact on the start up position of the rotor 200 (not shown).

The magnetic bridge 313 can be formed from the same material as the adjacent arcuate segment 313Y of the first stator portion 310. As shown in FIG. 12, the magnetic bridge 313 can include two grooves 313A. Each groove 313A can have an arc shape in a plan view of the stator 300 as can be seen in FIG. 12. However, the magnetic bridge 313 can be constructed to have any other predetermined shape (and/or size) and/or be made of any other predetermined materials. The shape (and/or size) of the magnetic bridge 313 in the plan view of the stator 300 can be referred as a cross sectional shape of the magnetic bridge 313 viewed in a direction of the central axis 110.

In the plan view of the stator 300, the magnetic bridge 313 can form any predetermined number of grooves 313A with any predetermined size, shape and/or dimension, such as a rectangular shape, an arc shape, a square shape, a triangular shape, a polygonal shape, or a combination thereof. The size, shape and/or dimension of the grooves 313A can be preferably uniformed, but can be different. Each groove 313A preferably at least partially, and/or entirely, traverses the first stator portion 310 in an axial direction.

Figure 13:
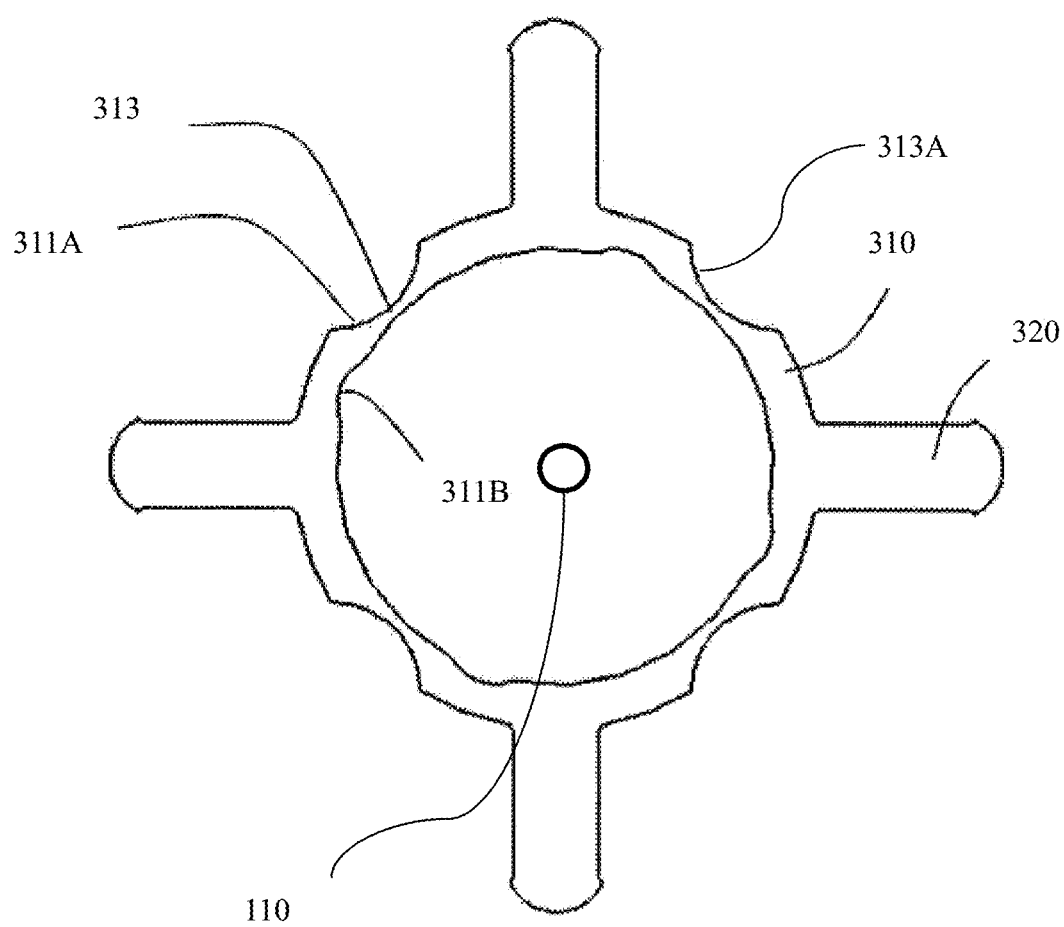
FIG. 13 is an exemplary detail drawing illustrating another alternative embodiment of the magnetic bridge of FIG. 11, wherein the stator defines one groove as a part of the magnetic bridge.

FIG. 13 is an exemplary detail drawing illustrating an alternative embodiment of the magnetic bridge 313. FIG. 13 shows the magnetic bridge 313 as defining one groove 313A. Stated somewhat differently, the stator 300 can define a groove 313A as a part of the magnetic bridge 313. The groove 313A can have an arc shape in the plan view of the stator 300.

Figure 14:
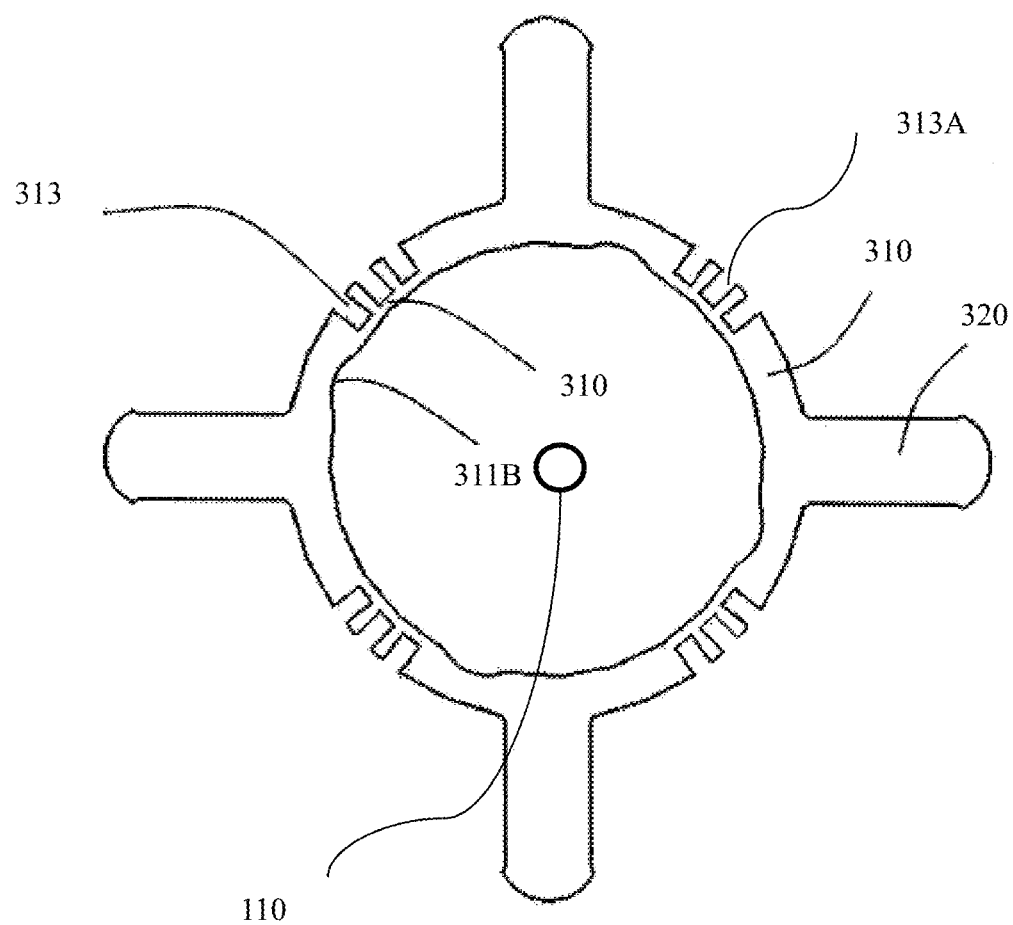
FIG. 14 is an exemplary detail drawing illustrating another alternative embodiment of the magnetic bridge of FIG. 11, wherein the stator defines three grooves as a part of the magnetic bridge.

FIG. 14 is an exemplary detail drawing illustrating another alternative embodiment of the magnetic bridge 313. FIG. 14 shows the magnetic bridge 313 as including three grooves 313A each having a rectangular shape on the projection plane vertical to the central axis 110.

Additionally and/or alternatively, one or more magnetic bridge 313 can be at least partially formed from a material that is different from a material of the adjacent arcuate segment 313Y (shown in FIG. 11) of the first stator portion 310. For example, a filler material can be disposed in one or more grooves 313A.

The filler material can comprise a material that is different from a material of the first stator portion 310 adjacent to the magnetic bridge 313. The filler material, for example, can have a magnetic permeability and/or susceptibility that is less than a magnetic permeability and/or susceptibility of the material of the adjacent arcuate segment 313Y of the first stator portion 310. For example, the filler material can include a non-magnetic material. The filler material can include a material that is not ferromagnetic and/or paramagnetic. An exemplary non-magnetic material can include a non-ferrous material, aluminum, non-ferrous alloys, carbon, copper, plastic, and/or the like.

Figure 15:
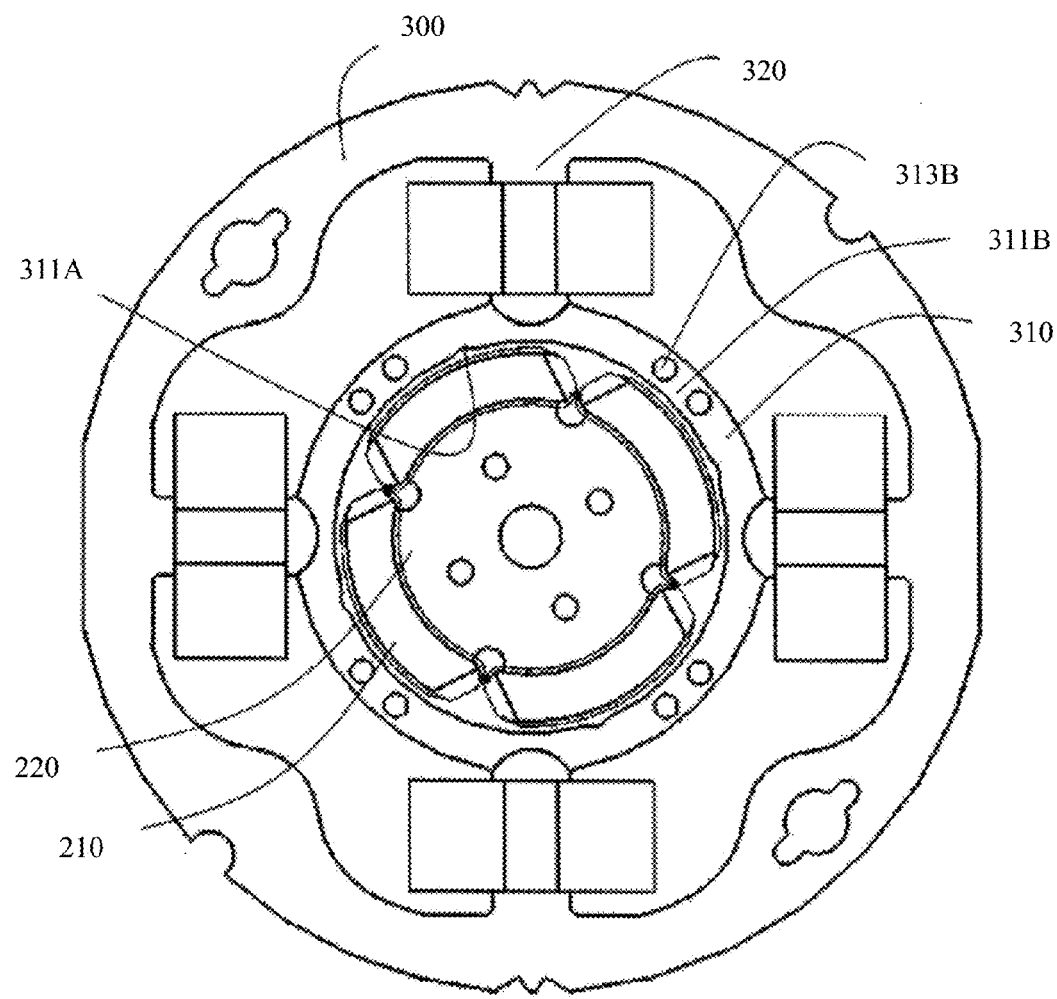
FIG. 15 is an exemplary detail drawing illustrating another alternative embodiment of the magnetic bridge of FIG. 11, wherein the stator defines an aperture as a part of the magnetic bridge.

Additionally and/or alternatively, one or more magnetic bridges 313 can include an arcuate segment in which the first stator portion 310 defines one or more apertures. FIG. 15 is an exemplary detail drawing illustrating another alternative embodiment of the magnetic bridge 313. Turning to FIG. 15, each magnetic bridge 313 is shown as including two apertures 313B at least partially formed through the first stator portion 310 in an axial direction. In effect, the apertures 313B can reduce a radial width of the first stator portion 310 that forms the magnetic bridge 313. Although shown and described as including two apertures 313B for purposes of illustration, the magnetic bridge 313 can include any predetermined number of apertures 313B. Further, when the apertures 313B are formed partially through the first stator portion 310, the apertures 313B may be visible and/or invisible on the surface of the first stator portion 310 to a human eye. That is, the apertures 313B can be defined as voids formed inside the first stator portion 310. Optionally, the aperture 313B can be at least partially filled with the filler material.

Figure 16:
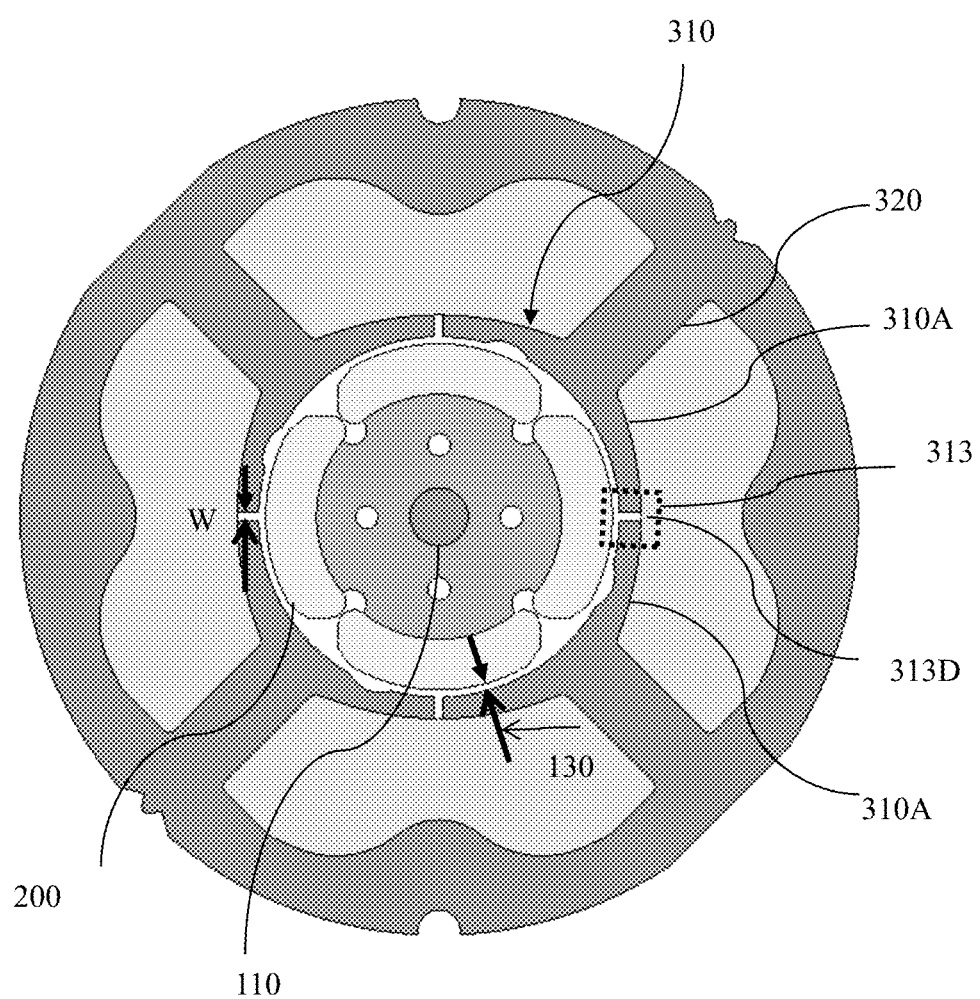
FIG. 16 is an exemplary detail drawing illustrating another alternative embodiment of the magnetic bridge of FIG. 11, wherein the stator defines a slot as a part of the magnetic bridge.

Additionally and/or alternatively, the first stator portion 310 can form a slot as a part of the magnetic bridge 313. FIG. 16 is an exemplary detail drawing illustrating another alternative embodiment of the magnetic bridge 313. FIG. 16 shows the first stator portion 310 as forming a slot 313D as a part of the magnetic bridge 313.

FIG. 16 shows the first stator portion 310 as including a plurality of separate stator members 310A. Each stator member 310A is shown as being connected with a respective tooth body 320 and being disposed adjacent to another stator member 310A. Each pair of the adjacent stator members 310A forms the slot 313D therebetween. The slot 313D can at least partially separate the two adjacent stator members 310A.

The slot 313D can have a circumferential width W of any predetermined size, shape and/or dimension. The air gap 130 can have a non-uniform width about a circumference of the rotor 200. That is, the motor 100 can have a minimum air gap and/or a maximum air gap. In one example, a ratio of the circumferential width W of the slot 313D to the width of the minimum air gap 130 can range from zero to four. Advantageously, the slot 313D can be sufficiently small to maintain an overall uniformity of the air gap 130 and accordingly maintain uniformity of magnetic flux in the radial direction in the air gap 130.

Figure 17:
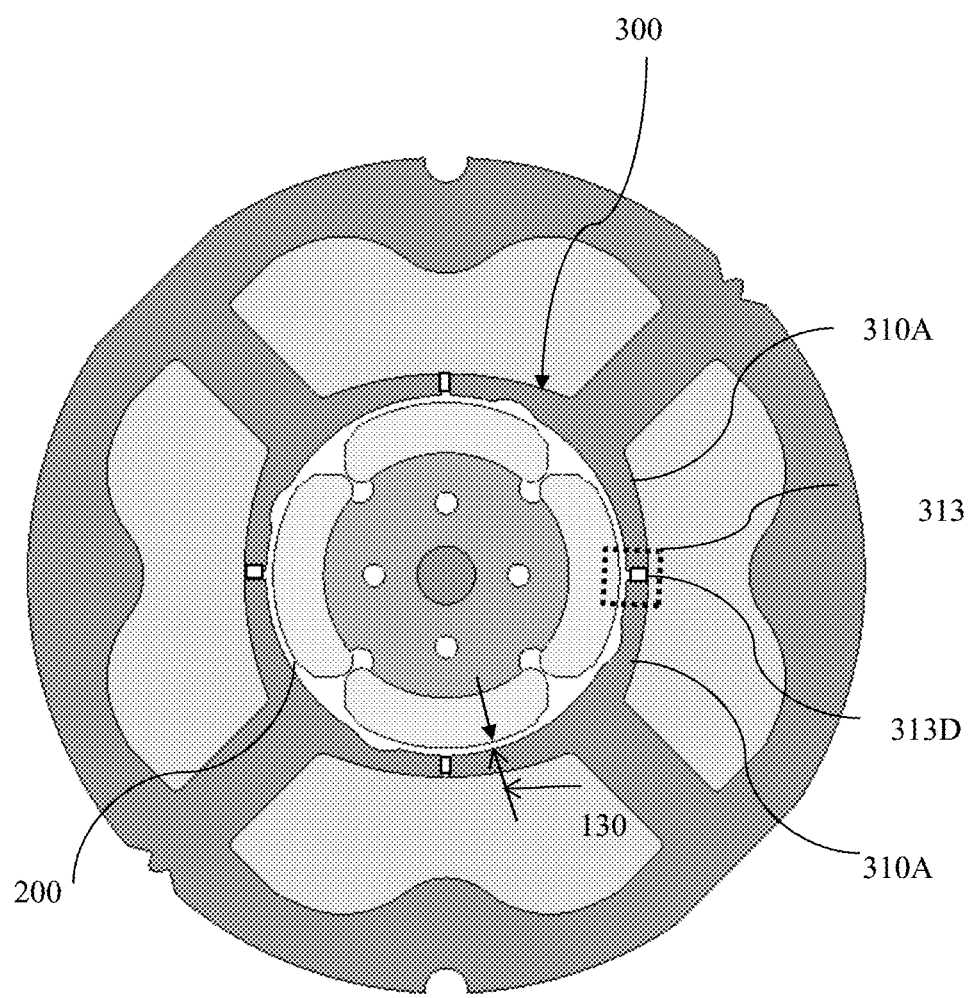
FIG. 17 is an exemplary detail drawing illustrating another alternative embodiment of the magnetic bridge of FIG. 16, wherein the slot is at least partially filled with a filler material.

FIG. 17 is an exemplary detail drawing illustrating an alternative embodiment of the magnetic bridge 313. As shown in FIG. 17, the stator 300 can form the slot 313D as a part of the magnetic bridge 313. The slot 313D is shown as being at least partially filled with the filler material. The slot can be partially and/or completely filled with the filler material.

FIGS. 12-17 show the magnetic bridges 313 of the stator 300 having a uniform shape and size. However, the shape, size, dimension, and/or material of one or more magnetic bridges 313 in the stator 300 can be uniform and/or different.

Selected performance characteristics of the motor 100 can be affected by the magnetic poles 210, the magnetic bridge 313, or a combination thereof. For example, changing size, shape, and/or dimension of the magnetic poles 210 and/or the magnetic bridges 313 can improve selected performance characteristics of the motor 100.

To illustrate effect of size, shape, and/or dimension of the magnetic poles 210 and/or the magnetic bridges 313 on characteristics of the motor 100, several embodiments are shown as follows. A figure of each embodiment of the motor 100 is followed by figures showing torque (that is, cogging torque and back electromotive force (back EMF) curves of the motor 100.

For example, the torque and/or the back EMF can be measured when the winding 330 (shown in FIGS. 6 and 7) is not energized. A shaft (not shown) can be installed at the central axis 110 (shown in FIGS. 6 and 7) of the rotor 200 (shown in FIGS. 6 and 7). During measurement, a pulling engine can drive the rotor 200 to rotate at a predetermined speed via controlling the shaft. The pulling engine can thus sense the torque on the shaft. Additionally and/or alternatively, the back EMF can be simultaneously obtained by measuring current in the coil 332 (shown in FIG. 6). The torque and the back EMF curves are shown as a function of the rotation angle of the rotor 200 relative to a selected tooth body 320.

Figure 18:
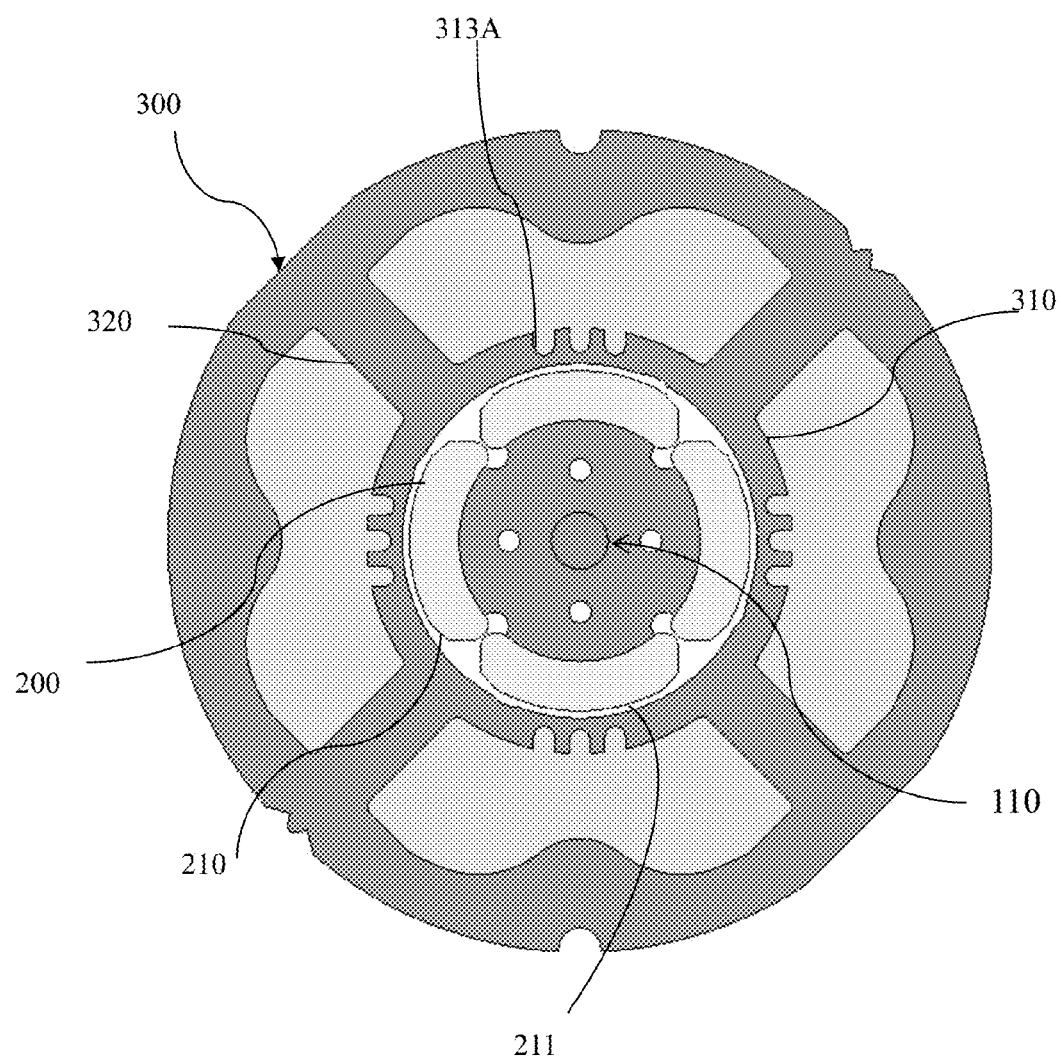
FIG. 18 is an exemplary detail drawing illustrating another alternative embodiment of the motor of FIG. 11, wherein the rotor includes a magnetic pole having an edge portion with a uniform distance from the central axis, and wherein the stator defines a plurality of grooves as a part of the magnetic bridge.

FIG. 18 is an exemplary detail drawing illustrating another alternative embodiment of the motor 100. FIG. 18 shows the rotor 200 as including magnetic poles 210 each having an edge region 211. The edge region 211 can disposed at a uniform distance from the central axis 110. As shown in FIG. 18, the magnetic bridge 210 can include the grooves 313A. In this embodiment, the edge region 211 is formed at the circumferential outer surface of the magnetic pole 210.

Figure 19:
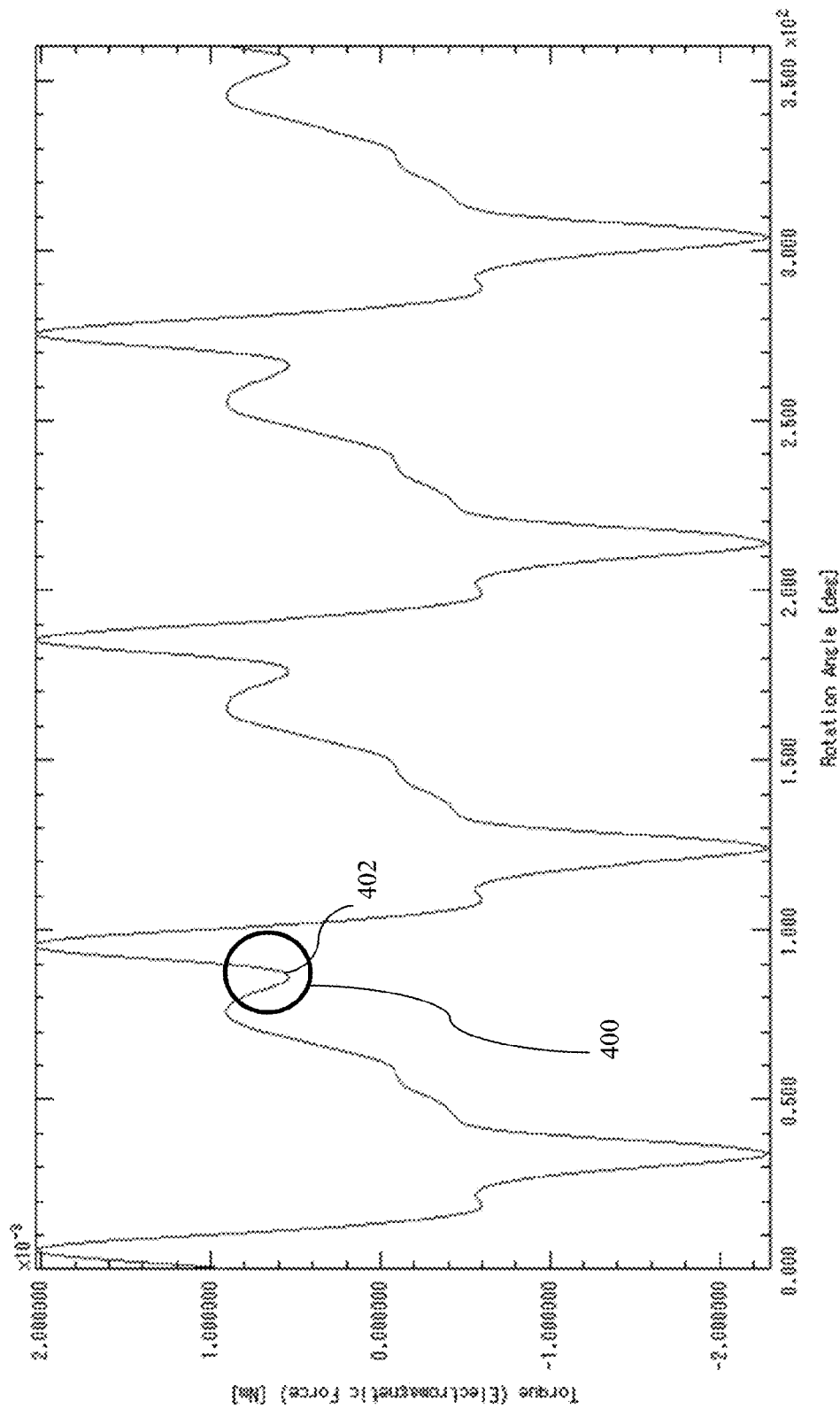
FIGS. 19-20 are exemplary plots respectively illustrating torque and back electromotive force for the motor of FIG. 18 as a function of rotation angle.

FIG. 19 is an exemplary plot illustrating torque of the motor 100 of FIG. 18 as a function of the rotation angle of the rotor 200. The torque curve is shown as having a wave form that is periodic. As shown in FIG. 19, the motor 100 has a local minimum torque 402 at a region 400. The local minimum torque 402 at the region 400 can be a possible dead point. The dead point can refer to a point along the torque curve at which the motor 100 is not able to initiate motion. The dead point can possibly be at least partially due to insufficient magnetic flux density in the radial direction.

Figure 20:
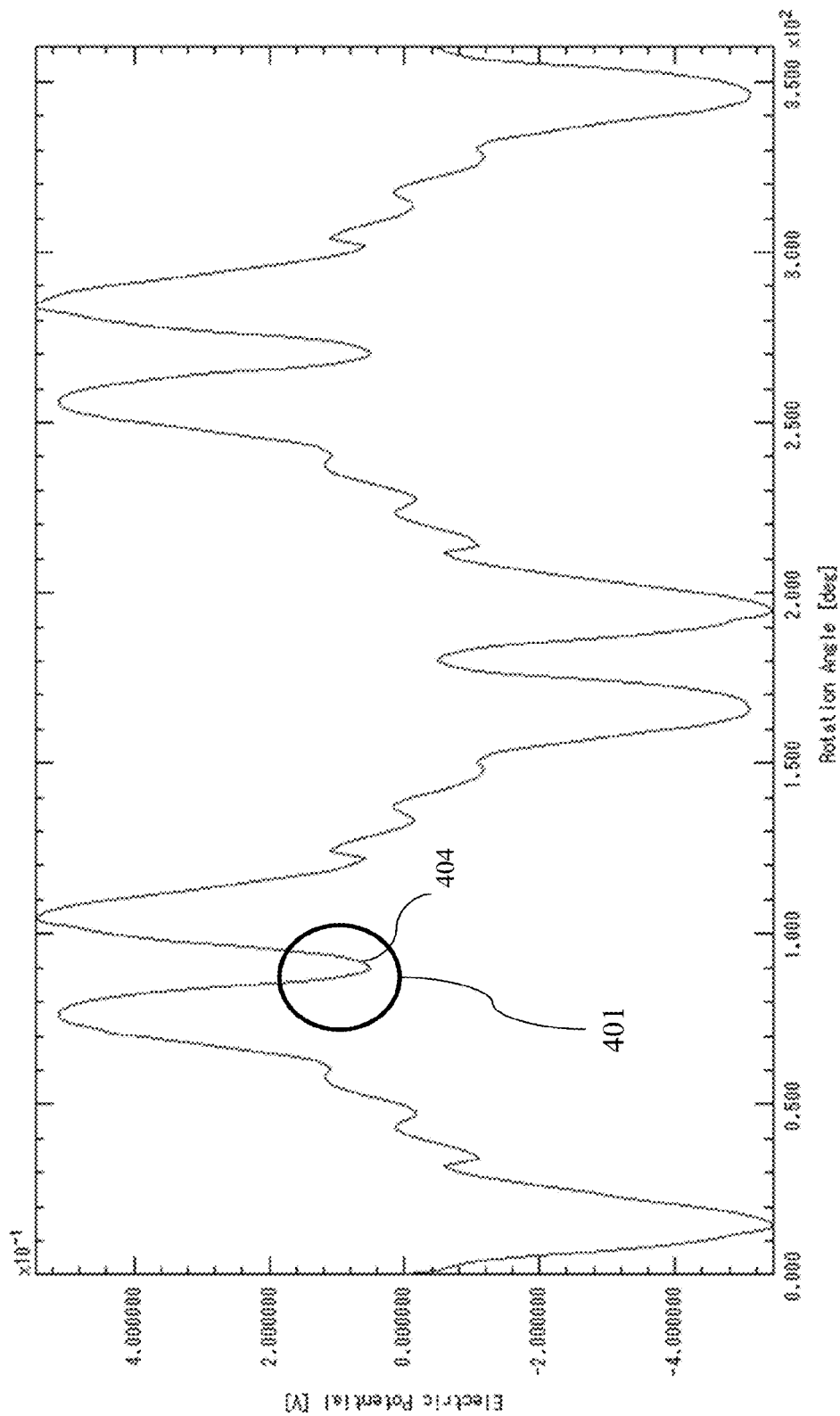

FIG. 20 is an exemplary plot illustrating a back EMF of the motor 100 of FIG. 18 as a function of the rotation angle of the rotor 200. The back EMF curve is shown as having a wave form that is periodic. As shown in FIG. 20, the motor 100 has a local minimum back EMF 404 at a region 401. A relation between the back EMF generated by the winding 330 (shown in FIG. 6) and a current I passing through the winding 330 can be quantized in accordance with Equation (1):

$$U-E=i*R+L(di/dt) \qquad \text{Equation (1)}$$

where U is power supply voltage, E is the back EMF, i is the current passing through the winding 330, L is an inductance of the winding 330, R is a resistance of the winding 330, and t is time. Therefore, at the region 401, (U−E) can be a significant value, which can result in the current i increasing rapidly. The rapidly increased current i can result in significant heat generation and energy waste and thus can be undesirable.

Figure 21:
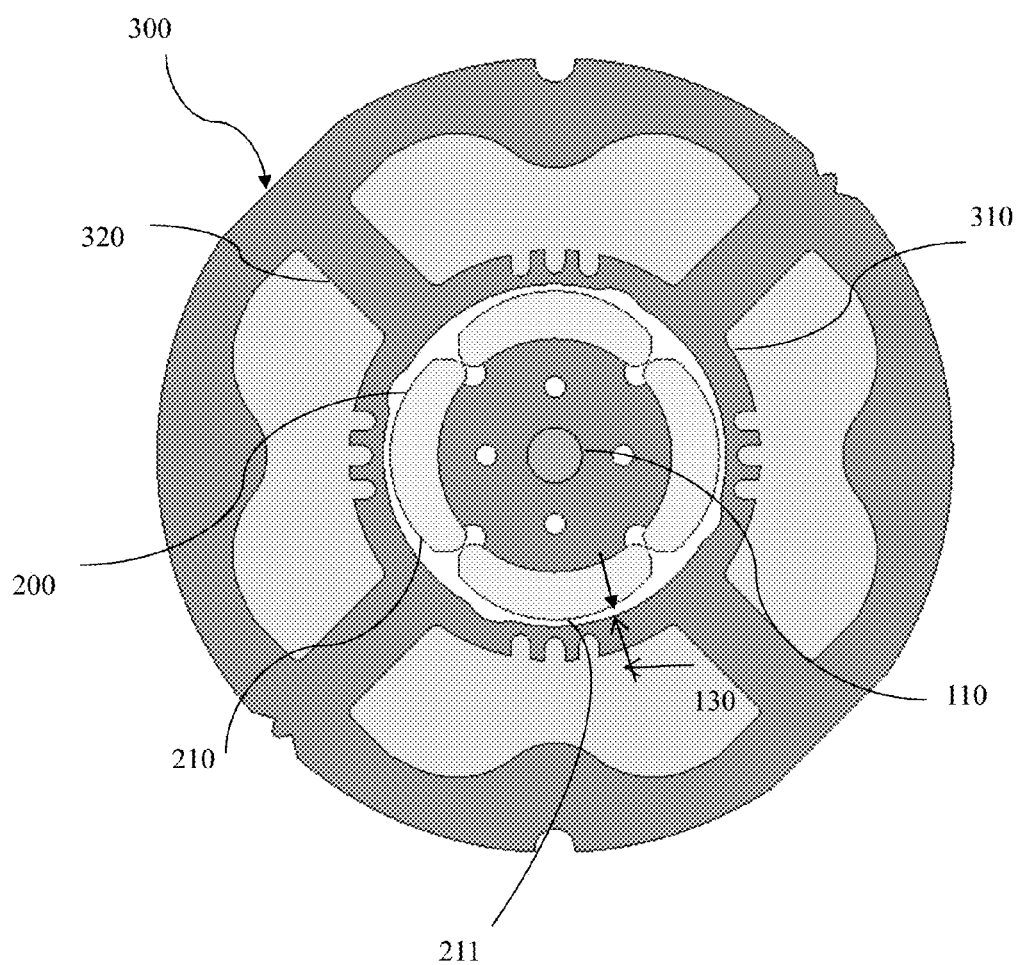
FIG. 21 is an exemplary detail drawing illustrating another alternative embodiment of the motor of FIG. 11, wherein the rotor includes a magnetic pole having an edge portion with a non-uniform distance from the central axis, and wherein the stator defines a plurality of grooves as a part of the magnetic bridge.

FIG. 21 is an exemplary detail drawing illustrating another alternative embodiment of the motor 100. As shown in FIG. 21, the magnetic pole 210 as having the edge region/circumferential outer surface 211 being disposed at a non-uniform distance from the central axis 110. In other words, the distance between the edge region 211 of the magnetic pole 210 and the central axis 110 can vary circumferentially from a central portion of the edge region 211 to an end portion of the edge region 211. The distance between the edge region 211 and the central axis 110 is shown as decreasing from the central portion of the edge region 211 to the end portion of the edge region 211. As a result, the air gap 130 can be smaller at the central portion of the edge region 211 than at the end portion of the edge region 211. For example, in a radial direction, a width of the air gap 130 at the end portion of the edge region 211 and a width of the air gap 130 at the central portion of the edge region 211 can have a ratio ranging from 5:1 to 1.5 to 1. Preferably the edge region 211 of each magnetic pole is symmetrical about a middle radial line of the magnetic pole 210.

Figure 22:
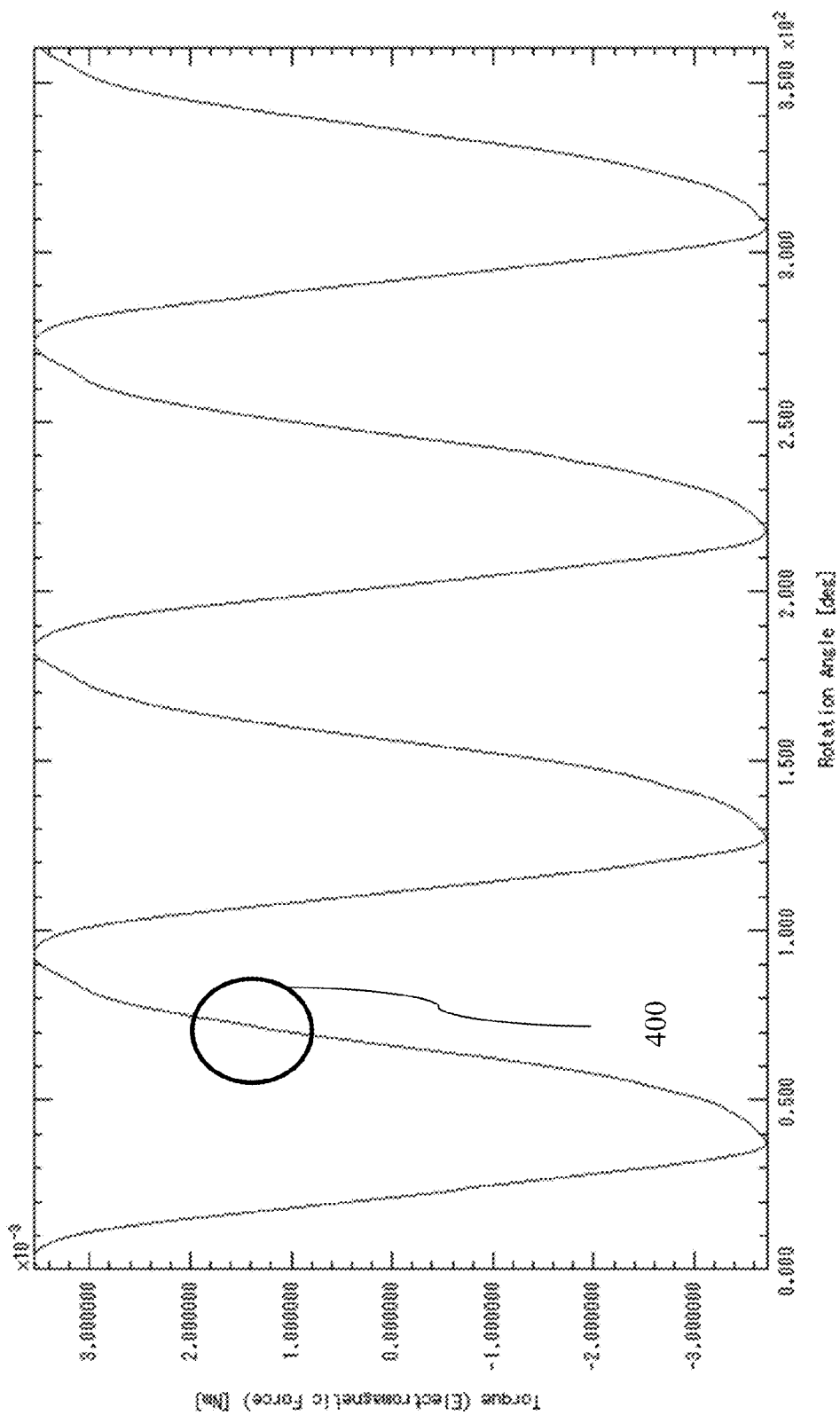
FIGS. 22-23 are exemplary plots respectively illustrating torque and back electromotive force for the motor of FIG. 21 as a function of rotation angle.

FIG. 22 is an exemplary plot illustrating torque of the motor 100 of FIG. 21. In FIG. 22, the region 400 is monotonic and no longer includes the local minimum 402 shown in FIG. 19. Therefore, FIG. 22 demonstrates that adjusting the shape, size, and/or dimension of the magnetic pole 210 can reduce and/or eliminate the possible dead point of FIG. 19. Removal of the dead point can possibly due to a change of magnetic flux density in the air gap 130 (shown in FIG. 21) due to change of the shape of the magnetic pole 210.

Figure 23:
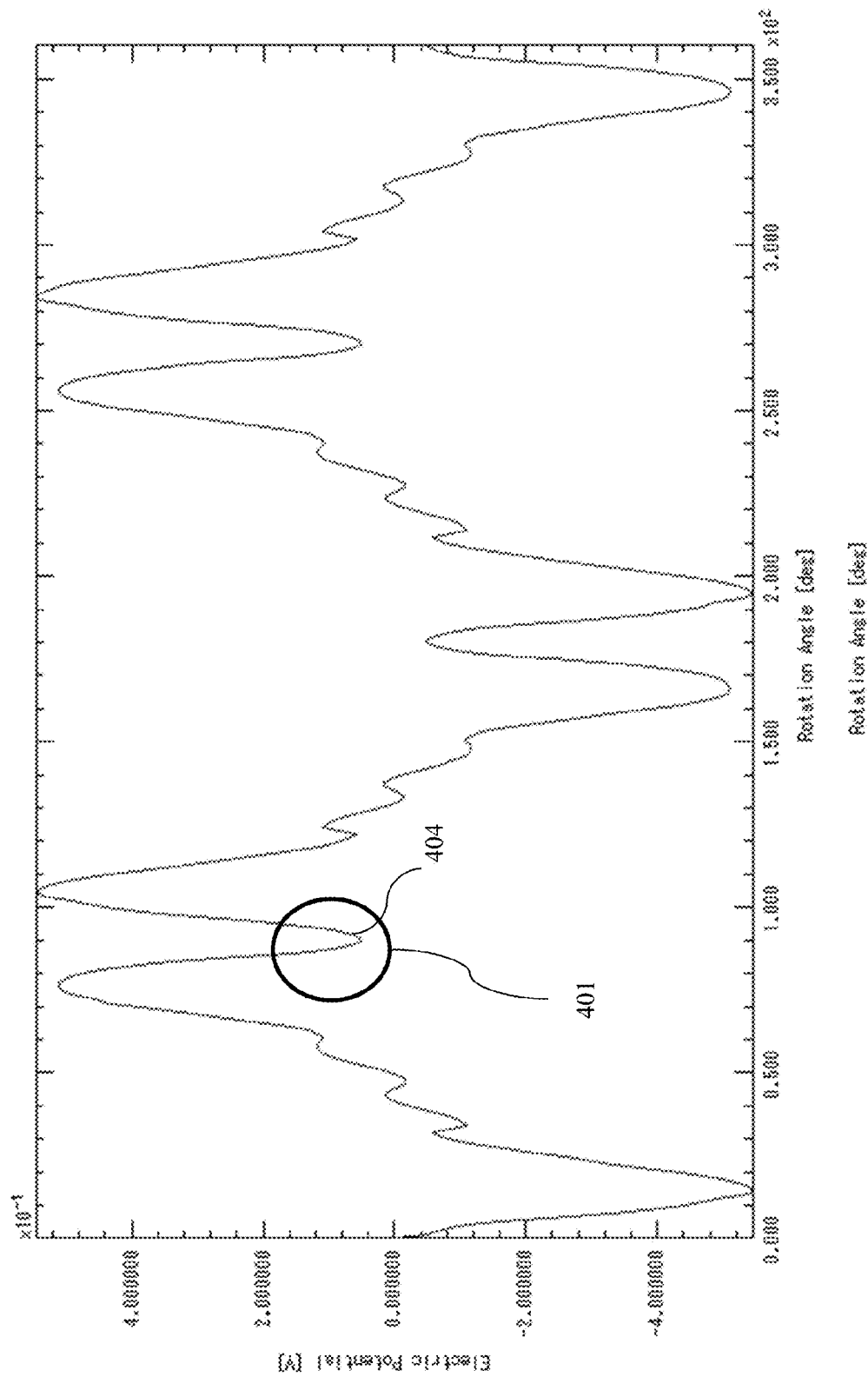

FIG. 23 is an exemplary plot illustrating a back electromotive force (back EMF) of the motor 100 of FIG. 21. As shown in FIG. 23, the local minimum back EMF 404 can still exist in the region 401. Thus, adjusting the shape of the magnetic pole 210 in the manner illustrated in FIG. 21 may not necessarily eliminate the peak of current i.

Figure 24:
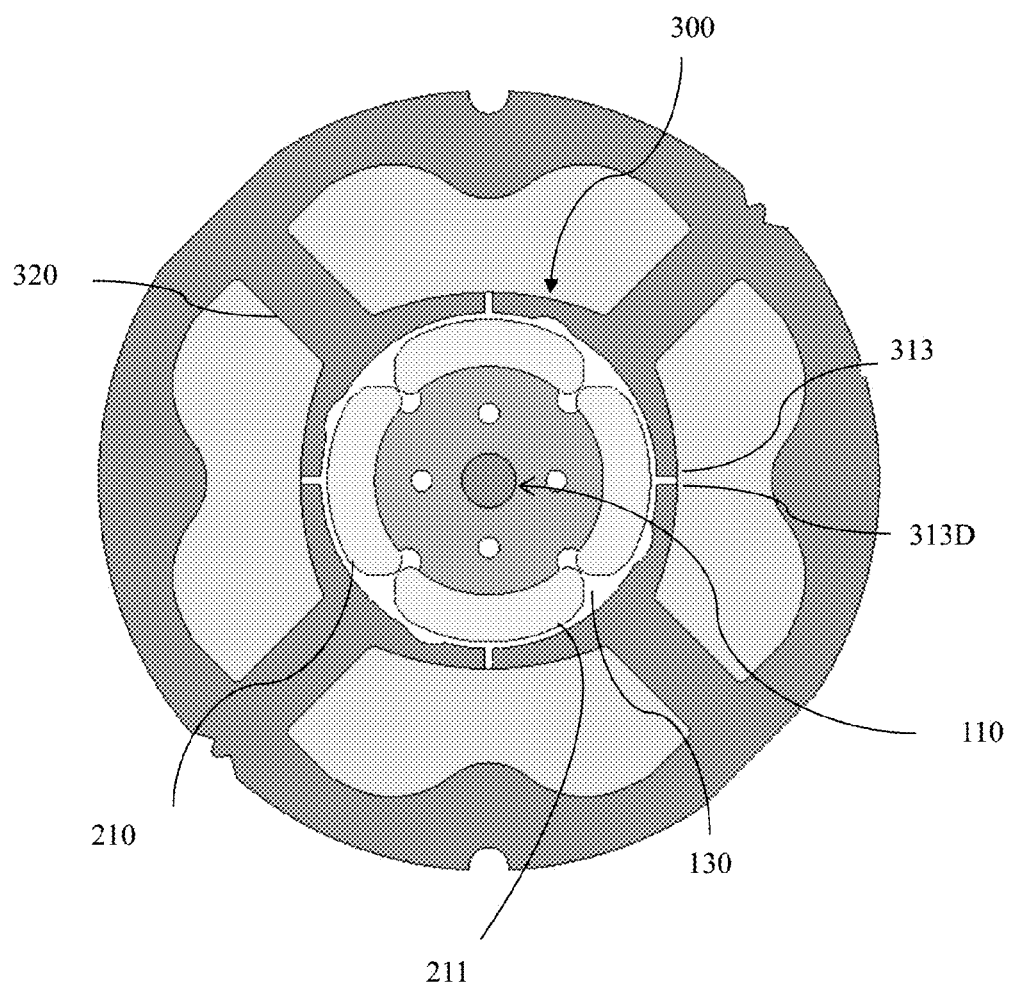
FIG. 24 is an exemplary detail drawing illustrating another alternative embodiment of the motor of FIG. 11, wherein the rotor includes a magnetic pole having an edge portion with a uniform distance from the central axis, and wherein the stator defines a slot as a part of the magnetic bridge.

Additionally and/or alternatively, the characteristics of the motor 100 can be affected by the geometry of the magnetic bridge 313. FIG. 24 is an exemplary detail drawing illustrating another alternative embodiment of the motor 100. As shown in FIG. 24, the edge region 211 can have a uniform distance from the central axis 110. The stator 300 can form the slot 313D as the magnetic bridge 313.

Figure 25:
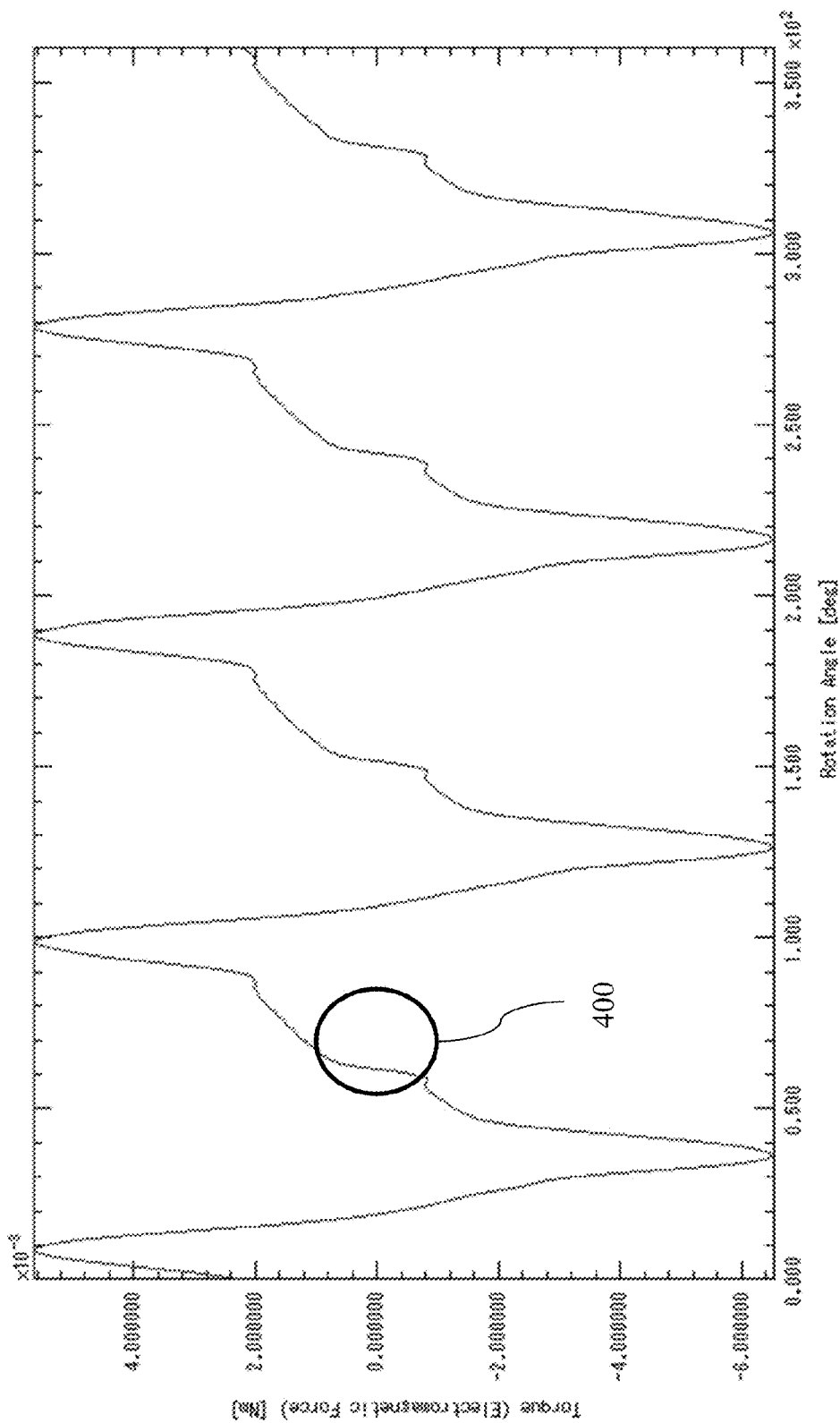
FIGS. 25-26 are exemplary plots respectively illustrating torque and back electromotive force for the motor of FIG. 24 as a function of rotation angle.

FIG. 25 is an exemplary plot illustrating torque of the motor 100 of FIG. 24. In FIG. 25, the region 400 does not have the local minimum torque 402 shown in FIG. 19. Therefore, FIG. 25 demonstrates that adjusting the shape, size, and/or dimension, such as using the slot 313D shown in FIG. 24, can reduce and/or eliminate the possible dead point of FIG. 19. The dead point may be eliminated because the slot 313D can increase magnetic flux density in the air gap 130 shown in FIG. 24. Such an increase can be at least partially due to a change of magnetoresistance of the stator 300 shown in FIG. 24 as a result of changing the magnetic bridge 313.

Figure 26:
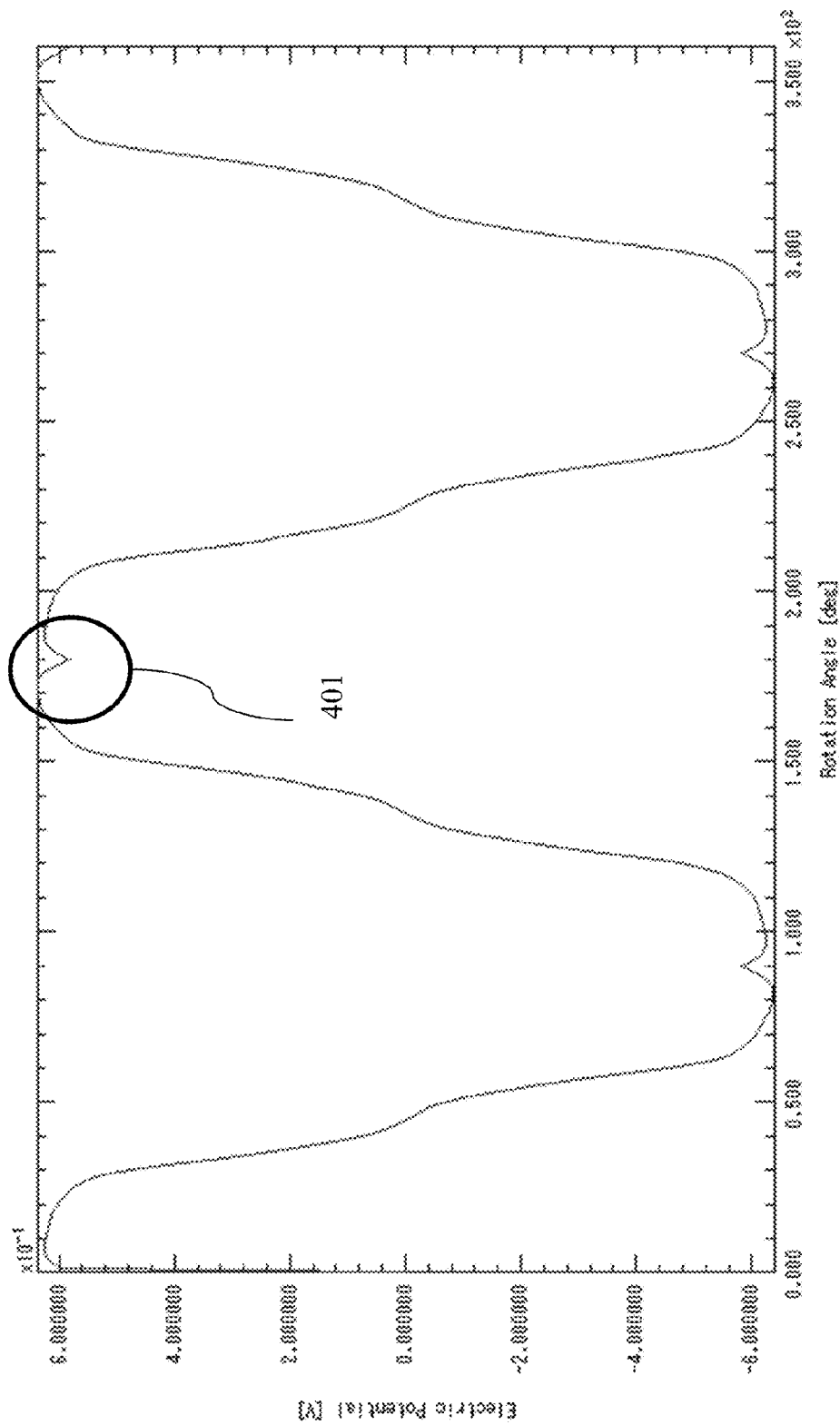

FIG. 26 is an exemplary plot illustrating a back electromotive force (back EMF) of the motor 100 of FIG. 24. As shown in FIG. 26, the region 401 does not include the local minimum back EMF 404 shown in FIG. 20. Therefore, using the slot 313D shown in FIG. 24 can reduce and/or eliminate the rapid increase of current i passing through the winding 330, thereby improving smoothness of the curve of the back EMF and reduce cogging and noise during operation of the motor 100. The local minimum back EMF 404 may be eliminated because the slot 313D can increase magnetic flux density in the air gap 130 shown in FIG. 24. Such an increase can be at least partially due to a change of magnetoresistance of the stator 300 (shown in FIG. 24) as a result of changing the magnetic bridge 313.

Figure 27:
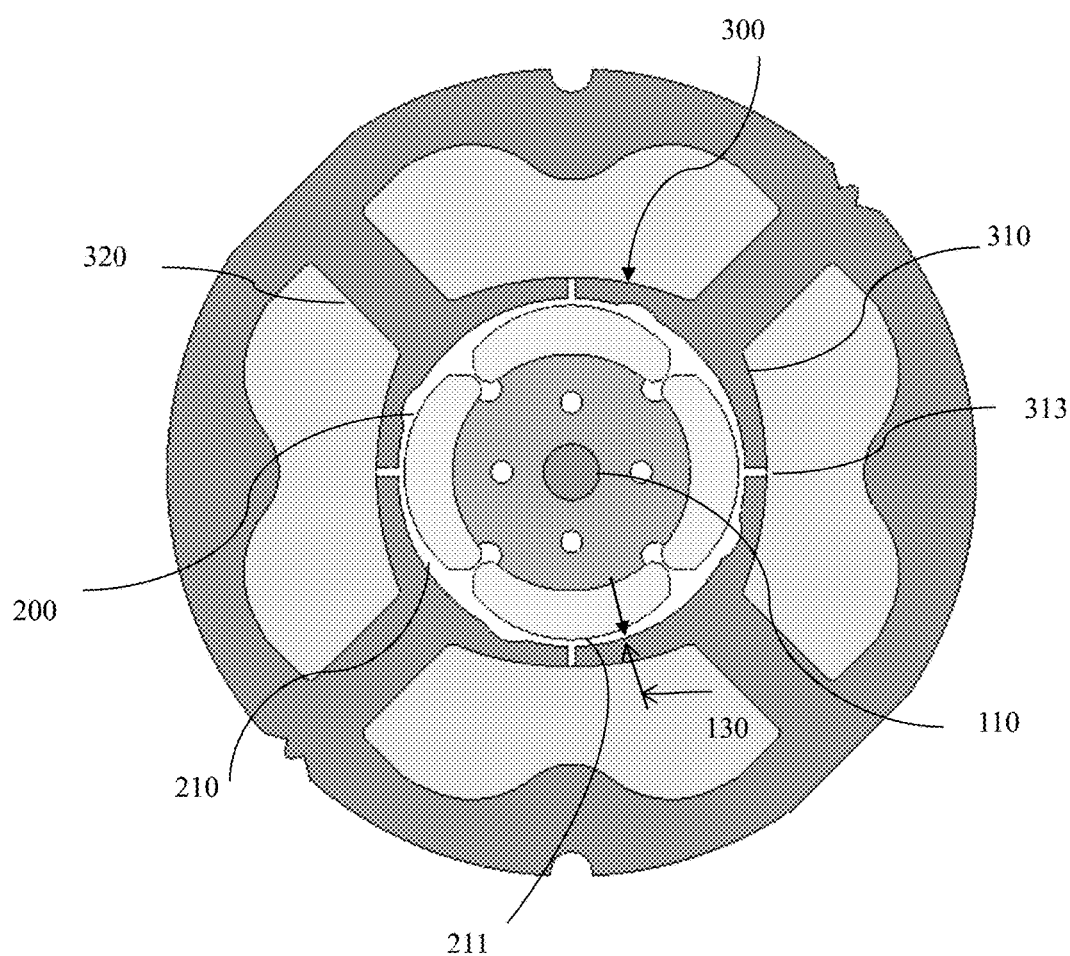
FIG. 27 is an exemplary detail drawing illustrating another alternative embodiment of the motor of FIG. 11, wherein the rotor includes a magnetic pole having an edge portion with a non-uniform distance from the central axis, and wherein the stator defines a slot as a part of the magnetic bridge.

FIG. 27 is an exemplary detail drawing illustrating another alternative embodiment of the motor 100. The edge region 211 of the magnetic pole 210 can have a non-uniform distance from the central axis 110, as provided in the manner set forth above with reference to the edge region 211 of the magnetic pole 210 shown in FIG. 21. The stator 300 can form the slot 313D as the magnetic bridge 313.

In FIG. 27, the air gap 130 between the magnetic pole 210 and the first stator portion 310 can increase from the central portion of the edge region 211 to the end portion of the edge region 211. The air gap 130 between the central portion of the edge region 211 and the first stator portion 310 can form a minimum of the air gap 130.

Figure 28:
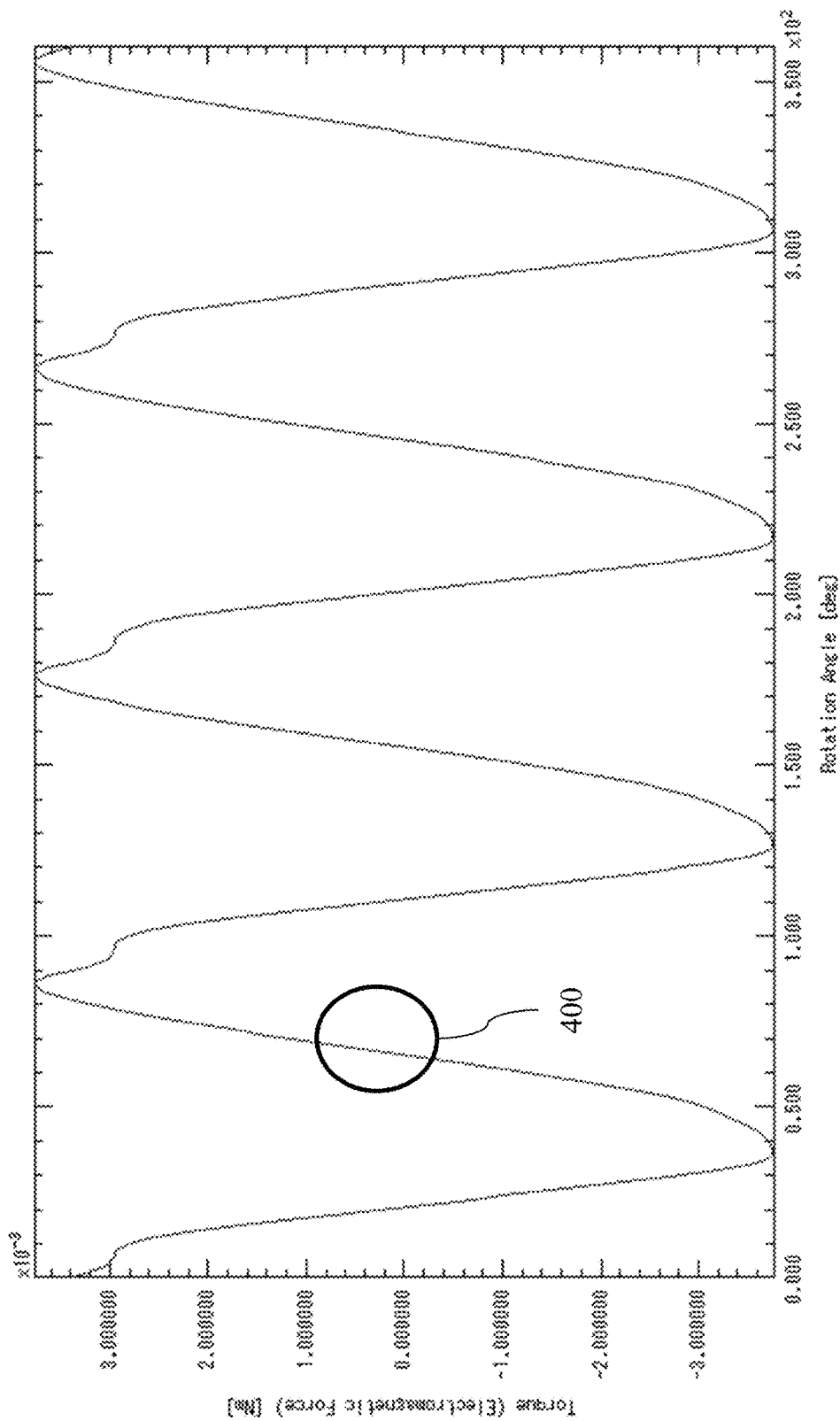
FIGS. 28-29 are exemplary plots respectively illustrating torque and back electromotive force for the motor of FIG. 27 as a function of rotation angle.

FIG. 28 is an exemplary plot illustrating torque of the motor 100 of FIG. 27. In FIG. 28, the region 400 does not have the local minimum torque 402 shown in FIG. 19. The torque curve illustrated in FIG. 28 is smoother than the torque curve shown in FIG. 25. Thus, using the edge region 211 with a non-uniform distance from the central axis 110 can improve the smoothness of the torque curve, and thus reduce cogging and noise during operation of the motor 100.

Figure 29:
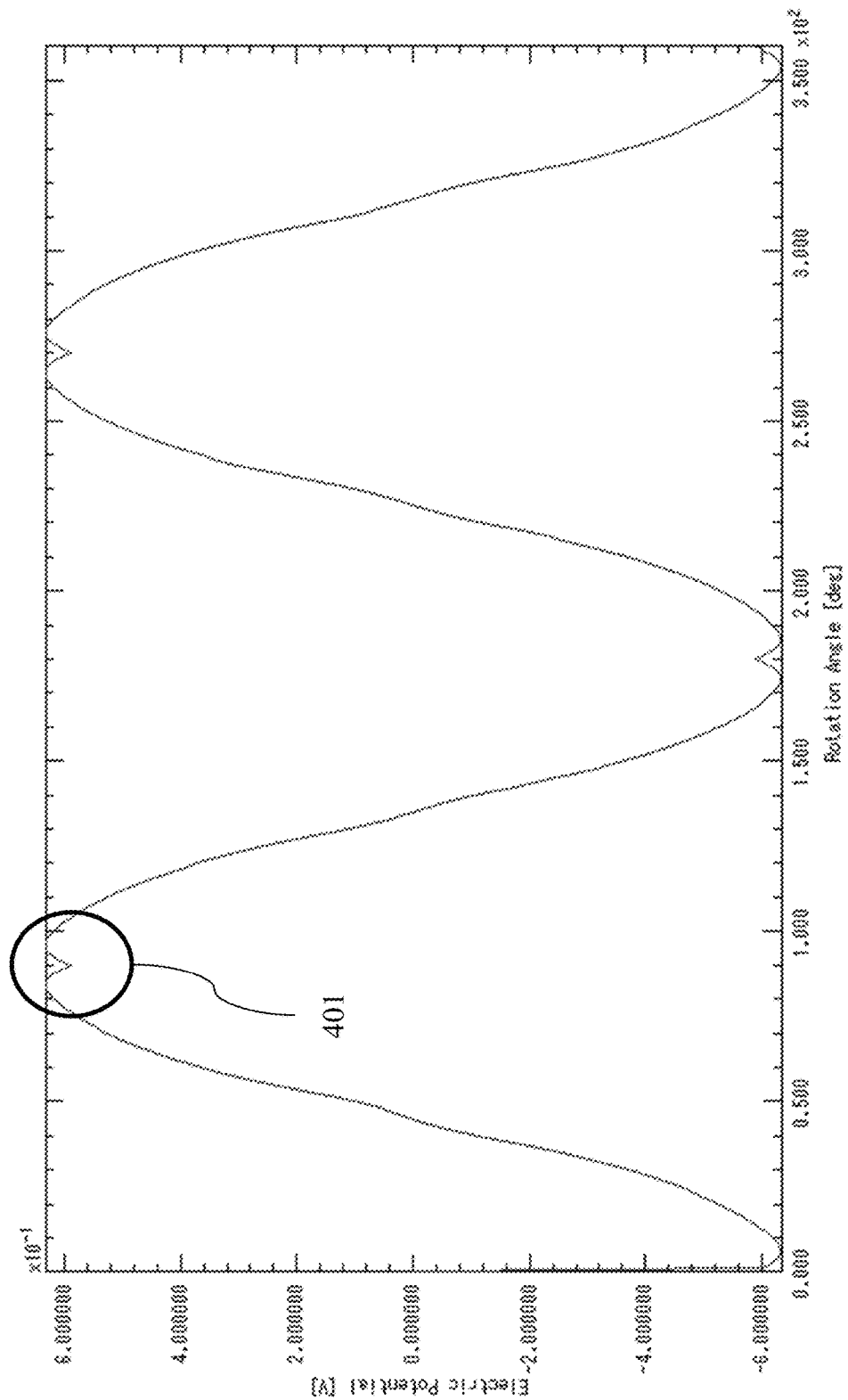

FIG. 29 is an exemplary plot illustrating a back electromotive force (back EMF) of the motor 100 of FIG. 27. As shown in FIG. 29, the region 401 does not have the local minimum back EMF 404 shown in FIG. 20. Therefore, using the slot as the magnetic bridge 313 can reduce and/or eliminate the rapid increase of current i passing through the winding 330. Further, the back EMF in FIG. 29 has a smoother curve than the back EMF shown in the plot of FIG. 26. Thus, using the edge region 211 with a varied distance from the central axis 110 can improve smoothness of the curve of the back EMF, and reduce cogging and noise during operation of the motor 100.

Figure 30:
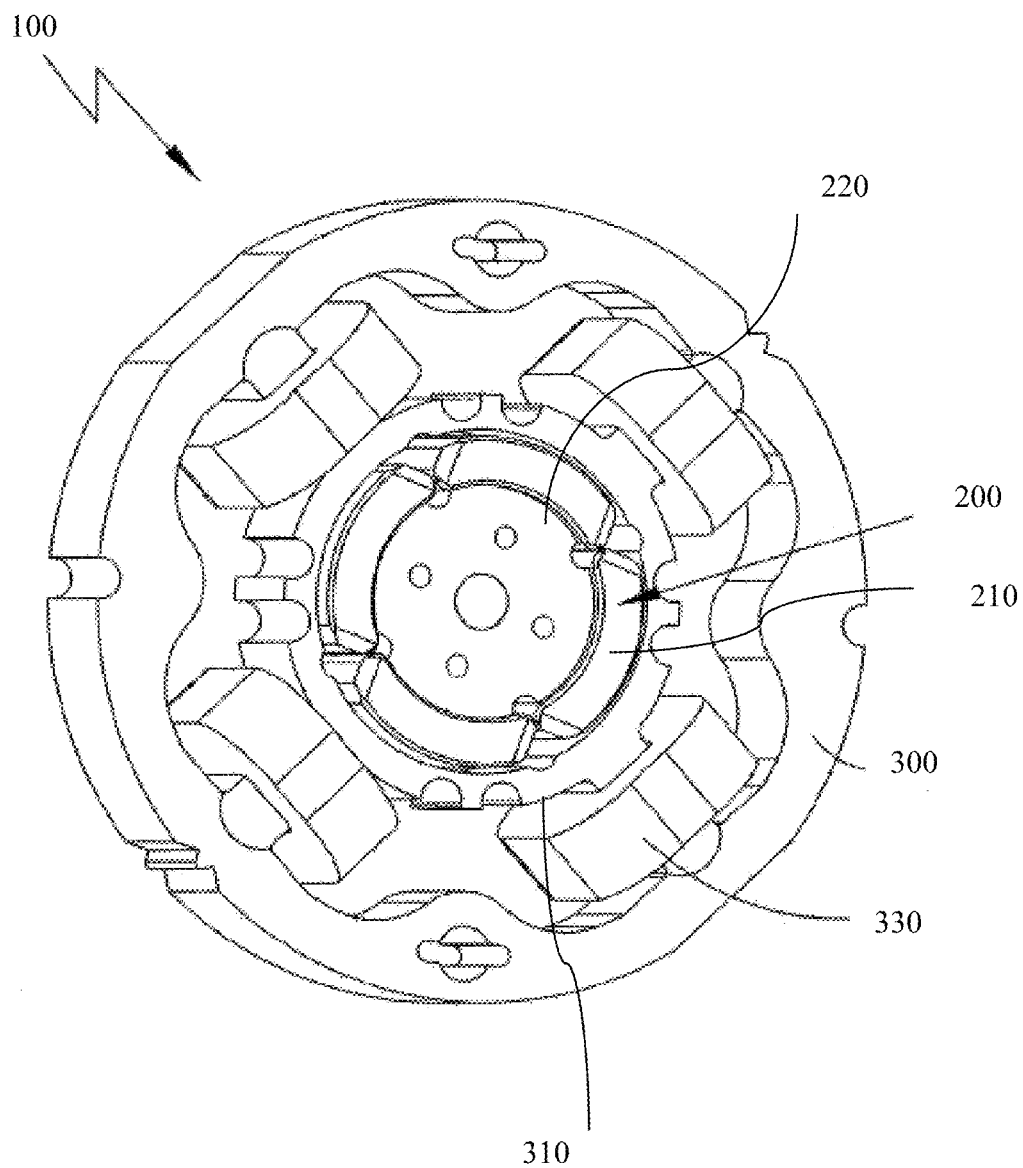
FIG. 30 is an exemplary detail drawing illustrating an alternative embodiment of the motor of FIG. 5, wherein the rotor includes a surface-mounted magnetic pole.

FIG. 30 is an exemplary detail drawing illustrating another alternative embodiment of the motor 100. The rotor 200 can include the rotor core 220 and the plurality of magnetic poles 210. The magnetic poles 210, for example, can be disposed about a circumference of the rotor core 220.

FIG. 30 shows the magnetic poles 210 as being disposed on a surface of the rotor core 220. Advantageously, construction of the rotor 200 can be simple and low-cost. In certain embodiments, the magnetic poles 210 can be disposed in an alternating polarity arrangement. One or more of the magnetic poles 210 can be magnetized radially.

The motor 100 disclosed herein has significant advantages over the conventional motor 10 of FIG. 1. FIG. 1 shows the motor 10 has the pole shoe 18 having an arc shape that is circumferentially non-uniform. For example, even if the rotor 19 has a uniform outer radius, the air gap between the rotor 19 and each of the pole shoes 18 is gradually reduced in a clockwise direction. In other words, the inner surface of pole shoe 18 is not coaxial with the outer surface of rotor 19; so, the width of the air gap corresponding to each stator pole 12 and/or pole shoe 18 changes gradually in the circumferential direction. As a result, in a start up position, the middle of each magnetic pole of the rotor 19 is offset from the middle of the corresponding stator pole 12. When the winding 13 is energized, the rotor 19 can be started in the clockwise direction but cannot be started in the counter-clockwise direction.

In contrast to the motor 10, the motor 100 includes the first arcuate regions 311A, the second arcuate regions 311B, and the rotor 200 that can have a common center at the central axis 110. The edge region 211 of the magnetic pole 210 can be coaxially arranged about the central axis 110. Therefore, the edge region 211 of the magnetic pole 210 can be effectively coaxial with the first arcuate region 311A of the stator 300. Such a geometry can reduce cogging and thereby reduce vibration and noise during operation. Further, by adjusting a position of the second arcuate region 311B relative to a selected tooth body 320, the motor 100 can be reliably be started in either of two opposite directions 121, 122 (shown in FIG. 7) unlike the motor 10 which can only start in one of the two opposite directions.

Figure 31:
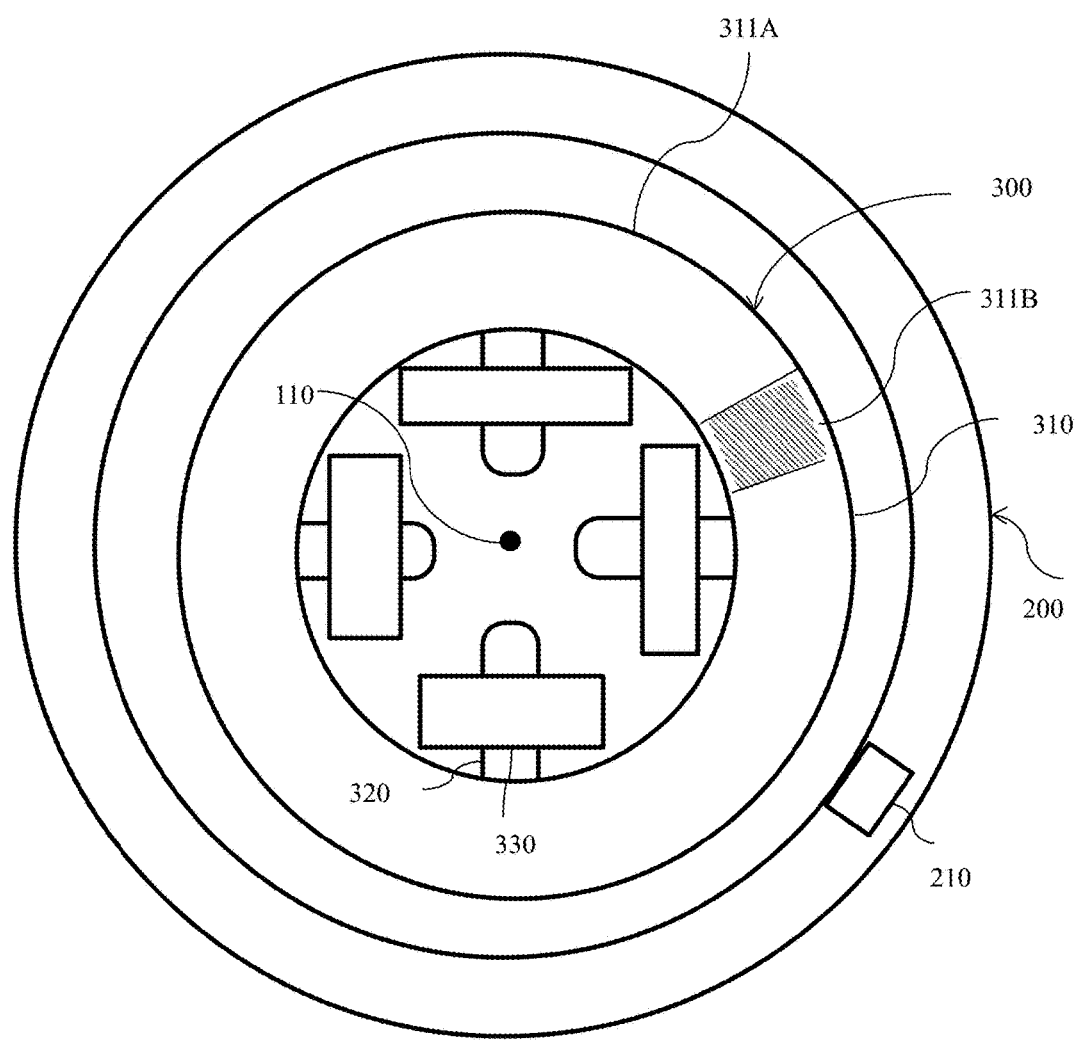
FIG. 31 is an exemplary diagram illustrating an alternative embodiment of the motor of FIG. 3, wherein the stator is at least partially disposed within the rotor.

Although shown and described herein as being disposed within the stator 300 for purposes of illustration only, the rotor 200 and/or the magnetic poles 210 can partially and/or completely surrounded the stator 300. FIG. 31 is an exemplary diagram illustrating an alternative embodiment of the motor 100. FIG. 31 illustrates the rotor 200 and/or the magnetic poles 210 as surrounding the stator 300. The rotor 200 can have a ring shape centered about the central axis 110. The stator 300 can be at least partially disposed within the rotor 200. The magnetic poles 210 can be located adjacent to the first stator portion 310.

The features and advantages of the motor 100 disclosed in the present disclosure are not limited to the motor 100 that has the rotor 200 disposed within the stator 300. Thus, the features and advantages of the motor 100 disclosed in the present disclosure can be equally and/or similarly applicable to the motor 100 in FIG. 31.

Figure 32:
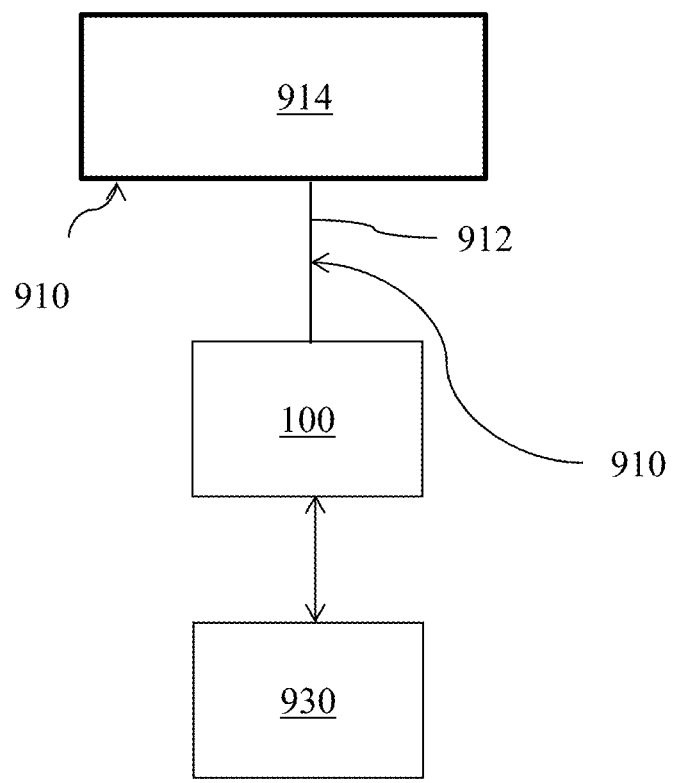
FIGS. 32-33 are exemplary diagrams illustrating embodiment of appliances including the motor of FIG. 3.

FIG. 32 is an exemplary diagram illustrating an embodiment of an appliance 900 including the motor 100. As shown in FIG. 32, the appliance 900 can include a load 910 configured to be driven by the motor 100. The load 910 can transform the rotational movement of the motor 100 into a motion that achieve utility of the appliance 900.

Optionally, the load 910 can include a shaft 912 driven by the motor 100. The shaft 912 can be directly coupled to the rotor 200 (shown in FIG. 3) at a position of the central axis 110. Additionally and/or alternatively, the shaft 912 can be indirectly coupled to the rotor 200 via, for example, one or more gears and/or other suitable mechanical connections for transferring the movement of the rotor 200 to the shaft 912.

As shown in FIG. 32, the load 910 can include a rotary device 914 coupled to the motor 900 and driven by the motor 100 for generating a rotational motion. The rotary device 914 can be coupled to the motor 900 directly and/or, as illustrated in FIG. 32, via the shaft 912. Based on shape, size, dimension, material, and/or functionality of the rotary device 914, the appliance 900 can perform a certain predetermined task during operation of the motor 100. An exemplary appliance 900 can include a dryer, a rolling shutter, a window lifter, a power tool, or a combination thereof.

The appliance 900 is shown in FIG. 32 as including an optional motor controller 930 for driving the motor 100. The motor controller 930, for example, can generate and/or transmit an electrical signal to the winding 330 (shown in FIG. 3) of the motor 100 for energizing the winding 330. The motor controller 930 can include one or more general purpose microprocessors (for example, single and/or multi-core processors), application-specific integrated circuits, application-specific instruction-set processors, physics processing units, digital signal processing units, coprocessors, network processing units, audio processing units, encryption processing units, and/or the like. The motor controller 930 can be coupled with the motor 100 via any suitable wired and/or wireless communication techniques.

Figure 33:
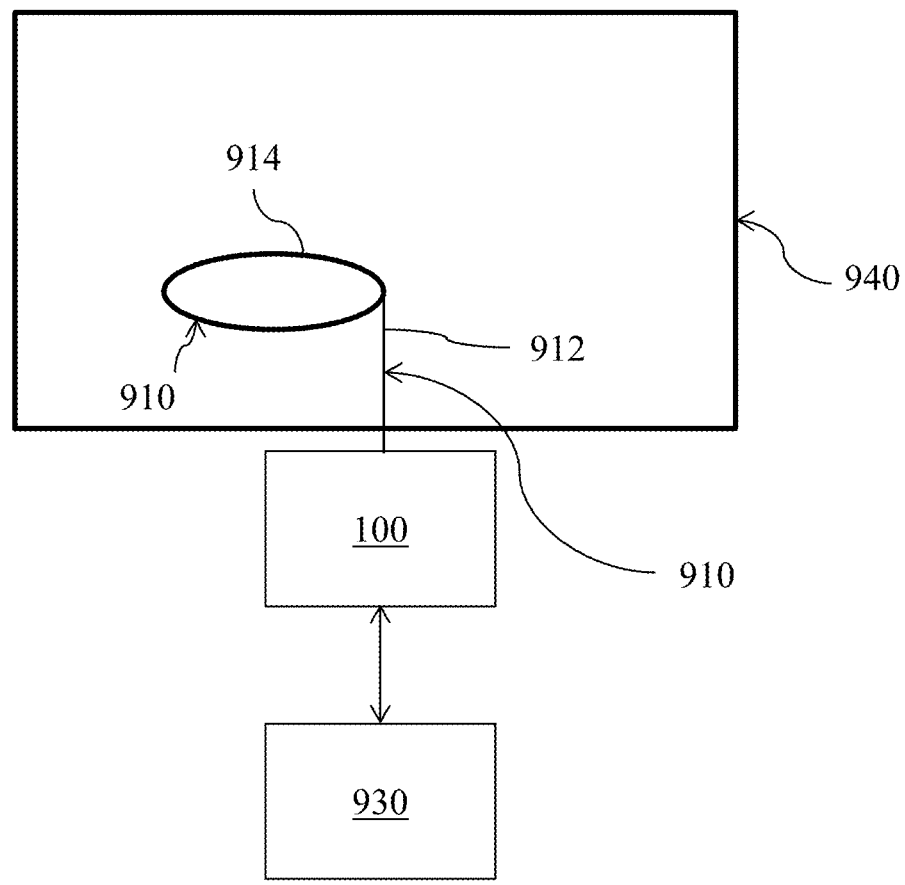

FIG. 33 is an exemplary diagram illustrating an embodiment of an appliance 900 including the motor 100. The rotary device 914 shown in FIG. 33 can include a blade of a predetermined shape, size, and/or dimension. The rotary device 914 can be attached to the shaft and driven by the motor 100 for generating a rotational motion to move a fluid (not shown).

The fluid can include a gas, a liquid, a powder, or a combination thereof. Based on application of the appliance 900, the motor 100 can drive the rotary device 914 to stir, mix, directionally move, and/or expel the fluid. The rotary device 914 can exert additional and/or alternative effects on the fluid, without limitation. Optionally, the appliance 900 can include a chamber 940 for at least partially accommodating the rotary device 914 and/or the fluid. An exemplary appliance 900 can include a gas pump, a drain pump, a medical pump, a dish washer, a washing machine, a ventilation fan, a hair dryer, a range hood, a vacuum cleaner, a compressor, an exhaust fan, a refrigerator, or a combination thereof.

Figure 34:
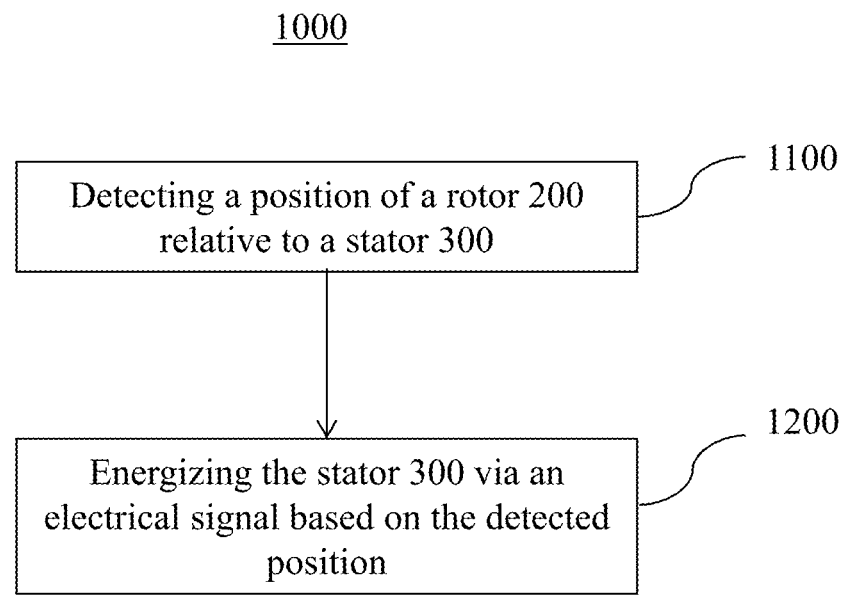
FIG. 34 is an exemplary top level flow chart illustrating an embodiment of a method for operating the motor of FIG. 3.

FIG. 34 is an exemplary top level flow chart illustrating an embodiment of a method 1000 for operating the motor 100. A position of the rotor 200 can be detected, at 1100, relative to the stator 300. The position of the rotor 200 can be detected, for example, by detecting a polarity of a selected magnetic pole 210 associated with the rotor 200. The Hall sensor 390 (shown in FIG. 10) can detect the polarity of an adjacent magnetic pole 210.

The stator 300 is energized, at 1200, based upon the detected position of the rotor 200. For example, the stator 300 can be energized, at 1200, via an electrical signal based on the detected position of the rotor 200. The electrical signal can be applied to the stator 300 for initiating a movement of the rotor 200 relative to the stator 300 in a selected direction. The direction of movement can be changed by reversing a polarity of the electrical signal. The energizing can include providing a current and/or voltage to the winding 330. The current can have a polarity based on the detected position of the rotor 200, at 1100, and the selected direction.

As described herein, the motor 100 can be configured to start up in either one of directions 121, 122 (shown in FIG. 7). Whether to start up in the direction 121 or the direction 122 can be controlled by the polarity of the electrical signal. Reversing a polarity of the electrical signal can direct the motor 100 to initiate a movement in a reversed direction. Therefore, when a direction is selected, and the polarity of the selected magnetic pole 210 is detected, the polarity of the electrical signal can be accordingly determined and be provided to the motor 100.

For example, the energizing can include generating an attractive force between the selected magnetic pole 210 and an immediate downstream tooth body 320 relative to the selected magnetic pole 210 in the clockwise direction 121, thereby initiating movement of the rotor 200 in the clockwise direction 121.

In another example, the energizing can include generating an attractive force between the selected magnetic pole 210 and an immediate downstream tooth body 320 relative to the selected magnetic pole 210 in the counter-clockwise direction 122, thereby initiating movement of the rotor 200 in the counter-clockwise direction 122.

Figure 35:
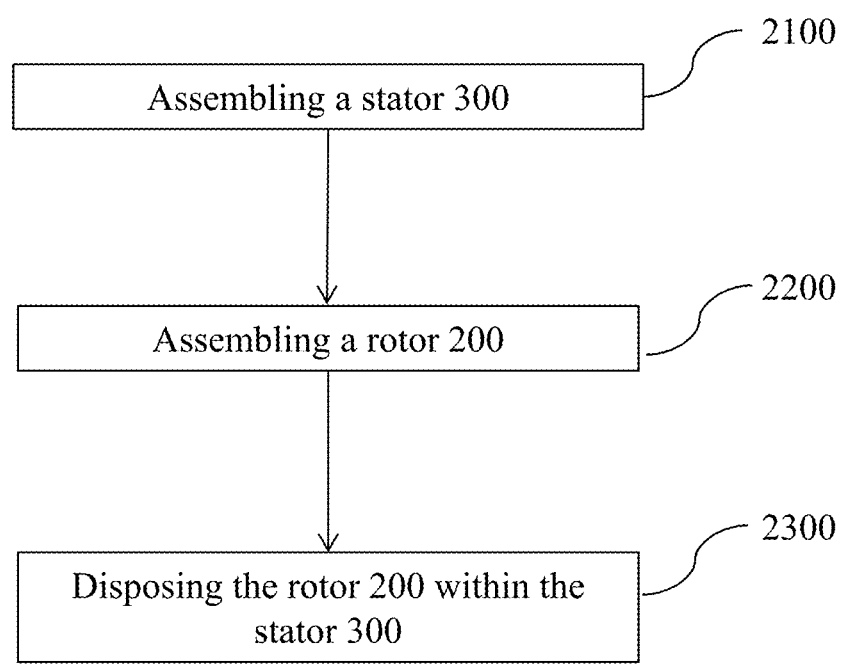
FIG. 35 is an exemplary top level flow chart illustrating an embodiment of a method for making the motor of FIG. 3.

Since a reciprocating shuttle winding machine is required for the winding process of conventional motors 10, there exists a need of an improved method for manufacturing the motor 100. FIG. 35 is an exemplary top level flow chart illustrating an embodiment of a method 2000 for making the motor 100. Turning to FIG. 35, the stator 300 can be assembled, at 2100, and the rotor 200 can be assembled, at 2200. An exemplary process for making the rotor 200 can include forming the rotor core 220 with a circumference and disposing at least one magnetic pole 210 about the circumference of the rotor core 220. The magnetic pole 210 can be mounted on the surface of the rotor core 220 and/or at least partially embedded in the rotor core 220. For example, a surface of the embedded magnetic pole 210 can be flush with a surface of the rotor core 220.

The rotor 200 can be disposed, at 2300, within the first stator portion 310 and the second stator portion 340. For example, the rotor 200 can be received in the first stator portion 310, and be disposed and/or arranged concentrically within the first stator portion 310 and the second stator portion 340.

Although FIG. 35 shows 2100-2300 as being performed in a sequential order, 2100-2300 can be performed in any sequence. Additionally and/or alternatively, two or more of 2100-2300 can be performed simultaneously.

Figure 36:
FIG. 36 is an exemplary flow chart illustrating an alternative embodiment of the method of FIG. 35, wherein the method includes assembling a tooth body with an inner stator portion.
Figure 37:
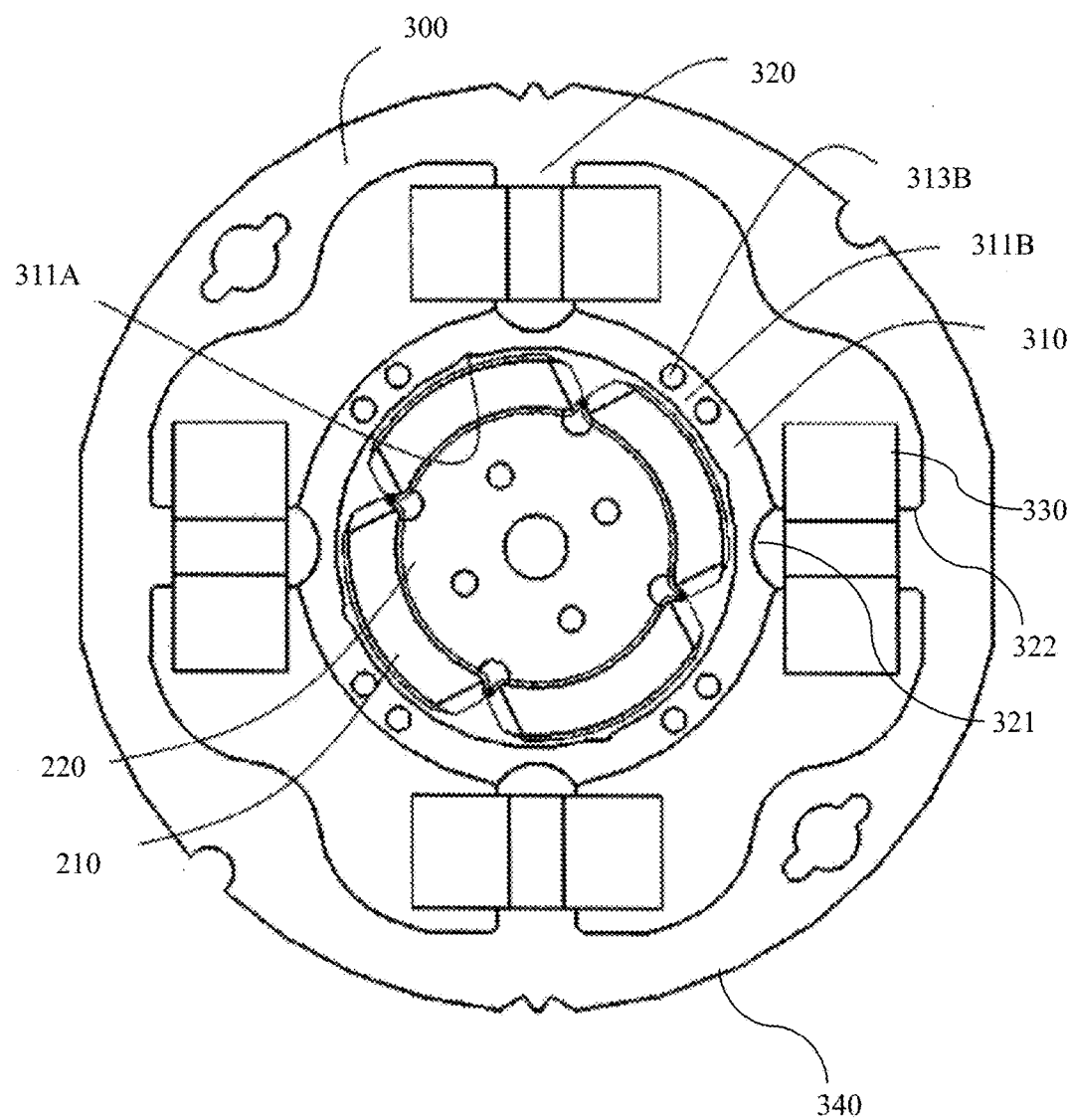
FIG. 37 is an exemplary detail drawing illustrating another alternative embodiment of the motor of FIG. 10, wherein the stator is segmented and the tooth body is integrally formed with an outer stator portion.

FIG. 36 is an exemplary flow chart illustrating an alternative embodiment of the method 2000. FIG. 37 is an exemplary detail drawing illustrating another alternative embodiment of the motor 100. The motor 100 in FIG. 37 can be made using the method 2000 of FIG. 36. The method 2000 will be described with reference to both FIGS. 36 and 37.

According to FIG. 36, the winding 330 is wound, at 2111, around a selected tooth body 320. As shown in FIG. 37, the first stator portion 310 can be an inner stator portion. The tooth body 320 can have the first end region 321 and the second end region 322. FIG. 37 shows the tooth bodies 320 of the motor 100 as being integrally formed with the second stator portion 340. The winding 330 can be wound around one or more of the tooth bodies 320 of the motor 100 in the manner discussed above with reference to FIG. 6. As sufficient space exists between adjacent tooth bodies 320, the winding 330 can be easily wound on the tooth body 320. Thereby, difficulty of manufacturing the winding 330 can advantageously be reduced.

In FIG. 36, the tooth body 320 is assembled, at 2112, with a selected stator portion to form the stator 300. The selected stator portion can include the first stator portion 310 and/or the second stator portion 340.

In one example, as shown in FIG. 37, the selected stator portion to be assembled with the tooth body 320 can include the first stator portion 310. The motor 100 in FIG. 37 can be assembled by receiving the first stator portion 310 within the second stator portion 340. The tooth body 320 can be mounted to the first stator portion 310 via the first end region 321 to form the stator 300.

Figure 38:
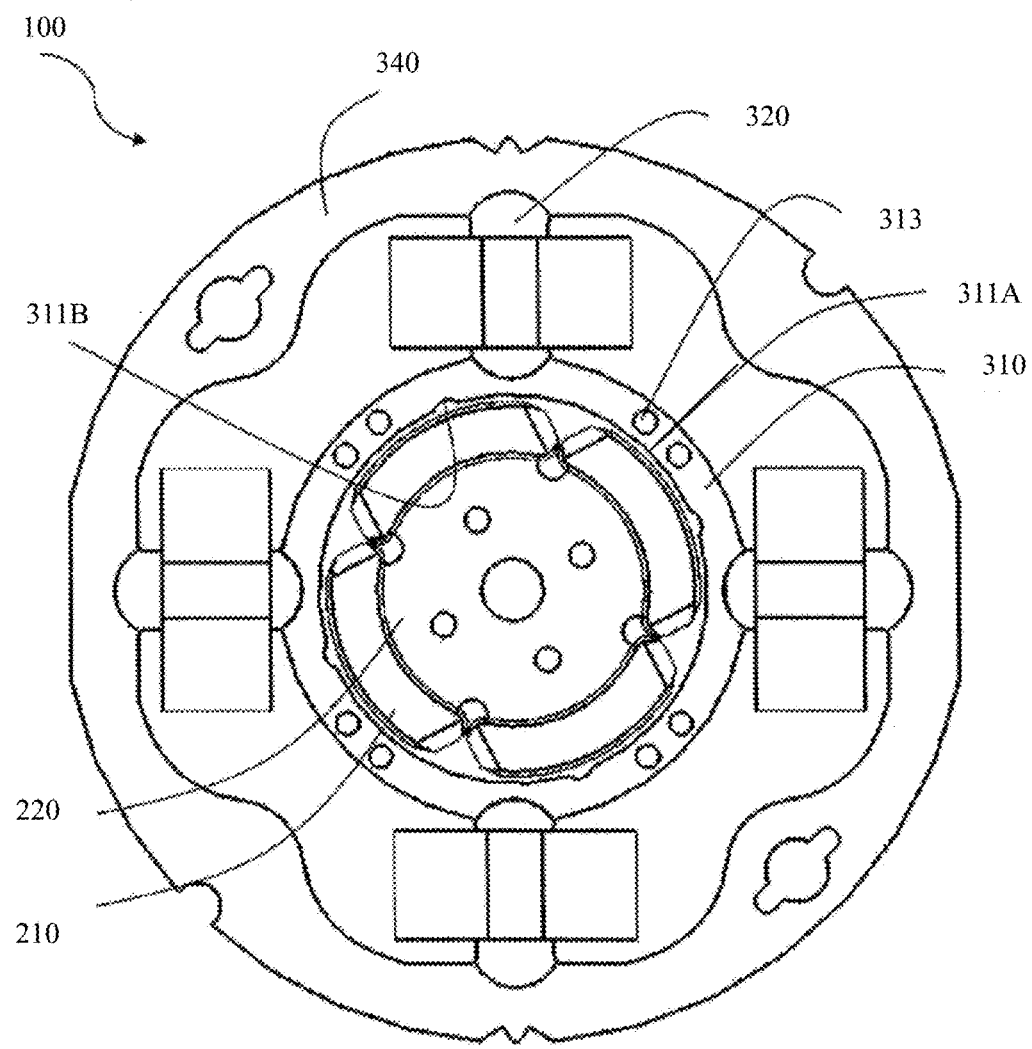
FIG. 38 is an exemplary detail drawing illustrating another alternative embodiment of the motor of FIG. 10, wherein the tooth body is separately formed with respect to an outer stator portion.

In another example, at least one tooth body 320 can be formed separately from both of the first stator portion 310 and the second stator portion 340. FIG. 38 is an exemplary detail drawing illustrating another alternative embodiment of the motor 100. As shown in FIG. 38, at least one tooth body 320 can be separate from both the first stator portion 310 and the second stator portion 340. In other words, at least one tooth body 320 can be separately formed with respect to both of the first stator portion 310 and the second stator portion 340.

In that case, the winding, at 2111, can include winding the winding 330 around the tooth body 320. The first and second end regions 321, 322 of the tooth body 320 can each be separated from the first stator portion 310 and the second stator portion 340. The winding 330 can be wound on the tooth body 320 using a double fly winding machine. Advantageously, efficiency of the winding process can be improved.

The assembling, at 2112, can include receiving the first stator portion 310 within the second stator portion 340 and mounting the first and second end regions 321, 322 of the tooth body 320 to first stator portion 310 and the second stator portion 340, respectively. That is, after the winding 330 is wound around the tooth body 320, the tooth body 320 can be coupled to the first stator portion 310 and the second stator portion 340.

Although FIG. 36 shows 2111-2112 as performed in a sequential order, 2111-2112 can be performed in any sequence and/or simultaneously. 2111 and/or 2112 can be split into more than one process. For example, the tooth body 320 can be attached to the first stator portion 310. The winding 330 can be wound around the tooth body 320. The wound tooth body 320 can then be attached to the second stator portion 340.

Figure 39A:
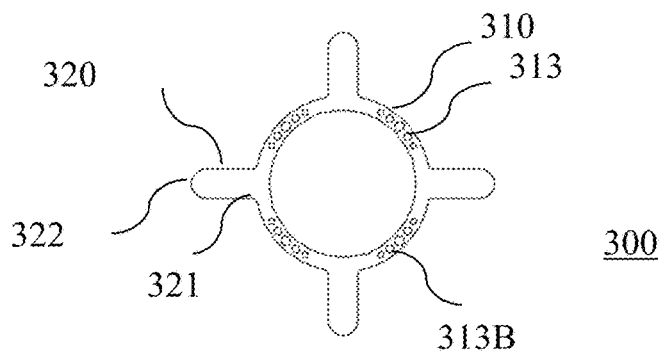
FIGS. 39A-39E are exemplary detail drawings illustrating assembly of an exemplary stator in accordance with an alternative embodiment of the method of FIG. 36, wherein the method includes assembling the tooth body with an outer stator portion.

FIGS. 39A-39E are exemplary detail drawings illustrating the assembly of an exemplary stator 300 in accordance with another alternative embodiment of the method 2000. FIG. 39A shows the first stator portion 310. As shown in FIG. 39A, the tooth body 320 is connected with, and extends from, the first stator portion 310. In other words, the tooth body 320 can be integrally formed with the first stator portion 310.

The stator 300 can form a plurality of apertures 313B as the magnetic bridge 313. However, the magnetic bridge 313 can include other selected shapes, without limitation, in the manner set forth above with reference to FIGS. 12-17. Thus, the method 2000 optionally can include forming (not shown) the magnetic bridge 313 on the first stator portion 310. For example, forming the magnetic bridge 313 can include forming the apertures 313B, such as by drilling the apertures 313B in the first stator portion 310.

Figure 39B:
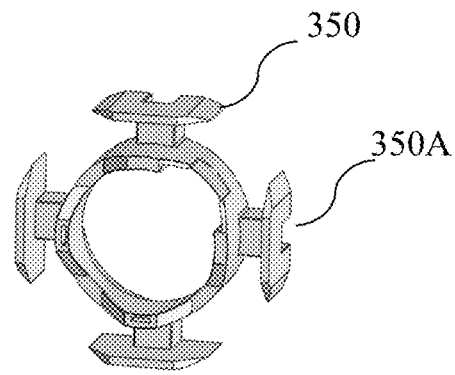

FIG. 39B shows an exemplary bobbin 350. The bobbin 350 can define one or more openings 350A for receiving the tooth bodies 320 shown in FIG. 39A. An exemplary bobbin 350 can be made of a non-magnetic material. The bobbin 350 can be formed separately with respect to the stator 300. FIG. 39B shows the bobbin 350 as being an integral structure. The bobbin 350 in FIG. 39B can be coupled with the first stator portion 310 and/or receive more than one tooth bodies 320.

Figure 39C:
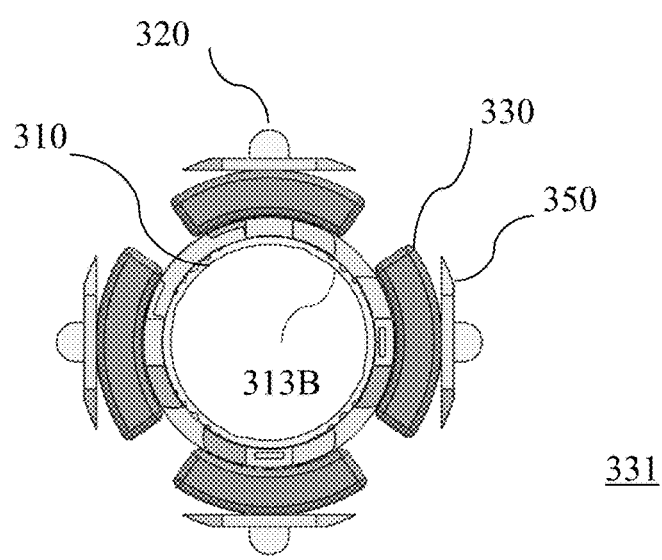

FIG. 39C shows the tooth body 320 as being integrally formed with the first stator portion 310 as being assembled with the bobbin 350. As shown in FIG. 39C, the first stator portion 310 can be received by the bobbin 350. The winding 330 can be wound on, and/or around, the bobbin 350. For example, the winding 330 can be wound on the bobbin 350 using a double fly winding machine. Thereby, an efficiency of manufacturing the winding 330 can advantageously be improved.

Geometry of the bobbin 350 that surrounds the tooth body 320 can advantageously ensure that the winding 330 can be wound smoothly. Optionally, the bobbin 350 can be made of an insulating material for insulating the winding 330 from the tooth body 320. The winding 330 is wound around the bobbin 350 to form a wound assembly 331.

Figure 39D:
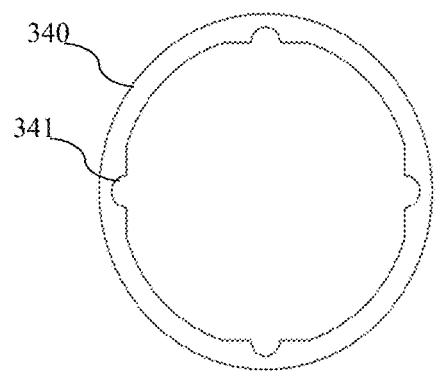

FIG. 39D shows an exemplary second stator portion 340. The second stator portion 340 in FIG. 39D is an integral structure. The second stator portion 340 can include a cooperating detent 341 for mounting the tooth body 320 (shown in FIG. 39C) in accordance with a predetermined manner. In other words, the cooperating detent 341 can be used for cooperating with the second end region 322 (shown in FIG. 39A) of the tooth body 320.

Figure 39E:
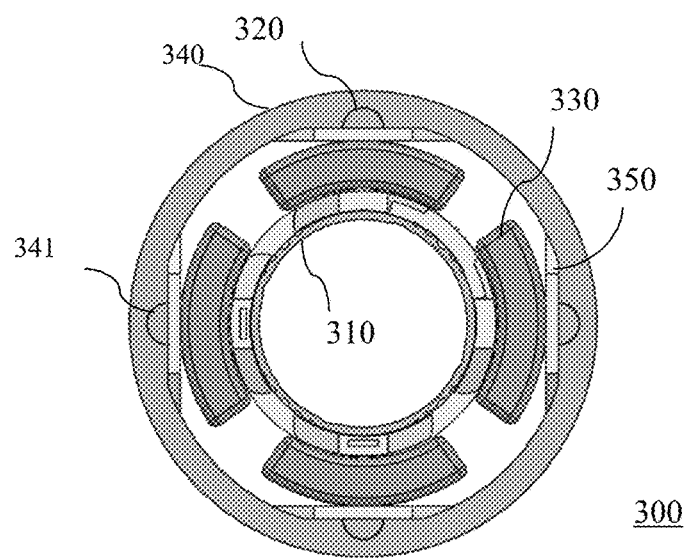

As shown in FIG. 39E, the wound assembly 331 can be assembled with the second stator portion 340. The second end region 322 can be mounted on the cooperating detent 341. Thus, the tooth body 320 can be connected assembled with the second stator portion 340.

Figure 40:
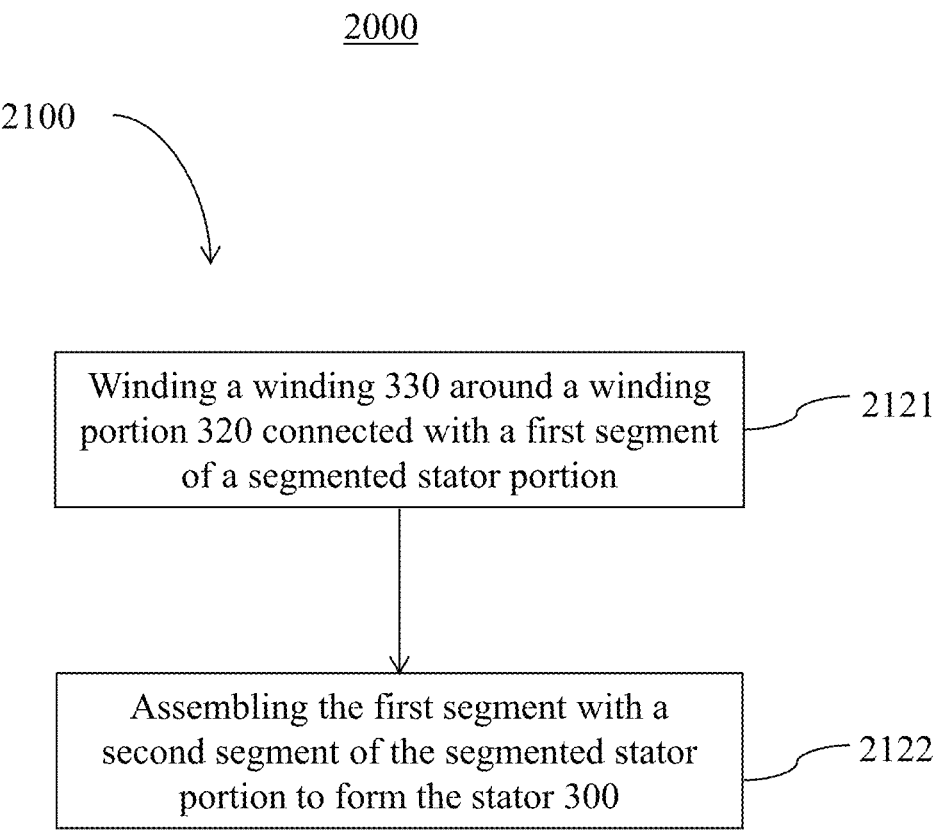
FIG. 40 is an exemplary flow chart illustrating another embodiment of the method of FIG. 36, wherein the method includes assembling the stator from a segmented stator portion.
Figure 41A:
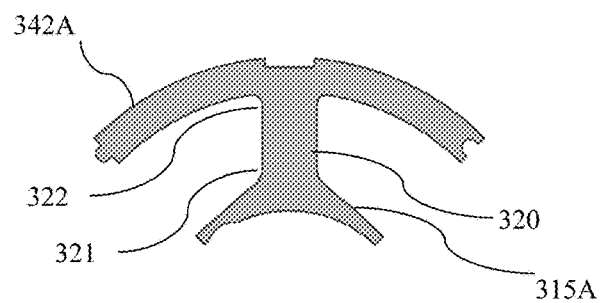
FIGS. 41A-41C are exemplary detail drawings illustrating assembly of an embodiment of a motor in accordance with an alternative embodiment of the method of FIG. 40, wherein the method includes assembling a plurality of segments to form first and second stator portions.
Figure 41B:
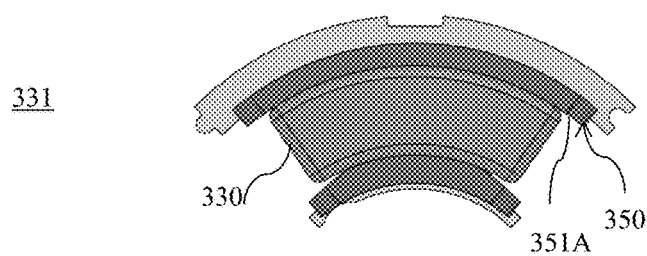
Figure 41C:
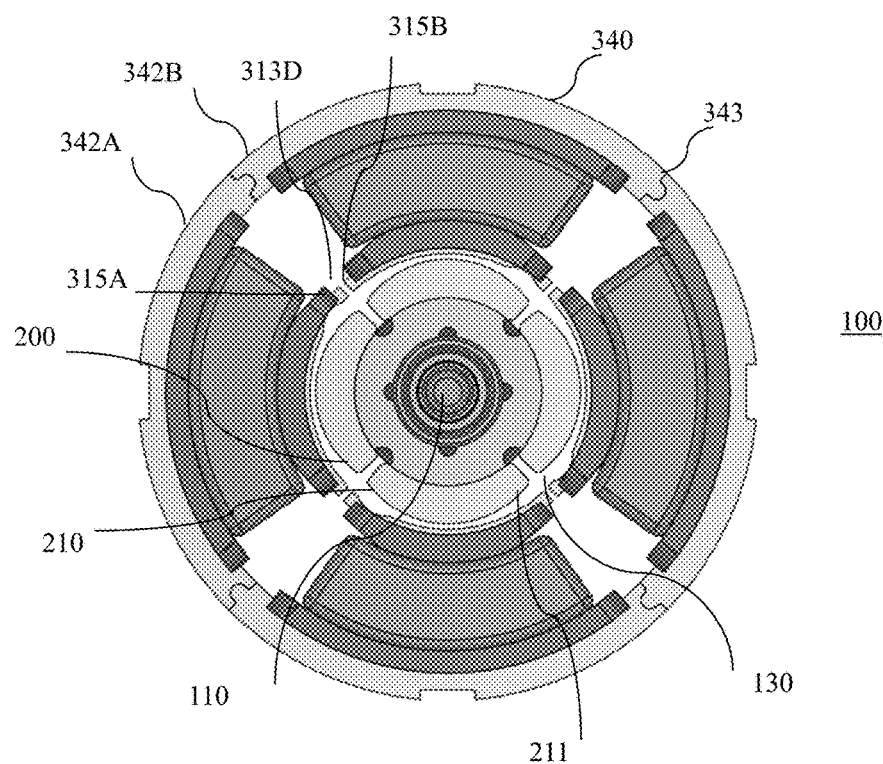

FIG. 40 is an exemplary flow chart illustrating an embodiment of the method 2000 for making the motor 100. FIGS. 41A-41C are exemplary detail drawings illustrating assembly of the motor 100 in accordance with an, alternative embodiment of the method 2000 of FIG. 40. The method 2000 will be described with reference to FIGS. 40 and 41A-41C. Although FIG. 40 shows 2121-2122 as performed in a sequential order, 2121-2122 can be performed in any sequence and/or simultaneously.

As shown in FIG. 40, the winding 330 can be wound, at 2121, around the tooth body 320. The tooth body 320 can be coupled with at least one segmented stator portion. The segmented stator portion can include at least one of the first and second stator portions 310, 340 collectively shown in FIG. 41C. Stated somewhat differently, the first and/or second stator portions 310, 340 can be segmented. The segmenting, for example, can include segmenting in a circumferential direction. The segmented stator portion can include a plurality of segments, at least one of which can have an arc shape.

FIG. 41A shows the tooth body 320 as being integrally formed with the first segment 315A of the first stator portions 310 via the first end region 321 and connected with the first segment 342A of the second stator portions 310 via the second end region 322.

As shown in FIG. 41B, the tooth body 320 can be assembled with a bobbin 350. The winding 330 can be wound on the bobbin 350 to form the wound assembly 331. For example, the winding 330 can be wound on the bobbin 350 using a double fly winding machine. Thereby, an efficiency of manufacturing the winding 330 can advantageously be improved.

The bobbin 350 can be segmented into a plurality of bobbin segments. FIG. 41B shows a selected bobbin segment 351A as being assembled with the tooth body 320.

The first segment can be assembled, at 2122, with the second segment of the segmented stator portion to form the stator 300. As shown in FIG. 41C, a plurality of wound assemblies 331 can be assembled by coupling the segments of the second stator portion 340. In other words, the first segment 342A of the second stator portion 340 and a second segment 342B of the second stator portion 340 can be assembled to form the second stator portion 340. The first and second segments 342A, 342B can be fixedly coupled with each other by welding and/or via a conventional mechanical connection structure. An exemplary mechanical connection structure can include a cooperating detent. FIG. 41C shows a cooperating detent 343 as including a wedge-shaped protrusion engaged in a wedge-shaped recess.

The first segment 315A of the first stator portion 310 and the second segment 315B can form the first stator portion 310. The first stator portion 310 can comprise a continuous structure or, as shown in FIG. 41C, a structure that is not continuous. The slot 313D can be formed between the first and second segments 315A, 315B.

FIG. 41C shows the rotor 200 as including a magnetic pole 210. The magnetic pole 210 can have the edge region 211 with a non-uniform distance from the central axis 110, as provided in the manner set forth above with reference to the rotor 200 shown in FIGS. 18 and 24.

Figure 42:
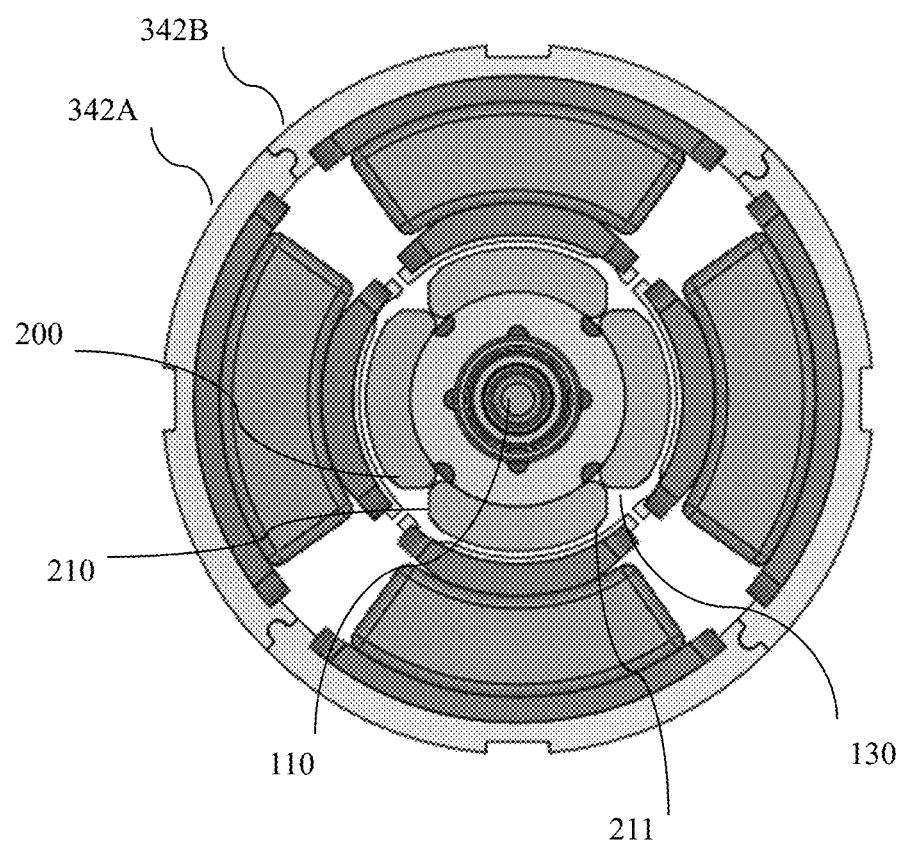
FIG. 42 is an exemplary detail drawing illustrating of an alternative embodiment of the motor of FIG. 41C, wherein assembling of the motor includes assembling the stator with a rotor having magnets with a uniform radius.

FIG. 42 shows the rotor 200 as including a magnetic pole 210 have an edge region 211 having a uniform distance from the central axis 110, as provided in the manner set forth above with reference to the rotor 200 shown in FIGS. 21 and 27.

As shown in FIG. 41C and FIG. 42, space between adjacent tooth bodies 320 advantageously can be almost completely filled by the winding 330 because the first and second segments 342A, 342B can be assembled together after the winding 330 is wound on the tooth body 320.

In contrast to the motor 100 of FIGS. 41A-41C and FIG. 42, for the motor 10 in FIG. 1, space between adjacent teeth 15 can only be partly filled by the winding 13 because the space needs to be partially reserved for a winding tool, such as a flyer, to pass through.

Advantageously, using the method 2000, material for making the tooth bodies 320 can be fully utilized. Less material likewise is needed for making the tooth bodies 320. The winding 330 can be wound on the tooth body 320 using a double fly winding machine. Advantageously, efficiency of winding the winding 330 can be improved.

The first stator portion 310 and/or the second stator portion 340 can be segmented in any manners, without limitation. The first segments 315A, 342A can be symmetrical relative to the tooth body 320 as shown in FIG. 41A. In one embodiment, at least one of the first segments 315A, 342A can be asymmetrical relative to the tooth body 320.

Figure 43A:
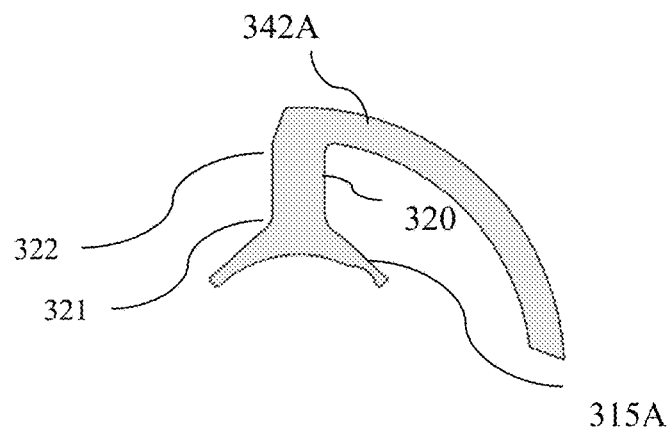
FIGS. 43A-43C are exemplary detail drawings illustrating assembly of an exemplary motor in accordance with another alternative embodiment of the method of FIG. 40, wherein the method includes assembling a plurality of asymmetric segments to form first and second stator portions.
Figure 43B:
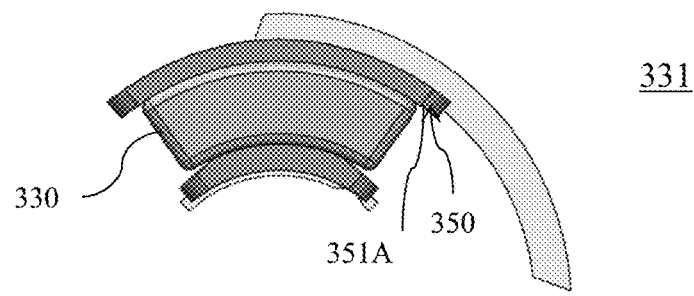
Figure 43C:
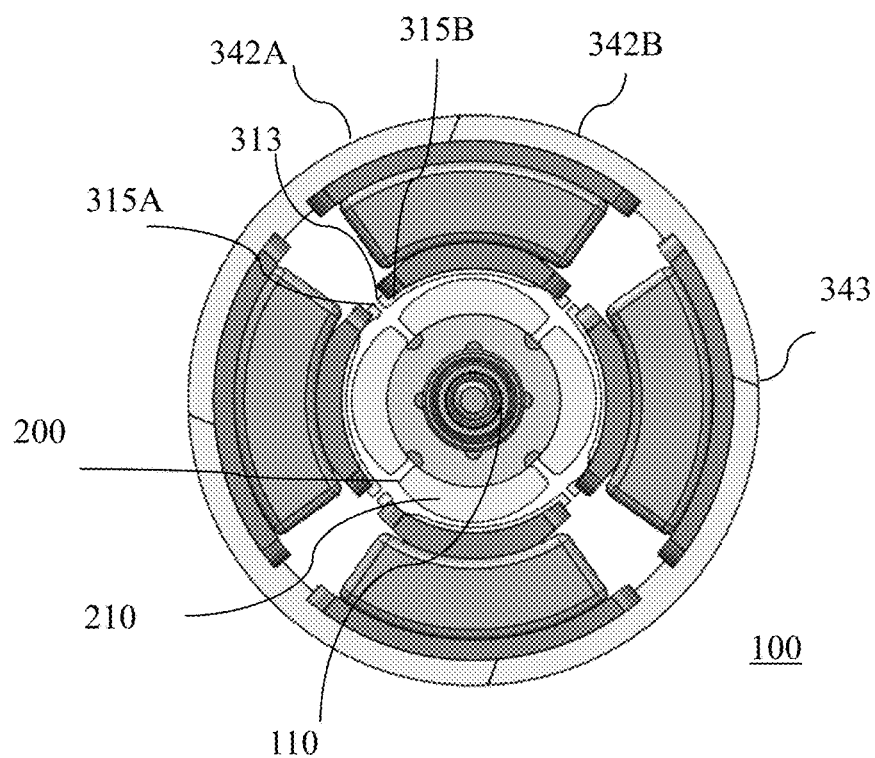

FIGS. 43A-43C are exemplary detail drawings illustrating assembly of the motor 100 in accordance with another alternative embodiment of the method 2000. As shown in FIG. 43A, the first and second end regions 321, 322 of the tooth body 320 can be respectively connected with a first segment 315A of the first stator portion 310 and a first segment 342A of the second stator portion 340. The first segment 342A of the second stator portion 340 is shown as being asymmetrical relative to the tooth body 320.

As shown in FIG. 43B, the wound assembly 331 can be formed after winding the winding 330. The tooth body 320 can be received by the bobbin segment 351A of the bobbin 350. The winding 330 can be wound on the bobbin segment 351A. As sufficient opening space exists around bobbin segment 351A, the winding 330 can be easily wound on the bobbin segment 351A. Thereby, difficulty of manufacturing the winding 330 can advantageously be reduced. In one example, the winding 330 can be wound on bobbin segment 351A using a double fly winding machine. Thereby, an efficiency of manufacturing the winding 330 can advantageously be improved.

As shown in FIG. 43C, four wound assemblies 331 can be assembled via the cooperating detents 343, to form the motor 100. Four wound assemblies 331 are shown in FIG. 43C for illustrative purposes. The motor 100 can be formed by assembling any predetermined number of uniform and/or different wound assemblies 331, without limitation.

Thus, as shown in FIGS. 43A-43C, by using the method 2000, material for making the tooth bodies 320 can be fully utilized. Thus, less material is needed for making the tooth bodies 320. The winding 330 can be wound on the tooth body 320 using a double fly winding machine. Advantageously, efficiency of winding the winding 330 can be improved.

Figure 44A:
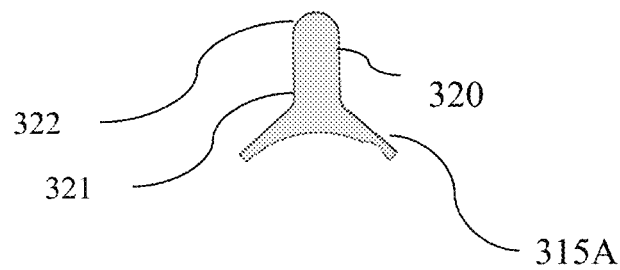
FIGS. 44A-44F are exemplary detail drawings illustrating assembly of an exemplary motor in accordance with another alternative embodiment of the method of FIG. 40, wherein the method includes assembling a plurality of segments to form the first stator portion.

In one example, the segmented stator portion can include the first stator portion 310. The first stator portion 310 can be segmented. The second stator portion 340 can be an integral structure. FIGS. 44A-44F are exemplary detail drawings illustrating assembly of the motor 100 in accordance with another alternative embodiment of the method 2000. FIG. 44A shows the tooth body 320 as having a first end region 321 connected with a first segment 315A of the first stator portion 310 and a second end region 322 as being separated from the second stator portion 340.

Figure 44B:
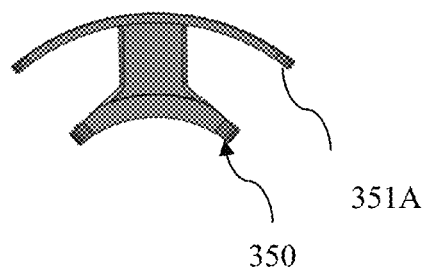

FIG. 44B shows the bobbin segment 351A. The bobbin segment 351A can be assembled with the tooth body 320 in FIG. 44A before winding the winding 330 (shown in FIG. 44D).

Figure 44C:
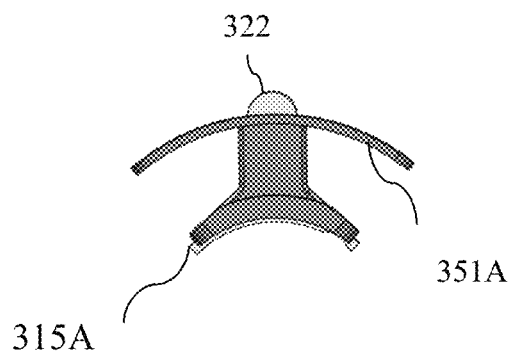

FIG. 44C shows that the tooth body 320 can be assembled with the bobbin segment 351A. The bobbin segment 351A can receive the tooth body 320 and optionally insulate the tooth body 320 from the winding 330 (shown in FIG. 44D).

Figure 44D:
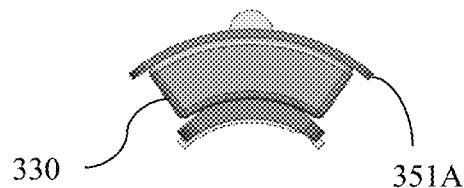

FIG. 44D shows that the winding 330 is wound around the bobbin segment 351A and the tooth body 320 to form the wound assembly 331. A plurality of the wound assemblies 331 can be formed. In one example, the winding 330 can be wound on bobbin segment 351A using a double fly winding machine. Thereby, an efficiency of manufacturing the winding 330 can advantageously be improved.

Figure 44E:
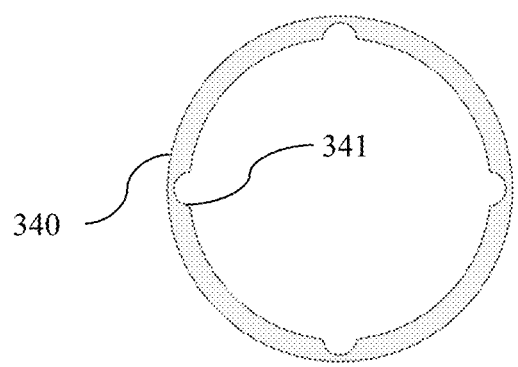

FIG. 44E shows the second stator portion 340 as an integral structure. Optionally, the second stator portion 340 can include one or more cooperating detents 341 for mounting the tooth body 320.

Figure 44F:
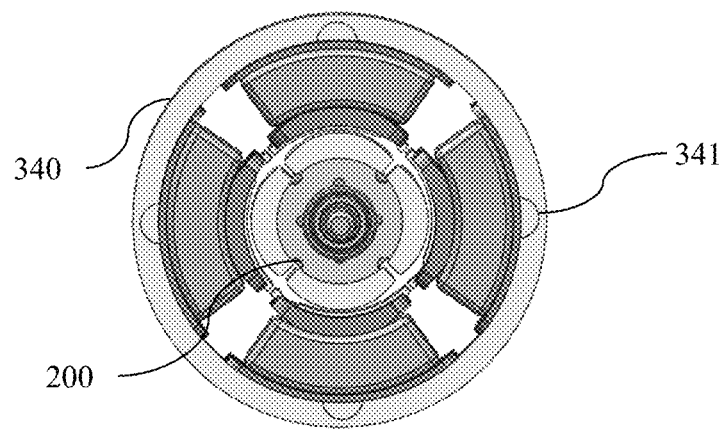

As shown in FIG. 44F, four wound assemblies 331 can be mounted on the second stator portion 340 via the respective cooperating detents 341. That is, the assembling, at 2122 (shown in FIG. 40), can include mounting the second end region 322 of the tooth body 320 to the second stator portion 340 to form the stator 300.

Figure 45A:
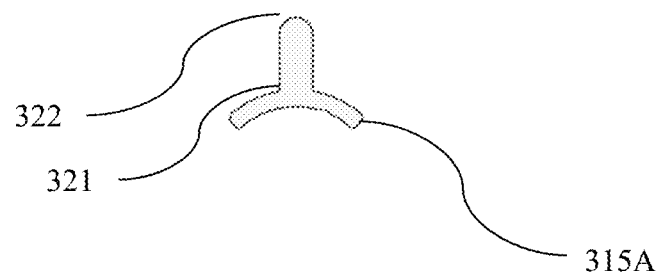
FIGS. 45A-45F are exemplary detail drawings illustrating assembly of an exemplary motor in accordance with another alternative embodiment of the method of FIG. 40, wherein the method includes assembling the segmented stator portion with a bobbin having an integral structure.

FIGS. 45A-45F are exemplary detail drawings illustrating assembly of the motor 100 in accordance with another alternative embodiment of the method 2000. FIG. 45A shows the tooth body 320 as having a first end region 321 being integrally formed with a first segment 315A of the first stator portion 310 and a second end region 322 being separate from the second stator portion 340.

Figure 45B:
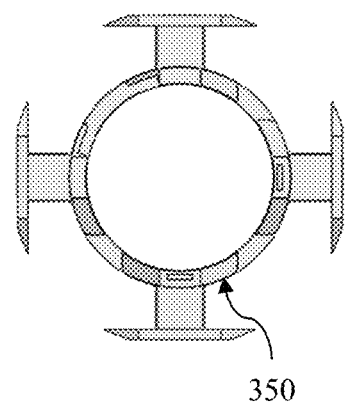

FIG. 45B shows a bobbin 350. The bobbin 350 in FIG. 45B can be an integral structure. The bobbin 350 can optionally insulate the winding 330 from the tooth body 320 for the entire stator 330.

Figure 45C:
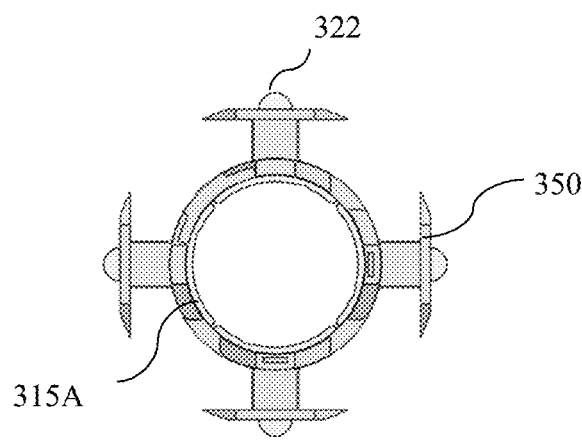

FIG. 45C shows that a plurality of tooth bodies 320 can be assembled with the bobbin 350. The bobbin 350 can thus provide a structure for receiving the plurality of tooth bodies 320.

Figure 45D:
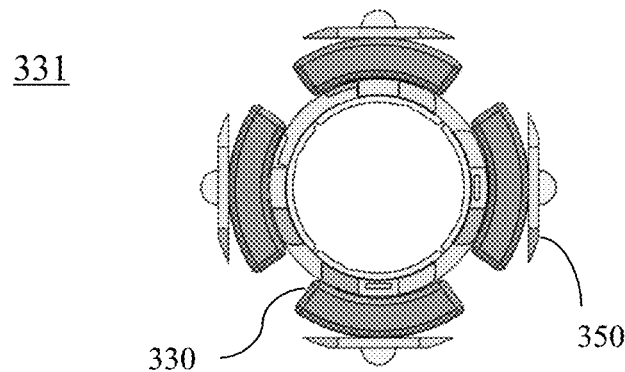

FIG. 45D shows that the winding 330 is wound on the bobbin 350 and the tooth body 320, to form the wound assembly 331, at 2121 (shown in FIG. 40). The bobbin 350 can insulate the winding 330 from the tooth body 320. The wound assembly 331 can be formed. In one example, the winding 330 can be wound on the bobbin 350 using a double fly winding machine. Thereby, an efficiency of manufacturing the winding 330 can advantageously be improved.

Figure 45E:
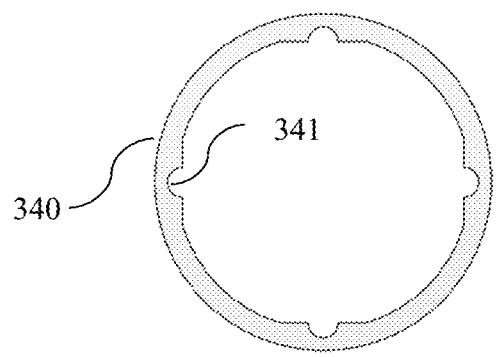

FIG. 45E shows the second stator portion 340 as an integral structure. Optionally, the second stator portion 340 can include suitable structure for mounting the tooth body 320 in any conventional manner. For example, as shown in FIG. 45E, the second stator portion 340 can include one or more cooperating detents 341 for mounting the tooth body 320.

Figure 45F:
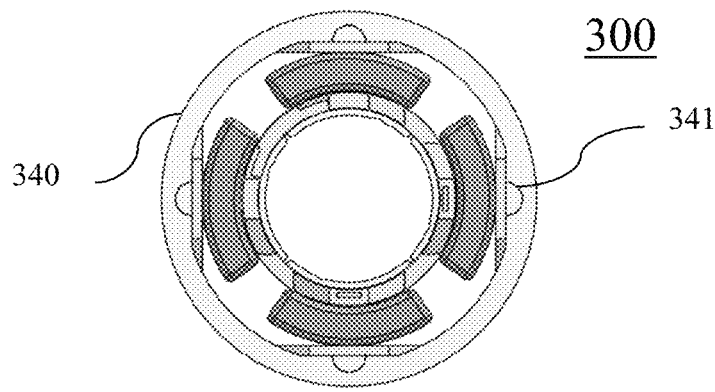

As shown in FIG. 45F, the wound assembly 331 can be mounted on the second stator portion 340 via the respective cooperating detents 341. That is, the assembling, at 2122, (shown in FIG. 40) can include mounting the second end region 322 of the tooth body 320 to the second stator portion 340 to form the stator 300.

Figure 46A:
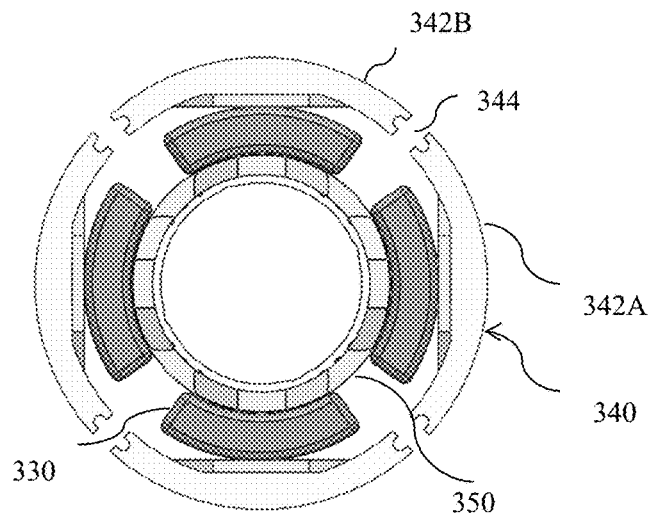
FIGS. 46A-46C are exemplary detail drawings illustrating assembly of an exemplary motor in accordance with another alternative embodiment of the method of FIG. 40, wherein the method includes assembling a plurality of segments to form a second stator portion, the segments having a wedge-shaped recess formed thereon.
Figure 46B:
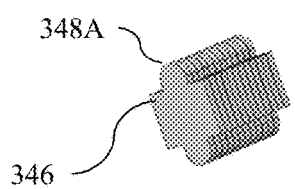
Figure 46C:
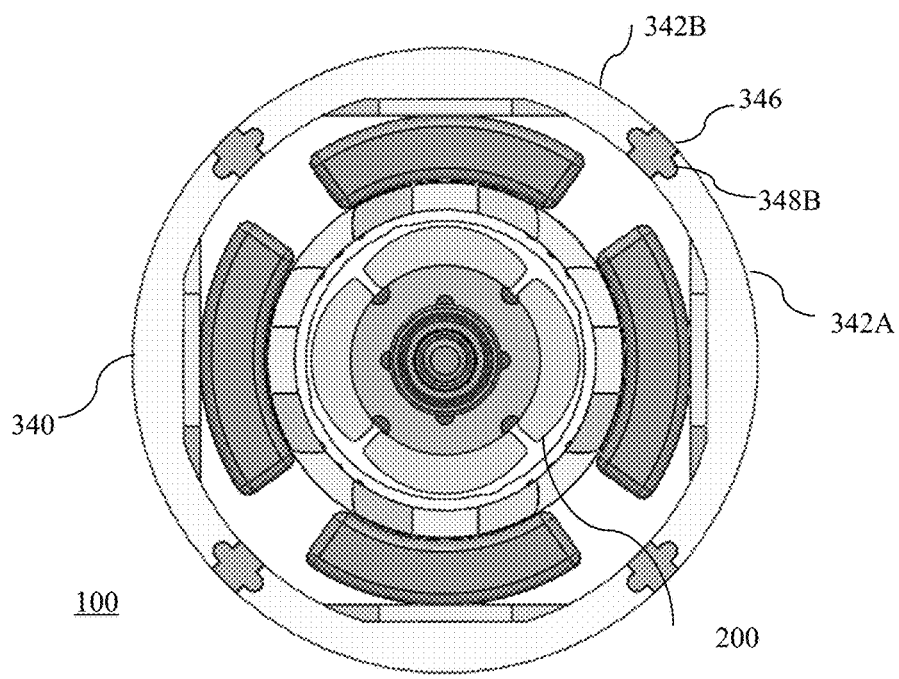

In an embodiment, the segmented stator portion can include a segmented second stator portion 340. The second stator portion 340, in other words, can be segmented. Additionally and/or alternatively, the first stator portion 310 can be an integral and/or segmented structure. FIGS. 46A-46C are exemplary detail drawings illustrating assembly of the motor 100 in accordance with another alternative embodiment of the method 2000. In FIG. 46A, the winding 330 can be wound around a bobbin 350. The bobbin 350 can insulate the winding 330 from the tooth body 320 (shown in FIG. 2). The tooth body 320, for example, can be enclosed within the bobbin 350 prior to winding, at 2121 (shown in FIG. 40). The second stator portion 340 can include the first and second segments 342A, 342B. A gap 344 can be formed between the first and second segments 342A, 342B. The gap 344 can have a size, shape and/or dimension sufficient for enabling the winding 330 to be easily wound.

FIG. 46B shows an exemplary filler chip 346 for assembling the second stator portion 340. The filler chip 346 can be made of a material that is the same as and/or different from the material of the stator 300. For example, the filler chip 346 and/or at least part of the stator 300 can be made of a plurality of magnetically conductive laminations such as silicon steel sheets stacked in an axial direction of the motor 100. The filler chip 346 of FIG. 46B, for example, is shown as including a wedge-shaped protrusion 348A.

The assembling, at 2122 (shown in FIG. 40), can include connecting the first segment 342A of the second stator portion 340 with a second segment 342B of the second stator portion 340 by filling the gap 344 therebetween, to form the second stator portion 340. As shown in FIG. 46C, the first segment 342A can include a wedge-shaped recess 348B. The filler chip 346 can cooperate with the first and second segments 342A, 342B to fill the gap 344.

Figure 47A:
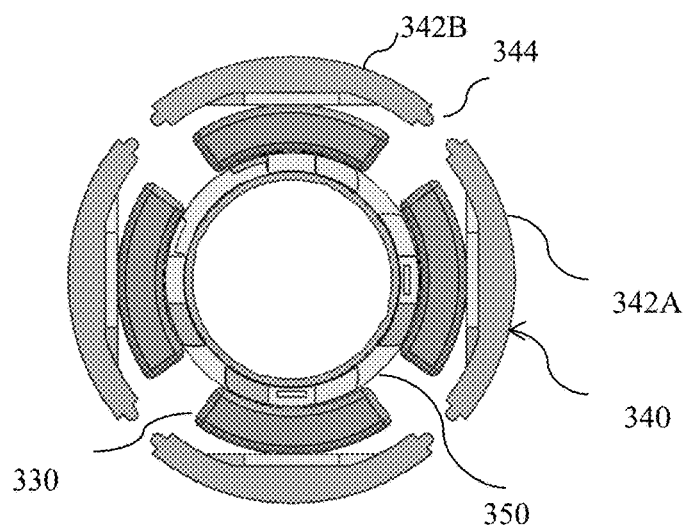
FIGS. 47A-47C are exemplary detail drawings illustrating assembly of an exemplary motor in accordance with another alternative embodiment of the method of FIG. 40, wherein the method includes assembling a plurality of segments to form a second stator portion, the segments having a wedge-shaped protrusion formed thereon.
Figure 47B:
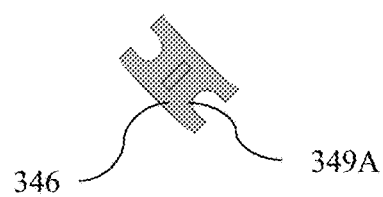
Figure 47C:
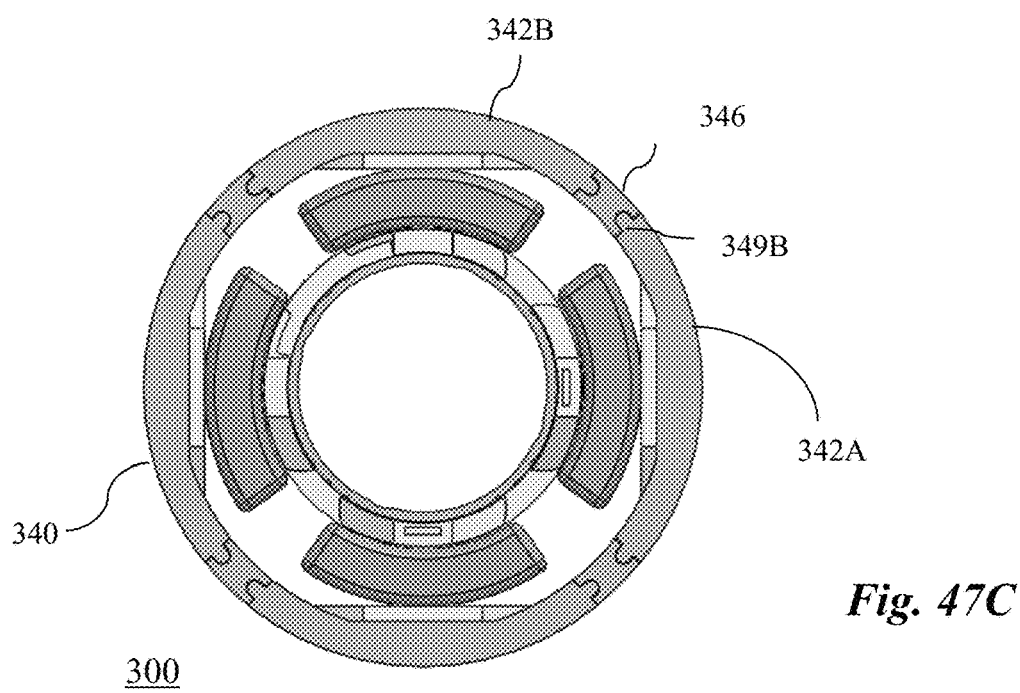

FIGS. 47A-47C are exemplary detail drawings illustrating assembly of the motor 100 in accordance with another alternative embodiment of the method 2000. In the example shown in FIG. 47A, the winding 330 can be wound around the bobbin 350. The gap 344 can be formed between the first and second segments 342A, 342B. The gap 344 can have a size, shape and/or dimension sufficient for enabling the winding 330 to be easily wound.

FIG. 47B shows an exemplary filler chip 346 for assembling the second stator portion 340. The filler chip 346 can include a wedge-shaped recess 349A.

As shown in FIG. 47C, the first segment 342A can include the wedge-shaped protrusion 349B. Thus, the filler chip 346 can cooperate with the first and second segments 342A, 342B to fill the gap 344.

Additionally and/or alternatively, the first and second segments 342A, 342B can be coupled using any other methods. For example, the first and second segments 342A, 342B may be in contact without the gap 344 therebetween. The first and second segments 342A, 342B can be fixedly coupled with each other via any conventional method, without necessarily using the filler chip 346. Exemplary methods can include riveting, welding, stack welding, and/or the like.

FIG. 48 is an exemplary flow chart illustrating an embodiment of a method 2100 for making the motor 100. As shown in FIG. 48, the winding 330 can be wound, at 2131, around the tooth body 320. The tooth body 320 can include the first and second end regions 321, 322 respectively connected with the first and second stator portions 310, 340. At least one of the first and second stator portions 310, 340 can have an adjustable shape. At least one of the first and second stator portions 310, 340 can include a plurality of disconnected segments having a gap 316 (shown in FIG. 49A) therebetween for enabling and/or facilitating the winding. The gap 316 is reduced, at 2132, after the winding at 2131, by adjusting the adjustable shape, to form the stator 300. Although FIG. 48 shows 2131-2132 as performed in a sequential order, 2131-2132 can be performed in any sequence and/or simultaneously.

Figure 49A:
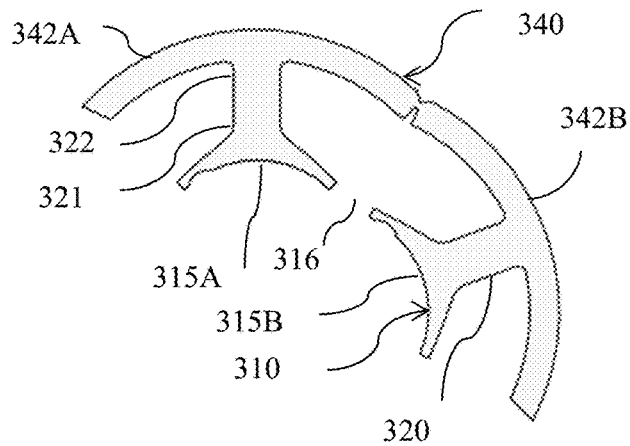
FIGS. 49A-49C are exemplary detail drawings illustrating assembly of an exemplary motor in accordance with an alternative embodiment of the method of FIG. 48, wherein the method includes forming the stator with a second stator portion having an adjustable shape.
Figure 49B:
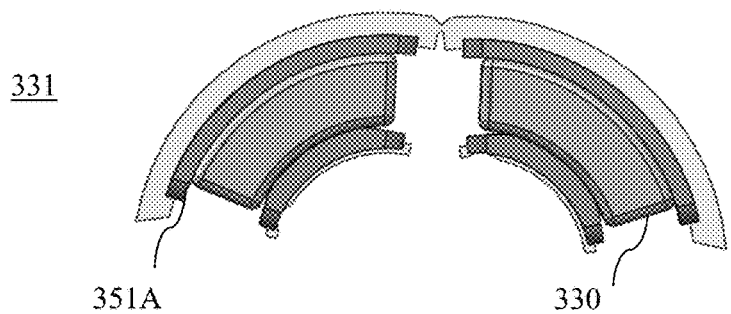
Figure 49C:
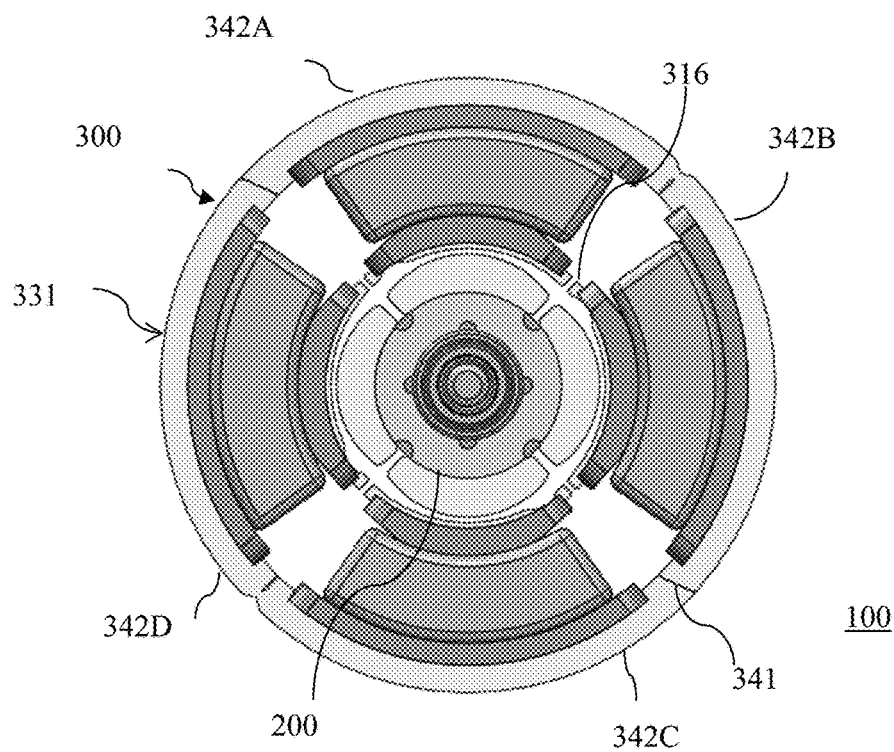

In one example, the second stator portion 340 can have an adjustable shape. FIGS. 49A-49C are exemplary detail drawings illustrating assembly of the motor 100 in accordance with an alternative embodiment of the method 2100. As shown in FIG. 49A, the second stator portion 340 can have an adjustable shape. Additionally and/or alternatively, the first stator portion 310 and the second stator portion 340 can be segmented. The tooth body 320 can have the first end region 321 connected with a first segment 315A of the first stator portion 310 and a second end region 322 connected with the first segment 342A of the second stator portion 340. The second stator portion 340 can be folded and/or bent to increase a gap 316 between the first and second segments 315A, 315B. When the gap 316 is sufficiently large, winding, at 2131 (shown in FIG. 48) can be easier.

FIG. 49A shows the first segment 342A as being connected to the second segment 342B while being enabled to fold, pivot, and/or rotate relative to the second segment 342B. Stated somewhat differently, the first segment 342A and the second segment 342B can be adjustably coupled. For example, the second stator portion 340 can be made of a ductile material such as metal. Thus, the ductile material can allow relative movement between the first segment 342A and the second segment 342B.

FIG. 49B shows the bobbin segment 351A assembled with the tooth body 320 (shown in FIG. 2) to insulate the tooth body 320 from the winding 330. The winding 330 can be wound around the tooth body 320, at 2131 (shown in FIG. 48) to form the wound assembly 331.

FIG. 49C shows two wound assemblies 331 being assembled to form the stator 300. The adjustable shape of the second stator portion 340 can be adjusted to reduce the gap 316 between the first segment 315A and the second segment 315B of the first portion 310. A selected wound assembly 331 can include the third and fourth segments 342C, 342D of the second stator portion 340. The two wound assemblies 331 can be assembled with each other in any suitable manner. The second and third segments 315B, 315C, for example, can be coupled in any conventional manner. As shown in FIG. 41C, the second and third segments 315B, 315C can have respective shapes that cooperate with each other. Stated somewhat differently, the second and third segments 342B, 342C can be coupled via the cooperating detent 341. Additionally and/or alternatively, the second and third segments 315B, 315C can cooperate with each other via connecting techniques such as welding connection.

Figure 50A:
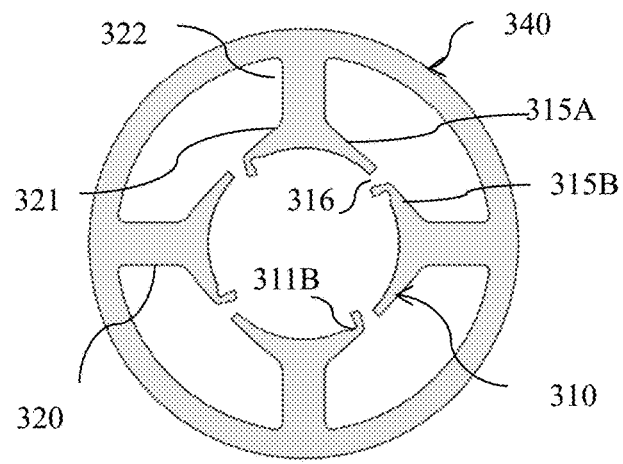
FIGS. 50A-50C are exemplary detail drawings illustrating assembly of an exemplary motor in accordance another alternative embodiment of the method of FIG. 48, wherein the method includes forming the stator with a first stator portion having an adjustable shape.
Figure 50B:
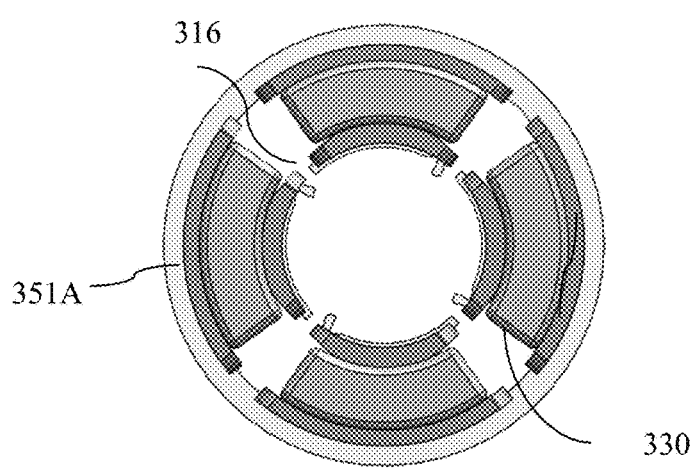
Figure 50C:
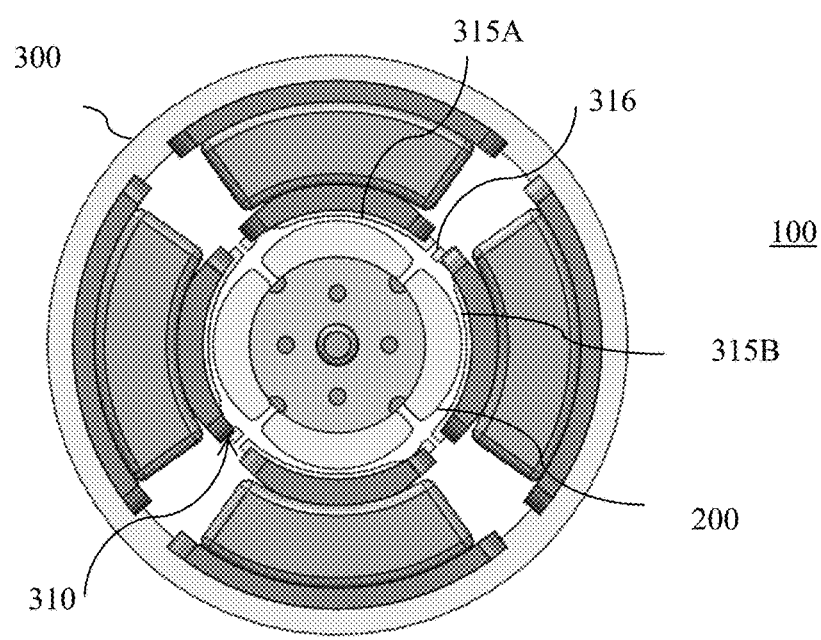

FIGS. 50A-50C are exemplary detail drawings illustrating assembly of the motor 100 in accordance another alternative embodiment of the method 2100. As shown in FIG. 50A, the first stator portion 310 can have an adjustable shape. Additionally and/or alternatively, the first stator portion 310 can be segmented. Optionally, the second stator portion 340 can include an integral structure. The tooth body 320 can have a first end region 321 connected with the first segment 315A of the first stator portion 310 and a second end region 322 connected with the second stator portion 340.

The first segment 315A can be folded and/or bent to increase the gap 316 between the first and second segments 315A, 315B. For example, the first segment 315A can be made of a material capable of undergoing a change of form without breaking. For example, the first segment 315A can be made of a ductile material such as metal. Thus, the ductile material can allow the first segment 315A to change shape under an externally applied mechanical force without breakage. Additionally and/or alternatively, the first segment 315A can be made of two sub-segments rotatably coupled in order to enable the folding, pivoting, and/or rotating relative to each other. As shown in FIG. 50A, the second arcuate region 311B can include a recess, and the first segment 315A can be foldable at the recess. When the gap 316 is sufficiently large, winding can be easier.

FIG. 50B shows that the bobbin segment 351A can be assembled with the tooth body 320 (shown in FIG. 50A). The winding 330 can be wound around the tooth body 320, at 2131 (shown in FIG. 48).

FIG. 50C shows the adjustable shape of the first stator portion 310 being adjusted to reduce the gap 316 between the first segment 315A and the adjacent second segment 315B of the first stator portion 310 as described with respect to 2132 in FIG. 48).

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A single phase motor, comprising:
   a rotor including magnetic poles; and
   a stator comprising a stator core and a winding wound on the stator core, the stator core comprising a plurality of stator teeth each comprising a tooth body extending along a radial direction of the rotor and a tooth end formed at an end of the tooth body, the tooth end comprising first and second arcuate regions facing the rotor, wherein each magnetic pole has an edge region facing the stator, the edge regions of the magnetic poles of the rotor and the first arcuate region of the stator being coaxial with each other, wherein, when the winding is not energized, a first magnetic coupling between said first arcuate region and a selected magnetic pole of said rotor is greater than a second magnetic coupling between said second arcuate region and the selected magnetic pole, the magnetic pole being offset from a selected tooth body in such a way as to enable movement of said rotor to initiate in either of two opposite directions relative to said selected tooth body upon energizing the winding, and wherein each two adjacent tooth ends of the stator are completely disconnected from each other and only an empty slot is between the each two adjacent tooth ends.

2. The single phase motor of claim 1, wherein the empty slot radially extends through inner and outer surfaces of the adjacent tooth ends of the stator, a ratio of a circumferential width of the empty slot to a width of an air gap formed between the edge regions of the magnetic poles of the rotor and the first arcuate regions of the stator range is less than four.

3. The single phase motor of claim 1, wherein:
the rotor defines a central axis;
an inner surface of the first arcuate region facing the rotor has a first radius uniform about the central axis; and
an inner surface of the second arcuate region facing the rotor has a second radius about the central axis greater than the first radius.

4. The single phase motor of claim 1, wherein the first arcuate region is made of a first soft ferromagnetic material, and the second arcuate region is made of a second soft ferromagnetic material different from the first soft ferromagnetic material, the second soft ferromagnetic material having a lower magnetic permeability than the first soft ferromagnetic material.

5. The single phase motor of claim 1, wherein, when the winding is not energized, a middle radial line of the magnetic pole is angularly offset from a middle radial line of the selected tooth body by a start up angle ranging from 45 to 135 degrees electrical angle.

6. The single phase motor of claim 1, wherein the second arcuate region defines a recess, and the size of an air gap formed between the second arcuate region and the edge region of the rotor is greater than the size of an air gap between the first arcuate region and the edge region of the rotor.

7. The single phase motor of claim 1, wherein the stator core comprises a first stator portion and a second stator portion, the stator teeth extending inwardly from the second stator portion, the tooth ends cooperatively forming the first stator portion.

8. The single phase motor of claim 7, wherein the second stator portion is ring-shaped.

9. The single phase motor of claim 7, wherein the second stator portion comprises a plurality of segments engaged with each other, each segment is integral formed with a corresponding stator tooth.

10. The single phase motor of claim 1, wherein:
the rotor defines a central axis;
the first arcuate region has a first radius uniform about the central axis; and
the second arcuate region has a second radius uniform about the central axis, the second radius being equal to the first radius.

11. The single phase motor of claim 10, wherein the second arcuate region defines a hole covered by an inner surface of the second arcuate region.

12. A single phase motor, comprising:
a rotor including magnetic poles; and
a stator comprising a stator core and a winding wound on the stator core, the stator core comprising a plurality of stator teeth each comprising a tooth body and a tooth end formed at an end of the tooth body, the tooth end comprising first and second arcuate regions both made of magnetic material and facing the rotor, wherein each magnetic pole has an edge region facing the stator, the edge regions of the magnetic poles of the rotor and the first arcuate region of the stator being coaxial with each other, wherein, when the winding is not energized, a first magnetic coupling between said first arcuate region and a selected magnetic pole of said rotor is greater than a second magnetic coupling between said second arcuate region and the selected magnetic pole, the magnetic pole being offset from a selected tooth body in such a way as to enable movement of said rotor to initiate in either of two opposite directions relative to said selected tooth body upon energizing the winding, and wherein the first and second arcuate regions of each tooth end are both made of soft ferromagnetic material, each two adjacent tooth ends of the stator are completely disconnected from each other with only an empty slot therebetween, a ratio of a circumferential width of the empty slot to a width of an air gap formed between the edge regions of the magnetic poles of the rotor and the first arcuate regions of the stator range is less than four.

13. The single phase motor of claim 12, wherein:
the rotor defines a central axis;
an inner surface of the first arcuate region facing the rotor has a first radius uniform about the central axis; and
an inner surface of the second arcuate region facing the rotor has a second radius about the central axis greater than the first radius.

14. The single phase motor of claim 12, wherein when the winding is not energized, a middle radial line of the magnetic pole is angularly offset from a middle radial line of the selected tooth body by a start up angle ranging from 45 to 135 degrees electrical angle.

15. The single phase motor of claim 12, wherein the first arcuate region is made of a first soft ferromagnetic material, and the second arcuate region is made of a second soft ferromagnetic material different from the first soft ferromagnetic material, the second soft ferromagnetic material has a lower magnetic permeability than the first soft ferromagnetic material.

16. The single phase motor of claim 12, wherein the tooth body of each of the stator teeth extends along a radial direction of the rotor.

* * * * *